(12) United States Patent
Faler et al.

(10) Patent No.: US 12,466,902 B2
(45) Date of Patent: Nov. 11, 2025

(54) NON-COORDINATING ANION TYPE ACTIVATORS FOR USE WITH POLYOLEFIN POLYMERIZATION CATALYSTS

(71) Applicant: ExxonMobil Chemical Patents Inc., Baytown, TX (US)

(72) Inventors: Catherine A. Faler, Houston, TX (US); Margaret T. Whalley, Houston, TX (US); John R. Hagadorn, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 955 days.

(21) Appl. No.: 17/631,813

(22) PCT Filed: Jul. 28, 2020

(86) PCT No.: PCT/US2020/043863
§ 371 (c)(1),
(2) Date: Jan. 31, 2022

(87) PCT Pub. No.: WO2021/025903
PCT Pub. Date: Feb. 11, 2021

(65) Prior Publication Data
US 2022/0282004 A1 Sep. 8, 2022

Related U.S. Application Data

(60) Provisional application No. 62/882,088, filed on Aug. 2, 2019.

(51) Int. Cl.
| | | |
|---|---|---|
| *C08F 4/65* | (2006.01) | |
| *C07F 5/02* | (2006.01) | |
| *C08F 4/659* | (2006.01) | |
| *C08F 4/6592* | (2006.01) | |
| *C08F 110/02* | (2006.01) | |
| *C08F 210/16* | (2006.01) | |

(52) U.S. Cl.
CPC ...... *C08F 4/65908* (2013.01); *C08F 4/65927* (2013.01); *C08F 210/16* (2013.01); *C08F 2420/10* (2021.01); *C08F 2500/03* (2013.01); *C08F 2500/34* (2021.01)

(58) Field of Classification Search
CPC ......... C07F 5/02; C08F 4/65908; C08F 10/00
See application file for complete search history.

(56) References Cited

U.S. PATENT DOCUMENTS

| | | | |
|---|---|---|---|
| 2,883,362 A | 4/1959 | Rosenwald et al. | 260/45.9 |
| 5,008,204 A | 4/1991 | Stehling | 436/85 |
| 5,834,393 A | 11/1998 | Jacobsen et al. | 502/152 |
| 6,121,185 A | 9/2000 | Rosen et al. | 502/164 |
| 6,265,338 B1 | 7/2001 | Canich | 502/103 |
| 6,309,997 B1 | 10/2001 | Fujita et al. | 502/167 |
| 6,689,847 B2 | 2/2004 | Mawson et al. | 526/116 |
| 6,841,502 B2 | 1/2005 | Boussie et al. | 502/125 |
| 6,884,748 B2 | 4/2005 | McCullough | 502/117 |
| 6,900,321 B2 | 5/2005 | Boussie et al. | 546/4 |
| 6,958,306 B2 | 10/2005 | Holtcamp | 502/128 |
| 6,995,109 B2 | 2/2006 | Mink et al. | 502/103 |
| 7,087,686 B2 | 8/2006 | Britovsek et al. | 526/113 |
| 7,087,690 B2 | 8/2006 | Boussie et al. | 526/161 |
| 7,091,292 B2 | 8/2006 | Boussie et al. | 526/172 |
| 7,129,302 B2 | 10/2006 | Mink et al. | 526/116 |
| 7,157,531 B2 | 1/2007 | Szul et al. | 526/79 |
| 7,169,864 B2 | 1/2007 | Paczkowski et al. | 526/129 |
| 7,179,876 B2 | 2/2007 | Szul et al. | 526/348.2 |
| 7,973,116 B2 | 7/2011 | Hagadorn et al. | 526/172 |

(Continued)

FOREIGN PATENT DOCUMENTS

| | | |
|---|---|---|
| CN | 106565512 | 4/2017 |
| EP | 0874005 | 7/2003 |

(Continued)

OTHER PUBLICATIONS

U.S. Appl. No. 62/662,972, filed Apr. 26, 2018, Faler, Catherine A. et al.
CAS No. 103328-85-4.
CAS No. 330682-35-4.
CAS No. 655246-90-5.
*Chemical and Engineering News*, v.63(5), p. 27 (1985).
Gibson, V. C. et al. (2003) "Advances in Non-Metallocene Olefin Polymerization Catalysis," *Chem. Rev.*, v.103(1), pp. 283-316.
Makio, H. et al. (2009) "Development and Application of FI Catalysts for Olefin Polymerization: Unique Catalysis and Distinctive Polymer Formation," *Accounts of Chemical Research*, v.42(10), pp. 1532-1544.

(Continued)

*Primary Examiner* — Catherine S Branch
(74) *Attorney, Agent, or Firm* — ExxonMobil Technology and Engineering Company

(57) ABSTRACT

The present disclosure is related to activator compounds represented by:

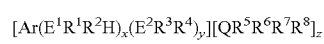

$[Ar(E^1R^1R^2H)_x(E^2R^3R^4)_y][QR^5R^6R^7R^8]_z$

In the formula Ar is a $C_6$-$C_{30}$ aromatic hydrocarbyl group, provided that if Ar is a multicyclic ring, then each $E^1$ and each $E^2$ are substitutions on a single ring. Also, x is 1 to 4; y is 0 to 3; z=x; and x+y is 2 to 6. Each of $E^1$ and $E^2$ are independently selected from nitrogen or phosphorous and Q is selected from group 13 of the Periodic Table of the Elements. Additionally, each of $R^1$, $R^2$, $R^3$, and $R^4$ are independently selected from $C_1$-$C_{40}$ aliphatic hydrocarbyl, substituted $C_1$-$C_{40}$ aliphatic hydrocarbyl and each of $R^5$, $R^6$, $R^7$, and $R^8$ is independently a $C_6$-$C_{24}$ hydrocarbyl or a $C_6$-$C_{24}$ substituted hydrocarbyl. The present disclosure also relates to catalyst systems including a catalyst and the activator compound. Also, the present disclosure relates to methods of polymerizing olefins.

19 Claims, No Drawings

(56) References Cited

U.S. PATENT DOCUMENTS

| | | | |
|---|---|---|---|
| 8,188,200 B2 | 5/2012 | Sita et al. | 526/161 |
| 8,592,615 B2 | 11/2013 | Kuhlman et al. | 556/51 |
| 8,642,497 B2 | 2/2014 | Berris | 502/202 |
| 2001/0039320 A1 | 11/2001 | Jacobsen et al. | 526/348.2 |
| 2006/0019925 A1 | 1/2006 | Kiribayashi et al. | 514/47 |
| 2006/0247483 A1 | 11/2006 | McConville et al. | 585/521 |
| 2007/0055028 A1 | 3/2007 | Casty et al. | 526/127 |
| 2011/0224391 A1 | 9/2011 | Hagadorn et al. | 526/161 |
| 2011/0301310 A1 | 12/2011 | Hagadorn et al. | 526/172 |
| 2012/0071616 A1 | 3/2012 | Hagadorn et al. | 526/170 |
| 2015/0141601 A1 | 5/2015 | Hagadorn et al. | C08F 4/76 |
| 2015/0203602 A1 | 7/2015 | Sun et al. | C08F 4/52 |
| 2018/0002352 A1 | 1/2018 | Hagadorn et al. | C07F 7/00 |
| 2021/0179537 A1 | 6/2021 | Faler et al. | C07C 211/64 |

FOREIGN PATENT DOCUMENTS

| | | |
|---|---|---|
| EP | 1765841 | 1/2006 |
| WO | WO1993/003093 | 2/1993 |
| WO | WO1997/022635 | 6/1997 |
| WO | WO2000/069922 | 11/2000 |
| WO | WO2001/030860 | 5/2001 |
| WO | WO2001/030861 | 5/2001 |
| WO | WO2002/046246 | 6/2002 |
| WO | WO2002/050088 | 6/2002 |
| WO | WO2004/026921 | 4/2004 |
| WO | WO2006/019494 | 2/2006 |
| WO | WO2006/020624 | 2/2006 |
| WO | WO2012/134715 | 10/2012 |
| WO | WO2017/004462 | 1/2017 |
| WO | WO2019/089144 | 5/2019 |

OTHER PUBLICATIONS

Matsui, S. et al. (2001) "A Family of Zirconium Complexes Having Two Phenoxy-Imine Chelate Ligands for Olefin Polymerization," *J. Am. Chem. Soc.*, v.123(28), pp. 6847-6856.

Nakayama, Y et al. (2004), "Olefin Polymerization Behavior of bis(phenoxy-imine) Zr, Ti, and V complexes with $MgCl_2$-based Cocatalysts," *J. Mol. Catalysis A: Chemical*, v.213, pp. 141-150.

Nakayama, Y. et al. (2005), "Propylene Polymerization Behavior of Fluorinated Bis(phenoxy-imine) Ti Complexes with an MgCl2-Based Compound (MgC12-Supported Ti-Based Catalysts)," *Macromol. Chem. Phys.*, v.206(18), pp. 1847-1852.

Nakayama, Y. et al. (2006) "$MgCl_2/R'_nAl(OR)_{3-n}$: An Excellent Activator/Support for Transition-Metal Complexes for Olefin Polymerization," *Chem. Eur. J.*, v.12, p. 7546-7556.

Oliveira, J. V. et al. (2000) "High-Pressure Phase Equilibria for Polypropylene-Hydrocarbon Systems," *Ind. Eng. Chem. Res.*, v.39, pp. 4627-4633.

Resconi, L. et al. (2000) "Selectivity in Propene Polymerization with Metallocene Catalysts," *Chem. Rev.*, v.100(4), pp. 1253-1346.

Sun, T. et al. (2001) "Effect of Short Chain Branching on the Coil Dimensions of Polyolefins in Dilute Solutions," *Macromolecules*, v.34(19), pp. 6812-6820.

Wild, L. et al. (1982) "Determination of Branching Distributions in Polyethylene and Ethylene Copolymers," *J. Poly. Sci., Poly. Phys. Ed.*, v.20(3), pp. 441-455.

NON-COORDINATING ANION TYPE ACTIVATORS FOR USE WITH POLYOLEFIN POLYMERIZATION CATALYSTS

CROSS REFERENCE TO RELATED APPLICATIONS

This application is a national stage filing of Patent Cooperation Treaty Application No. PCT/US2020/043863 filed Jul. 28, 2020 claiming priority to U.S. Provisional Application No. 62/882,088, filed Aug. 2, 2019, the disclosure of the Provisional Application is incorporated herein by reference.

FIELD

The present disclosure relates to group 13 metallate activators, catalyst systems including, and methods for polymerizing olefins using such activators.

BACKGROUND

Polyolefins are widely used commercially because of their robust physical properties. Polyolefins are typically prepared with an activated catalyst that polymerizes olefin monomers. Catalysts for olefin polymerization are often based on metallocenes as catalyst precursors, which are typically activated either with an alumoxane or an activator containing a non-coordinating anion. A non-coordinating anion, is capable of stabilizing a metal cation of the catalyst after activation. Because such activators are ionized and the corresponding anion is non-coordinating, such activators can be effective as olefin polymerization catalyst activators. However, because they are ionic salts, such activators are typically insoluble in aliphatic hydrocarbons and only sparingly soluble in aromatic hydrocarbons.

Furthermore, polymerizations of α-olefins may be conducted in aliphatic hydrocarbon solvents due to the compatibility of such solvents with the olefin monomer and in order to reduce the aromatic hydrocarbon content of the resulting polymer product. Typically, these ionic salt activators are added to olefin polymerizations in the form of a solution in an aromatic solvent such as toluene. The use of even a small quantity of such an aromatic solvent can be cumbersome since it may increase costs/complexity due to removal in post-polymerization devolatilization step.

There is a need for activators that are soluble in non-aromatic hydrocarbons, such as aliphatic hydrocarbons, and capable of producing polyolefins having a good molecular weights and melting temperatures. Likewise, there is a need for activators that are soluble in non-aromatic hydrocarbons, such as aliphatic hydrocarbons, and capable of producing polyolefins at high activity levels where the polymers have high molecular weight, high melt temperature, and preferably low levels of aromatic solvents.

References of interest include: U.S. Pat. Nos. 8,642,497; 6,121,185; 2,883,362; US 2015/0203602; U.S. Ser. No. 62/662,972 filed Apr. 26, 2018; CN106565512; CAS number 103328-85-4; CAS number 655246-90-5; and CAS number 330682-35-4.

SUMMARY

The present disclosure is related to activator compounds represented by Formula (I):

$$[Ar(E^1R^1R^2H)x(E^2R^3R^4)y][QR^5R^6R^7R^8]z. \quad (I)$$

In Formula (I) Ar is a $C_6$-$C_{30}$ aromatic hydrocarbyl group, provided that if Ar is a multicyclic ring, then each $E^1$ and each $E^2$ are substitutions on a single ring of the multicyclic ring; x is 1 to 4; y is 0 to 3; z=x; and x+y is 2 to 6; each of $E^1$ and $E^2$ are independently selected from nitrogen or phosphorous and Q is an element selected from group 13 of the Periodic Table of the Elements; each of $R^1$, $R^2$, $R^3$, and $R^4$ are independently selected from $C_1$-$C_{40}$ aliphatic hydrocarbyl, substituted $C_1$-$C_{40}$ aliphatic hydrocarbyl, wherein $R^1$, $R^2$, $R^3$, and $R^4$ together include 15 or more carbon atoms and each of $R^5$, $R^6$, $R^7$, and $R^8$ is independently a $C_6$-$C_{24}$ hydrocarbyl or a $C_6$-$C_{24}$ substituted hydrocarbyl.

The present disclosure also relates to catalyst systems including a catalyst and the activator compound represented by Formula (I), and to solutions of a catalyst system in aliphatic solvent.

Also, the present disclosure relates to methods of polymerizing olefins to produce a polyolefin. The methods may include contacting at least one olefin with a catalyst system described herein and obtaining a polyolefin.

DETAILED DESCRIPTION

The present disclosure relates to activator compounds that can be used in olefin polymerization processes. For example, the present disclosure provides activators, catalyst systems including catalyst compounds and activators, and methods for polymerizing olefins using said catalyst systems. In the present disclosure, activators are described that feature ammonium or phosphonium groups with aliphatic hydrocarbyl groups for improved solubility of the activator in aliphatic solvents, as compared to conventional activator compounds.

The present disclosure relates to activator compounds that can be used in olefin polymerization processes. For example, the present disclosure provides ammonium or phosphonium cations coupled with non-coordinating anions of group 13, such as sterically hindered borates and aluminates. Also provided are catalyst systems including such activators, and methods for polymerizing olefins using the activators. In the present disclosure, activators are described that feature ammonium or phosphonium groups with aliphatic hydrocarbyl groups for improved solubility of the activator in aliphatic solvents, as compared to conventional activator compounds. Useful non-coordinating anions of the present disclosure include perfluoronaphthyl or perfluorophenyl borates or aluminates. It has been discovered that activators of the present disclosure having perfluoronaphthyl borate or aluminate anions have improved solubility in aliphatic solvents, as compared to conventional activator compounds. Activators of the present disclosure can provide polyolefin homopolymers having a weight average molecular weight (Mw) of about 300,000 g/mol or greater and a melt temperature (Tm) of about 130° C. or greater. Further, activators having a cation having two or more $C_6$ to $C_{30}$ alkyl groups can provide enhanced activity for polymer production.

Definitions

Unless otherwise noted all melt temperatures (Tm) are DSC second melt and are determined using the following DSC procedure according to ASTM D3418-03. Differential scanning calorimetric (DSC) data are obtained using a TA Instruments model Q200 machine. Samples weighing 5 mg to 10 mg are sealed in an aluminum hermetic sample pan. The DSC data are recorded by first gradually heating the sample to 200° C. at a rate of 10° C./minute. The sample is kept at 200° C. for about 2 minutes, then cooled to −90° C. at a rate of 10° C./minute, followed by an isothermal for 2 minutes and heating to 200° C. at 10° C./minute. Both the first and second cycle thermal events are recorded. The melting points reported are obtained during the second heating/cooling cycle unless otherwise noted.

All molecular weights are weight average (Mw) unless otherwise noted. All molecular weights are reported in g/mol unless otherwise noted. Melt index (MI) also referred to as I2, reported in g/10 min., is determined according to ASTM D-1238, 190° C., 2.16 kg load. High load melt index (HLMI) also referred to as I21, reported in g/10 min., is determined according to ASTM D-1238, 190° C., 21.6 kg load. Melt index ratio (MIR) is MI divided by HLMI as determined by ASTM D1238.

The specification describes catalysts that can be transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are typically subjected to activation to perform their polymerization or oligomerization function using an activator which is believed to create a cation as a result of the removal of an anionic group, often referred to as a leaving group, from the transition metal.

For the purposes of the present disclosure, the numbering scheme for the Periodic Table Groups is the "New" notation as described in *Chemical and Engineering News*, v. 63(5), pg. 27 (1985). Therefore, a "group 4 metal" is an element from group 4 of the Periodic Table, e.g., Hf, Zr, and so on.

The following abbreviations are used through this disclosure: TNOAL is tri(n-octyl)aluminum, MAO is methylaluminoxane, RT is room temperature (and is 23° C. unless otherwise indicated).

Unless otherwise indicated (e.g., the definition of "substituted hydrocarbyl", etc.), the term "substituted" means that at least one hydrogen atom has been replaced with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a ring structure.

The terms "hydrocarbyl radical," "hydrocarbyl," and "hydrocarbyl group," are used interchangeably throughout this disclosure. Likewise, the terms "group", "radical", and "substituent" are also used interchangeably in this disclosure. For purposes of this disclosure, "hydrocarbyl radical" is defined to be $C_1$-$C_{100}$ radicals of carbon and hydrogen, that may be linear, branched, or cyclic, and when cyclic, aromatic or non-aromatic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like.

Substituted hydrocarbyl radicals are radicals in which at least one hydrogen atom of the hydrocarbyl radical has been replaced with a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring.

A "metallocene" catalyst compound is a transition metal catalyst compound having one, two or three, typically one or two, substituted or unsubstituted cyclopentadienyl ligands bound to the transition metal, typically a metallocene catalyst is an organometallic compound containing at least one π-bound cyclopentadienyl moiety (or substituted cyclopentadienyl moiety). Substituted or unsubstituted cyclopentadienyl ligands include substituted or unsubstituted cyclopentadienyl, indenyl, indacenyl, tetrahydroindenyl benzeindenyl, or fluorenyl, and the like.

Substituted cyclopentadienyl, indenyl, indacenyl, tetrahydroindenyl benzeindenyl, or fluorenyl groups are cyclopentadienyl, indenyl, indacenyl, tetrahydroindenyl, benzeindenyl, or fluorenyl groups where at least one hydrogen atom has been replaced with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a ring structure.

Halocarbyl radicals (also referred to as halocarbyls, halocarbyl groups or halocarbyl substituents) are radicals in which one or more hydrocarbyl hydrogen atoms have been substituted with at least one halogen (e.g., F, Cl, Br, I) or halogen-containing group (e.g., $CF_3$). Substituted halocarbyl radicals are radicals in which at least one halocarbyl hydrogen or halogen atom has been substituted with at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Hydrocarbylsilyl groups, also referred to as silylcarbyl groups, are radicals in which one or more hydrocarbyl hydrogen atoms have been substituted with at least one SiR*$_3$ containing group or where at least one —Si(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure. Silylcarbyl radicals can be bonded via a silicon atom or a carbon atom.

Substituted silylcarbyl radicals are silylcarbyl radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $GeR^*_3$, $SnR^*_3$, $PbR^*_3$ and the like or where at least one non-hydrocarbon atom or group has been inserted within the silylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

The terms "alkyl radical," and "alkyl" are used interchangeably. For purposes of this disclosure, "alkyl radicals" are defined to be $C_1$-$C_{100}$ alkyls that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*$, —$SiR^*_3$, —$GeR^*$, —$GeR^*_3$, —$SnR^*$, —$SnR^*_3$, —$PbR^*_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring.

The term "branched alkyl" means that the alkyl group contains a tertiary or quaternary carbon (a tertiary carbon is a carbon atom bound to three other carbon atoms. A quaternary carbon is a carbon atom bound to four other carbon atoms). For example, 3,5,5 trimethylhexylphenyl is an alkyl group (hexyl) having three methyl branches (hence, one tertiary and one quaternary carbon) and thus is a branched alkyl bound to a phenyl group.

The term "alkenyl" means a straight-chain, branched-chain, or cyclic hydrocarbon radical having one or more carbon-carbon double bonds. These alkenyl radicals may be substituted. Examples of suitable alkenyl radicals can include ethenyl, propenyl, allyl, 1,4-butadienyl cyclopropenyl, cyclobutenyl, cyclopentenyl, cyclohexenyl, cyclooctenyl and the like.

The term "alkoxy", "alkoxyl", or "alkoxide" means an alkyl ether or aryl ether radical where the terms alkyl and aryl are as defined. Examples of suitable alkyl ether radicals can include methoxy, ethoxy, n-propoxy, iso-propoxy, n-butoxy, iso-butoxy, sec-butoxy, tert-butoxy, phenoxy, and the like.

The term "aryl" or "aryl group" means a carbon-containing aromatic ring such as phenyl. Likewise, heteroaryl means an aryl group where a ring carbon atom (or two or three ring carbon atoms) has been replaced with a heteroatom, such as N, O, or S. The term "aromatic" also refers to pseudoaromatic heterocycles which are heterocyclic substituents that have similar properties and structures (nearly planar) to aromatic heterocyclic ligands, but are not by definition aromatic.

Heterocyclic means a cyclic group where a ring carbon atom (or two or three ring carbon atoms) has been replaced with a heteroatom, such as N, O, or S. A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylaminophenyl is a heteroatom substituted ring.

Substituted heterocyclic means a heterocyclic group where at least one hydrogen atom of the heterocyclic radical has been substituted with at least a non-hydrogen group, such as a hydrocarbyl group, a heteroatom, or a heteroatom containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*$, —$SiR^*_3$, —$GeR^*$, —$GeR^*_3$, —$SnR^*$, —$SnR^*_3$, —$PbR^*_3$, and the like, where each R* is independently a hydrocarbyl or halocarbyl radical.

A substituted aryl is an aryl group where at least one hydrogen atom of the aryl radical has been substituted with at least a non-hydrogen group, such as a hydrocarbyl group, a heteroatom, or a heteroatom containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*$, —$SiR^*_3$, —$GeR^*$, —$GeR^*_3$, —$SnR^*$, —$SnR^*_3$, —$PbR^*_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring, for example 3,5-dimethylphenyl is a substituted aryl group.

A "fluorophenyl" or "fluorophenyl group" is a phenyl group substituted with one, two, three, four or five fluorine atoms.

Reference to an alkyl, alkenyl, alkoxide, or aryl group without specifying a particular isomer (e.g., butyl) expressly discloses all isomers (e.g., n-butyl, iso-butyl, sec-butyl, and tert-butyl), unless otherwise indicated.

The term "ring atom" means an atom that is part of a cyclic ring structure. Accordingly, a benzyl group has six ring atoms and tetrahydrofuran has 5 ring atoms.

For purposes of the present disclosure, a "catalyst system" is a combination of at least one catalyst compound, and an activator. The catalyst systems may further include one or more additional catalyst compounds. For the purposes of the present disclosure, when catalyst systems are described as including neutral stable forms of the components, it is to be understood, that the ionic form of the component is the form that reacts with the monomers to produce polymers. Catalysts of the present disclosure and activators represented by Formula (I), (IA), and (IB) are intended to embrace ionic forms in addition to the neutral forms of the compounds.

A "complex" is also often referred to as catalyst precursor, precatalyst, catalyst, catalyst compound, transition metal compound, or transition metal complex. These words are used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

A catalyst may be described as a catalyst precursor, a pre-catalyst compound, a catalyst compound or a transition metal compound, and these terms are used interchangeably.

A polymerization catalyst system is a catalyst system that can polymerize monomers into polymer. An "anionic ligand" is a negatively charged ligand which donates one or more pairs of electrons to a metal ion. A "neutral donor ligand" is a neutrally charged ligand which donates one or more pairs of electrons to a metal ion.

For purposes of the present disclosure, in relation to catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

"Catalyst productivity" is a measure of how many grams of polymer (P) are produced using a polymerization catalyst including W g of catalyst (cat), over a period of time of T hours; and may be expressed by the following formula: $P/(T \times W)$ and expressed in units of $gPgcat^{-1} hr^{-1}$. "Conversion" is the amount of monomer that is converted to polymer product, and is reported as mol % and is calculated based on the polymer yield and the amount of monomer fed into the reactor. "Catalyst activity" is a measure of the level of activity of the catalyst and is reported as the mass of product polymer (P) produced per mole (or mmol) of catalyst (cat) used (kgP/molcat or gP/mmolCat), and catalyst activity can also be expressed per unit of time, for example, per hour (hr), e.g., (Kg/mmol h).

An "olefin," alternatively referred to as "alkene," is a linear, branched, or cyclic compound including carbon and hydrogen having at least one double bond. For purposes of this disclosure and the claims, when a polymer or copolymer is referred to as including an olefin, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and the derived units are present at 35 wt % to 55 wt %, based upon the weight of the copolymer.

A "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, copolymer, can include terpolymers and the like. An oligomer is typically a polymer having a low molecular weight, such an Mn of less than 25,000 g/mol, or less than 2,500 g/mol, or a low number of mer units, such as 75 mer units or less or 50 mer units or less. An "ethylene polymer" or "ethylene copolymer" is a polymer or copolymer including at least 50 mole % ethylene derived units, a "propylene polymer" or "propylene copolymer" is a polymer or copolymer including at least 50 mole % propylene derived units, and so on.

Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn.

The term "continuous" means a system that operates without interruption or cessation for a period of time, such as where reactants are continually fed into a reaction zone and products are continually or regularly withdrawn without stopping the reaction in the reaction zone. For example, a continuous process to produce a polymer would be one where the reactants are continually introduced into one or more reactors and polymer product is continually withdrawn.

A "solution polymerization" means a polymerization process in which the polymerization is conducted in a liquid polymerization medium, such as an inert solvent or monomer(s) or their blends. A solution polymerization is typically homogeneous. A homogeneous polymerization is one where the polymer product is dissolved in the polymerization medium. Such systems are typically not turbid as described in Oliveira, J. V. et al. (2000) "High-Pressure Phase Equilibria for Polypropylene-Hydrocarbon Systems," *Ind. Eng. Chem. Res.*, v. 39, pp. 4627-4633.

A bulk polymerization means a polymerization process in which the monomers and/or comonomers being polymerized are used as a solvent or diluent using little or no inert solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as 0 wt %.

DESCRIPTION

The present disclosure relates to activator compounds that can be used in olefin polymerization processes. For example, the present disclosure provides activators, catalyst systems including catalyst compounds and activators, and methods for polymerizing olefins using said catalyst systems. In the present disclosure, activators are described that feature ammonium or phosphonium groups with aliphatic hydrocarbyl groups for improved solubility of the activator in aliphatic solvents, as compared to conventional activator compounds.

The present disclosure relates to activator compounds including a cation and a non-coordinating anion that can be used in olefin polymerization processes. For example, the present disclosure provides ammonium or phosphonium cations coupled with non-coordinating anions of group 13, such as sterically hindered borates and aluminates. Useful borate and aluminate groups of the present disclosure include perfluoronaphthyl and perfluorophenyl borates and aluminates. It has been discovered that activators of the present disclosure having perfluoronaphthyl borate or aluminate anions have improved solubility in aliphatic solvents, as compared to conventional activator compounds. Activators of the present disclosure can provide polyolefin homopolymers having a weight average molecular weight (Mw) of about 300,000 g/mol or greater and a melt temperature (Tm) of about 130° C. or greater. Further, activators having a cation having two or more $C_6$ to $C_{30}$ alkyl groups can provide enhanced activity for polymer production.

In another aspect, the present disclosure relates to polymer compositions obtained from the catalyst systems and processes described. The components of the catalyst systems according to the present disclosure and used in the polymerization processes of the present disclosure, as well as the resulting polymers, are described in more detail below.

The present disclosure relates to a catalyst system including a transition metal compound and an activator compound of formula (I), (II), or (III), to the use of an activator compound of formula (I), (II), or (III) for activating a transition metal compound in a catalyst system for polymerizing olefins, and to processes for polymerizing olefins, the process including contacting under polymerization conditions one or more olefins with a catalyst system including a transition metal compound and an activator compound of formula (I), (II), or (III).

The present disclosure also relates to processes for polymerizing olefins including contacting, under polymerization conditions, one or more olefins with a catalyst system including a transition metal compound and an activator compound of formula (I), (II), or (III). The weight average molecular weight of the polymer formed can increase with increasing monomer conversion at a given reaction temperature.

The activator compounds of formula (I), (II), or (III) will be further illustrated below. Combinations of cations and non-coordinating anions disclosed herein are suitable to be used in the processes of the present disclosure and are thus incorporated herein.

Non-Coordinating Anion (NCA) Activators

Non-coordinating anion (NCA) means an anion either that does not coordinate to the catalyst metal cation or that does coordinate to the metal cation, but only weakly. The term NCA is also defined to include multicomponent NCA-containing activators, such as N,N-dioctadecylanilinium tetrakis(perfluoronaphthyl)borate, that contain an acidic cationic group and the non-coordinating anion. The term NCA is also defined to include neutral Lewis acids, such as tris(pentafluoronaphthyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. A metal or metalloid that can form a compatible, weakly coordinating complex may be used or contained in the non-coordinating anion. Suitable metals can include aluminum, gold, and platinum. Suitable metalloids can include boron, aluminum, phosphorus, and silicon. The term non-coordinating anion activator includes neutral activators, ionic activators, and Lewis acid activators.

"Compatible" non-coordinating anions can be those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization.

Activators

The present disclosure provides activators, such as ammonium or phosphonium metallate or metalloid activator compounds, including ammonium or phosphonium groups with long-chain aliphatic hydrocarbyl groups combined with metallate or metalloid non-coordinating anions, such as borates or aluminates. When an activator of the present disclosure is used with a catalyst compound (such as a group 4 metallocene compound) in an olefin polymerization, a polymer can be formed having a higher molecular weight and melt temperature than polymers formed using comparative activators. In addition, it has been discovered that activators of the present disclosure are soluble in non-aromatic solvents, such as aliphatic solvents.

In one or more embodiments, a 20 wt % mixture of the compound in n-hexane, isohexane, cyclohexane, methylcyclohexane, or a combination thereof, forms a clear homogeneous solution at 25° C., such as a 30 wt % mixture of the compound in n-hexane, isohexane, cyclohexane, methylcyclohexane, or a combination thereof, forms a clear homogeneous solution at 25° C.

In embodiments of the present disclosure, the activators have a solubility of about 10 mM or more, such as about 20 mM or more, or about 50 mM or more at 25° C. (stirred 2 hours) in methylcyclohexane.

In embodiments of the present disclosure, the activators have a solubility about 1 mM or more, such as about 10 mM or more, or about 20 mM or more at 25° C. (stirred 2 hours) in isohexane.

In embodiments of the present disclosure, the activators have a solubility of about 10 mM or more, such as about 20 mM or more, or about 50 mM or more at 25° C. (stirred 2 hours) in methylcyclohexane and a solubility of about 1 mM or more, such as about 10 mM or more, or about 20 mM or more at 25° C. (stirred 2 hours) in isohexane.

The present disclosure relates to a catalyst system including a transition metal compound and an activator compound, to the use of such activator compounds for activating a transition metal compound in a catalyst system for polymerizing olefins, and to processes for polymerizing olefins, the process including contacting under polymerization conditions one or more olefins with a catalyst system including a transition metal compound and such activator compounds, where aromatic solvents, such as toluene, are absent (e.g. present at about zero mol %, alternately present at about 1 mol % or less, and the catalyst system, the polymerization reaction and/or the polymer produced are free of "detectable aromatic hydrocarbon solvent," such as toluene. For purposes of the present disclosure, "detectable aromatic hydrocarbon solvent" means 0.1 mg/m$^2$ or more as determined by gas phase chromatography. For purposes of the present disclosure, "detectable toluene" means 0.1 mg/m$^2$ or more as determined by gas phase chromatography.

The polyolefins produced may contain about 0 ppm (alternately about 1 ppm or less) of aromatic hydrocarbon. In some embodiments, the polyolefins produced contain about 0 ppm (alternately about 1 ppm or less) of toluene.

The catalyst systems of the present disclosure may contain about 0 ppm (alternately about 1 ppm or less) of aromatic hydrocarbon. In some embodiments, catalyst systems contain about 0 ppm (alternately about 1 ppm or less) of toluene.

The present disclosure relates to activator compounds represented by Formula (I):

$$[Ar(E^1R^1R^2H)x(E^2R^3R^4)y][QR^5R^6R^7R^8]z. \quad (I)$$

where:
Ar is a $C_6$-$C_{30}$ aromatic hydrocarbyl group, provided that if Ar is a multicyclic ring, then each $E^1$ and each $E^2$ are substitutions on a single ring of the multicyclic ring;
x is 1 to 4; y is 0 to 3; z=x; x+y is 2 to 6;
each of $E^1$ and $E^2$ are independently selected from nitrogen or phosphorous;
each of $R^1$, $R^2$, $R^3$, and $R^4$ are independently selected from $C_1$-$C_{40}$ aliphatic hydrocarbyl, substituted $C_1$-$C_{40}$ aliphatic hydrocarbyl, where $R^1$, $R^2$, $R^3$, and $R^4$ together include 15 or more carbon atoms;
Q is an element selected from group 13 of the Periodic Table of the Elements;
each of $R^5$, $R^6$, $R^7$, and $R^8$ is independently a $C_6$-$C_{24}$ hydrocarbyl or a substituted $C_6$-$C_{24}$ hydrocarbyl.

In some embodiments of Formula (I), x is 1 and y is 1; x is 2 and y is 1; x is 2 and y is 0; x is 1 and y is 2; or x is 3 and y is 0. In at least one embodiment of Formula (I), x is 1 and y is 1, or x is 2 and y is 0.

In some embodiments, the activator compound of Formula (I) is represented by Formula (IA):

$$[Ar(E^1R^1R^2H)(E^2R^3R^4)][QR^5R^6R^7R^8] \quad (IA)$$

where:
  Ar is a $C_6$-$C_{30}$ aromatic hydrocarbyl group, provided that if Ar is a multicyclic ring, then each $E^1$ and each $E^2$ are substitutions on a single ring of the multicyclic ring;
  each of $E^1$ and $E^2$ are independently selected from nitrogen or phosphorous;
  each of $R^1$, $R^2$, $R^3$, and $R^4$ are independently selected from $C_1$-$C_{40}$ aliphatic hydrocarbyl, substituted $C_1$-$C_{40}$ aliphatic hydrocarbyl, where $R^1$, $R^2$, $R^3$, and $R^4$ together include 15 or more carbon atoms;
  Q is an element selected from group 13 of the Periodic Table of the Elements;
  each of $R^5$, $R^6$, $R^7$, and $R^8$ is independently a $C_6$-$C_{24}$ hydrocarbyl or a substituted $C_6$-$C_{24}$ hydrocarbyl.

In some embodiments, the activator compound of Formula (I) is represented by Formula (IB):

$$[Ar(E^1R^1R^2H)(E^2R^3R^4H)][QR^5R^6R^7R^8]2 \quad (IB)$$

where:
  Ar is a $C_6$-$C_{30}$ aromatic hydrocarbyl group, provided that if Ar is a multicyclic ring, then each of $E^1$ and $E^2$ are substitutions on a single ring of the multicyclic ring;
  each of $E^1$ and $E^2$ are independently selected from nitrogen or phosphorous;
  each of $R^1$, $R^2$, $R^3$, and $R^4$ are independently selected from $C_1$-$C_{40}$ aliphatic hydrocarbyl, substituted $C_1$-$C_{40}$ aliphatic hydrocarbyl, where $R^1$, $R^2$, $R^3$, and $R^4$ together include 15 or more carbon atoms;
  Q is an element selected from group 13 of the Periodic Table of the Elements;
  each of $R^5$, $R^6$, $R^7$, and $R^8$ is independently a $C_6$-$C_{24}$ hydrocarbyl or a substituted $C_6$-$C_{24}$ hydrocarbyl.

In some embodiments of Formulas (I), (IA), or (IB), Ar is a single ring aromatic hydrocarbyl. In some embodiments of Formulas (I), (IA), or (IB), Ar is benzene, naphthalene, or anthracene. In at least one embodiment of Formulas (I), (IA), or (IB), Ar is benzene.

In some embodiments of Formulas (I), (IA), or (IB), each $E^1$ and $E^2$ is nitrogen.

In some embodiments of Formulas (I), (IA), or (IB), $R^1$ is an optionally substituted $C_1$-$C_{10}$ aliphatic hydrocarbyl, such as methyl, ethyl, propyl, or butyl. In some embodiments of Formulas (I), (IA), or (IB), $R^1$ is methyl. In some embodiments of Formulas (I), (IA), or (IB), $R^3$ is an optionally substituted $C_1$-$C_{10}$ aliphatic hydrocarbyl, such as methyl, ethyl, propyl, or butyl. In some embodiments of Formulas (I), (IA), or (IB), $R^3$ is methyl. In some embodiments of Formulas (I), (IA), or (IB), $R^1$ and $R^3$ are an optionally substituted $C_1$-$C_{10}$ aliphatic hydrocarbyl, such as methyl, ethyl, propyl, or butyl. In some embodiments of Formulas (I), (IA), or (IB), $R^1$ and $R^3$ are methyl. In some embodiments of Formulas (I), (IA), or (IB), $R^2$ is an optionally substituted $C_6$-$C_{30}$, such as $C_8$-$C_{24}$, or $C_{10}$-$C_{20}$ aliphatic hydrocarbyl. In some embodiments of Formulas (I), (IA), or (IB), $R^4$ is an optionally substituted $C_6$-$C_{30}$, such as $C_8$-$C_{24}$, or $C_{10}$-$C_{20}$ aliphatic hydrocarbyl. In some embodiments of Formulas (I), (IA), or (IB), $R^2$ and $R^4$ are independently an optionally substituted $C_6$-$C_{30}$, such as $C_8$-$C_{24}$, or $C_{10}$-$C_{20}$ aliphatic hydrocarbyl. In some embodiments of Formulas (I), (IA), or (IB), $R^1$ is methyl and $R^2$ is an optionally substituted $C_6$-$C_{30}$, such as $C_8$-$C_{24}$, or $C_{10}$-$C_{20}$ aliphatic hydrocarbyl. In some embodiments of Formulas (I), (IA), or (IB), $R^3$ is methyl and $R^4$ is an optionally substituted $C_6$-$C_{30}$, such as $C_8$-$C_{24}$, or $C_{10}$-$C_{20}$ aliphatic hydrocarbyl. In some embodiments of Formulas (I), (IA), or (IB), $R^1$ and $R^3$ are an optionally substituted $C_1$-$C_{10}$ aliphatic hydrocarbyl, such as methyl, ethyl, propyl, or butyl and $R^2$ and $R^4$ are independently an optionally substituted $C_6$-$C_{30}$, such as $C_8$-$C_{24}$, or $C_{10}$-$C_{20}$ aliphatic hydrocarbyl.

In some embodiments of Formulas (I), (IA), or (IB), $R^1$ is an optionally substituted $C_1$-$C_{10}$ aliphatic hydrocarbyl, such as methyl, ethyl, propyl, or butyl and $R^2$ is an optionally substituted $C_6$-$C_{30}$ linear alkyl group, such as n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-henicosyl, n-docosyl, n-tricosyl, n-tetracosyl, n-pentacosyl, n-hexacosyl, n-heptacosyl, n-octacosyl, n-nonacosyl, or n-tricontyl. In some embodiments of Formulas (I), (IA), or (IB), $R^1$ and $R^2$ are independently an optionally substituted $C_6$-$C_{24}$ linear alkyl group, such as n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-henicosyl, n-docosyl, n-tricosyl, or n-tetracosyl. In some embodiments of Formulas (I), (IA), or (IB), $R^1$ and $R^2$ are independently an optionally substituted $C_6$-$C_{24}$ linear alkyl group, such as n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-henicosyl, n-docosyl, n-tricosyl, or n-tetracosyl.

In some embodiments of Formulas (I), (IA), or (IB), $R^3$ is an optionally substituted $C_1$-$C_{10}$ aliphatic hydrocarbyl, such as methyl, ethyl, propyl, or butyl, and $R^4$ is an optionally substituted $C_6$-$C_{30}$ linear alkyl group, such as n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-henicosyl, n-docosyl, n-tricosyl, n-tetracosyl, n-pentacosyl, n-hexacosyl, n-heptacosyl, n-octacosyl, n-nonacosyl, or n-tricontyl. In some embodiments of Formulas (I), (IA), or (IB), $R^3$ and $R^4$ are independently an optionally substituted $C_6$-$C_{24}$ linear alkyl group, such as n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-henicosyl, n-docosyl, n-tricosyl, or n-tetracosyl. In some embodiments of Formulas (I), (IA), or (IB), $R^3$ and $R^4$ are independently an optionally substituted $C_6$-$C_{24}$ linear alkyl group, such as n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-henicosyl, n-docosyl, n-tricosyl, or n-tetracosyl.

In some embodiments of Formulas (I), (IA), or (IB), $R^1$ and $R^3$ are independently an optionally substituted $C_1$-$C_{10}$ aliphatic hydrocarbyl, such as methyl, ethyl, propyl, or butyl; and $R^2$ and $R^4$ are independently an optionally substituted $C_6$-$C_{30}$ linear alkyl group, such as n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-henicosyl, n-docosyl, n-tricosyl, n-tetracosyl, n-pentacosyl, n-hexacosyl, n-heptacosyl, n-octacosyl, n-nonacosyl, or n-tricontyl. In some embodiments of Formulas (I), (IA), or (IB), $R^1$, $R^2$, $R^3$, and $R^4$ are independently an optionally substituted $C_6$-$C_{30}$ linear alkyl group, such as n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-henicosyl, n-docosyl, n-tricosyl, n-tetracosyl, n-pentacosyl, n-hexacosyl, n-heptacosyl, n-octacosyl, n-nonacosyl, or n-tricontyl. In some embodiments of Formulas (I), (IA), or (IB), $R^1$ is methyl and $R^2$, $R^3$, and $R^4$ are independently an optionally substituted $C_6$-$C_{30}$ linear alkyl group, such as n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-henicosyl, n-docosyl, n-tricosyl, n-tetracosyl, n-pentacosyl, n-hexacosyl, n-heptacosyl, n-octacosyl, n-nonacosyl, or n-tricontyl. In some embodiments of Formulas (I), (IA), or (IB), $R^3$ is methyl and $R^1$, $R^2$, and $R^4$ are independently an optionally substituted $C_6$-$C_{30}$ linear alkyl group, such as n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-henicosyl, n-docosyl, n-tricosyl, n-tetracosyl, n-pentacosyl, n-hexacosyl, n-heptacosyl, n-octacosyl, n-nonacosyl, or n-tricontyl.

In some embodiments of Formulas (I), (IA), or (IB), $R^2$ is an optionally substituted $C_{18}$ aliphatic hydrocarbyl. In some embodiments of Formulas (I), (IA), or (IB), $R^4$ is an optionally substituted $C_{18}$ aliphatic hydrocarbyl. In some embodiments of Formulas (I), (IA), or (IB), $R^2$ and $R^4$ are independently an optionally substituted $C_{18}$ aliphatic hydrocarbyl. In some embodiments of Formulas (I), (IA), or (IB), $R^1$ is methyl and $R^2$ is an optionally substituted $C_{18}$ linear aliphatic hydrocarbyl. In some embodiments of Formulas (I), (IA), or (IB), $R^3$ is methyl and $R^4$ is an optionally substituted $C_{18}$ linear aliphatic hydrocarbyl. In some embodiments of Formulas (I), (IA), or (IB), $R^1$ and $R^3$ are methyl and $R^2$ and $R^4$ are independently an optionally substituted $C_{18}$ linear aliphatic hydrocarbyl.

In some embodiments of Formulas (I), (IA), or (IB), each of $R^5$, $R^6$, $R^7$, and $R^8$ is a fluorinated $C_6$-$C_{24}$ hydrocarbyl group. In some embodiments of Formulas (I), (IA), or (IB), each of $R^5$, $R^6$, $R^7$, and $R^8$ is independently a $C_6$-$C_{24}$ aromatic hydrocarbyl or a substituted $C_6$-$C_{24}$ aromatic hydrocarbyl. In some embodiments of Formulas (I), (IA), or (IB), each of $R^5$, $R^6$, $R^7$, and $R^8$ is a $C_6$-$C_{24}$ fluorinated aromatic hydrocarbyl group. In some embodiments of Formulas (I), (IA), or (IB), each of $R^5$, $R^6$, $R^7$, and $R^8$ is a $C_6$-$C_{24}$ perfluorinated aromatic hydrocarbyl group, such as pentafluorophenyl or heptafluoronaphthyl. In some embodiments of Formulas (I), (IA), or (IB), all of $R^5$, $R^6$, $R^7$, and $R^8$ are a substituted phenyl, such as pentafluorophenyl. In some embodiments of Formulas (I), (IA), or (IB), at least one of $R^5$, $R^6$, $R^7$, and $R^8$ is not a substituted phenyl, such as pentafluorophenyl. In at least one embodiment of Formulas (I), (IA), or (IB), all of $R^5$, $R^6$, $R^7$, and $R^8$ are not a substituted phenyl, such as pentafluorophenyl. In some embodiments of Formulas (I), (IA), or (IB), all of $R^5$, $R^6$, $R^7$, and $R^8$ are a substituted naphthyl, such as heptafluoronaphthyl. Additionally, further examples of suitable [$QR^5R^6R^7R^8$] include diboron compounds as disclosed in U.S. Pat. No. 5,447,895, incorporated by reference.

In some embodiments of Formulas (I), (IA), or (IB), $R^1$ is not methyl, $R^2$ is not $C_{18}$ alkyl and $R^3$ is not $C_{18}$ alkyl, alternately $R^1$ is not methyl, $R^2$ is not $C_{18}$ alkyl and $R^3$ is not $C_{18}$ alkyl and at least one $R^5$, $R^6$, $R^7$, and $R^8$ is not substituted phenyl, such as all $R^5$, $R^6$, $R^7$, and $R^8$ are not substituted phenyl.

In some embodiments of Formulas (I), (IA), or (IB), $R^1$, $R^2$, $R^3$, and $R^4$ together include 15 or more carbon atoms, such as 18 or more carbon atoms, such as 20 or more carbon atoms, such as 22 or more carbon atoms, such as 25 or more carbon atoms, such as 30 or more carbon atoms, such as 35 or more carbon atoms, such as 37 or more carbon atoms, such as 40 or more carbon atoms, such as 45 or more carbon atoms such as 15 to 100 carbon atoms, such as 23 to 75 carbon atoms, such as 38 to 70 carbon atoms.

In some embodiments the activator is selected from the group consisting of:

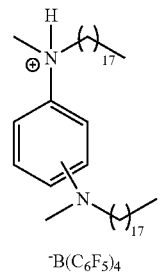

1

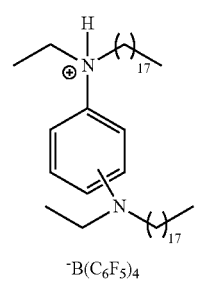

2

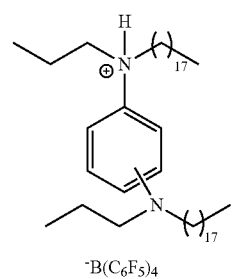

3

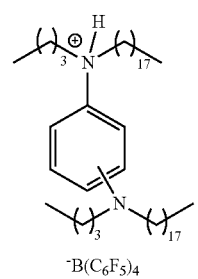

4

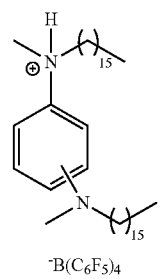

5

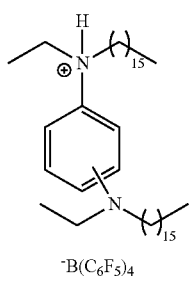
⁻B(C₆F₅)₄
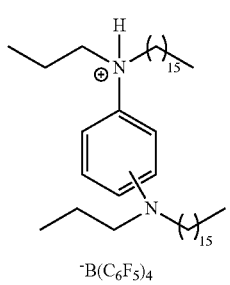
⁻B(C₆F₅)₄
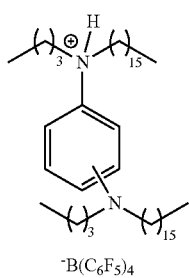
⁻B(C₆F₅)₄
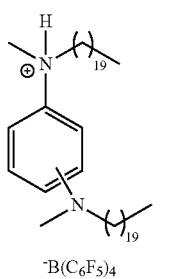
⁻B(C₆F₅)₄
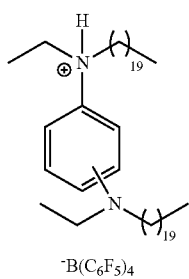
⁻B(C₆F₅)₄
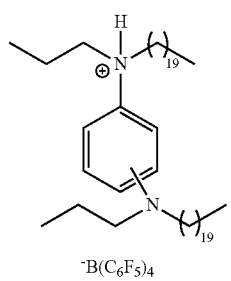
⁻B(C₆F₅)₄
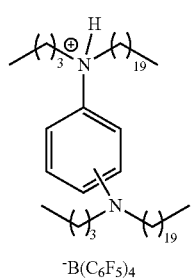
⁻B(C₆F₅)₄
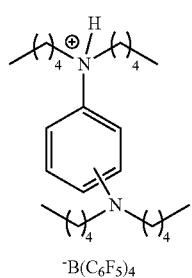
⁻B(C₆F₅)₄
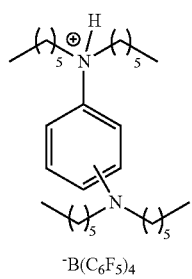
⁻B(C₆F₅)₄
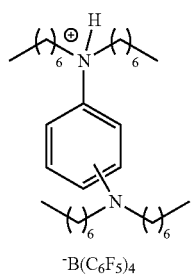
⁻B(C₆F₅)₄

16
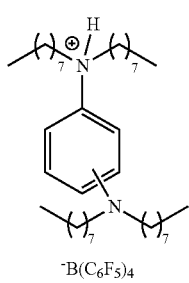
17
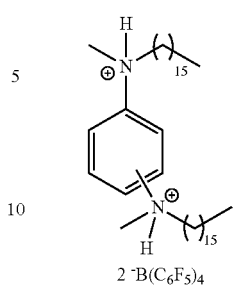
18
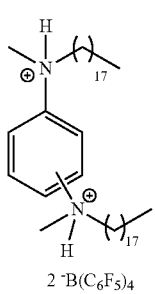
19
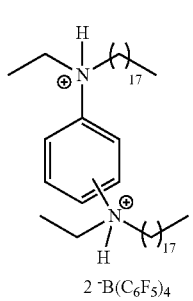
20
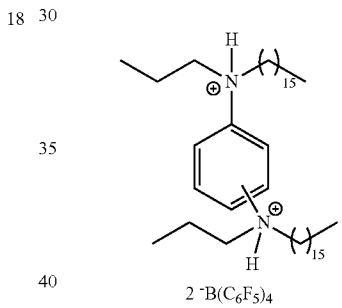
21
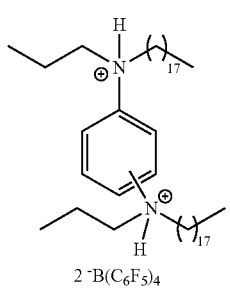
22
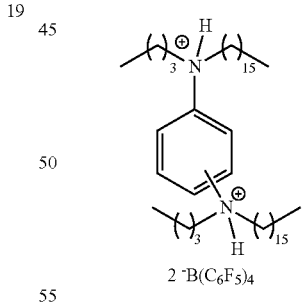
23
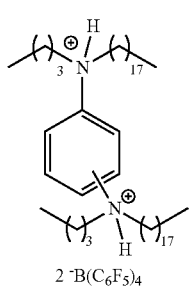
24
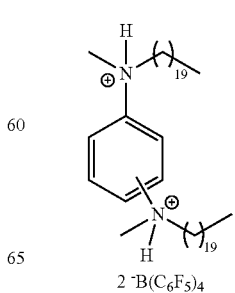
25

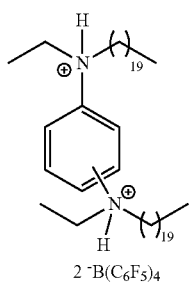
26
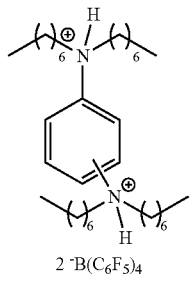
31
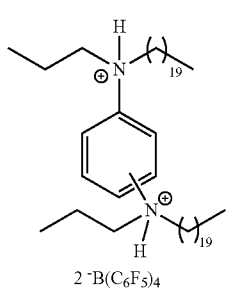
27
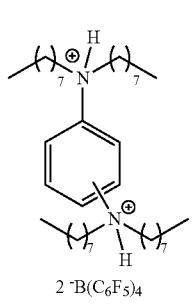
32
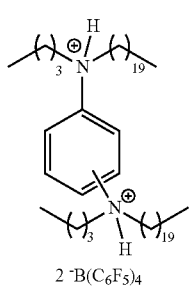
28
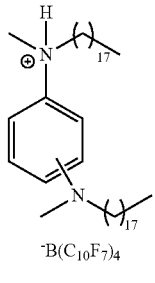
33
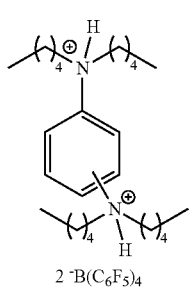
29
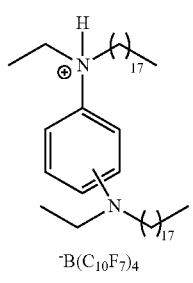
34
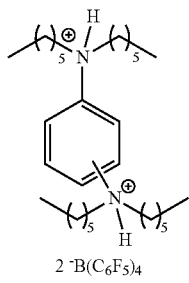
30
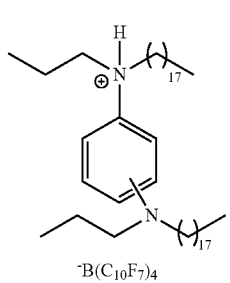
35

-continued
36
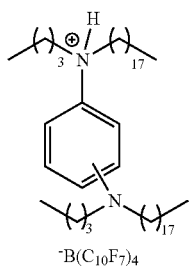
37
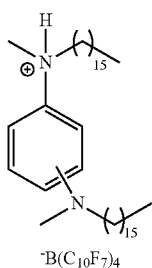
38
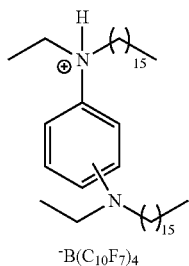
39
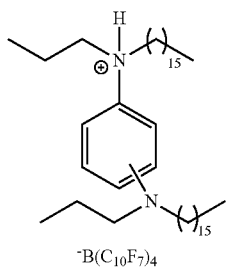
40
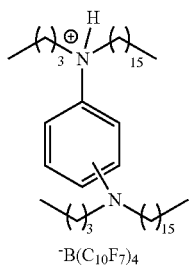
41
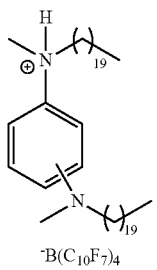
-continued
42
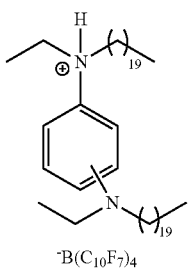
43
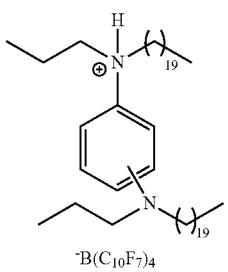
44
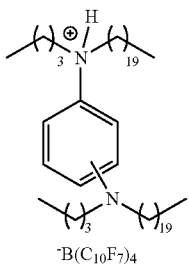
45
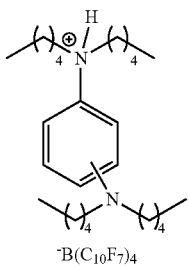
46
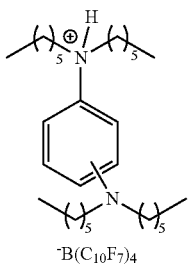
47
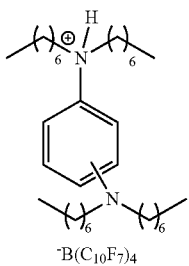

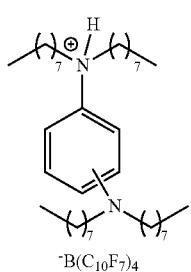
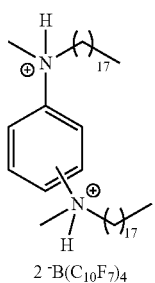
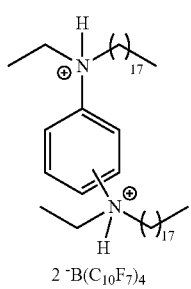
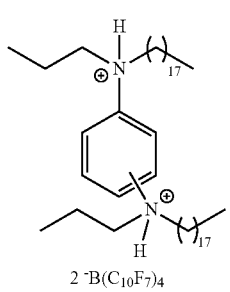
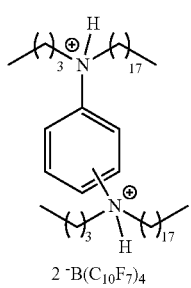
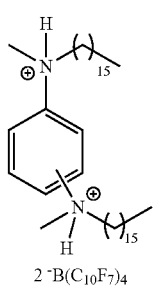
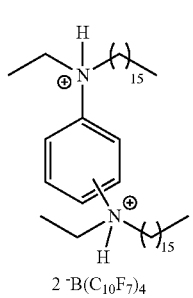
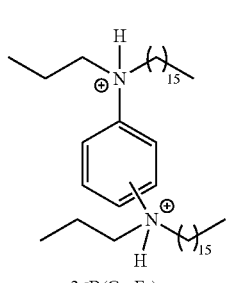
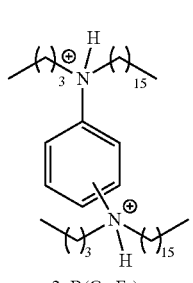
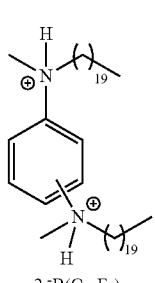

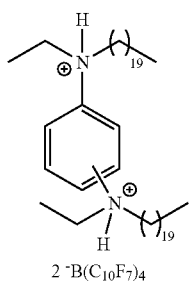
58
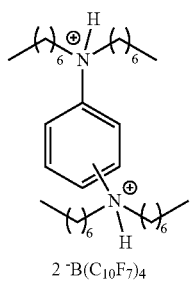
63
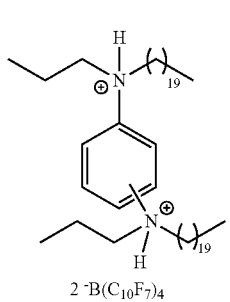
59
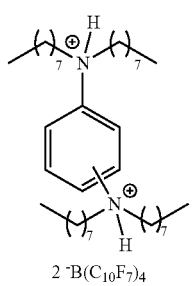
64
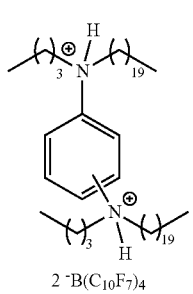
60
In some embodiments the activator is selected from the group consisting of:
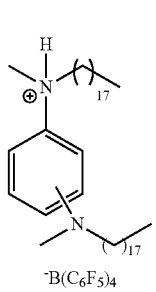
1
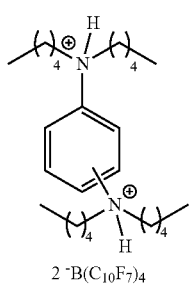
61
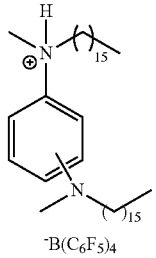
2
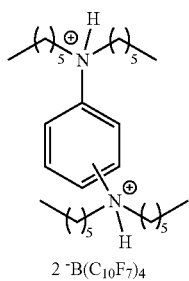
62
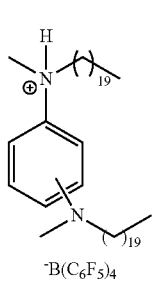
3

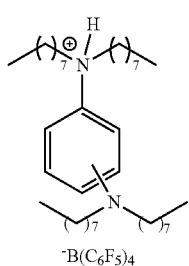
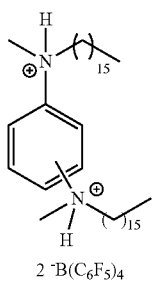
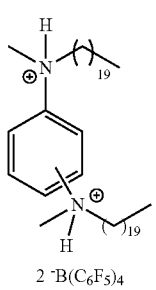
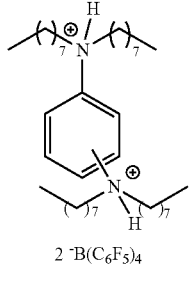
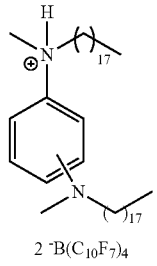
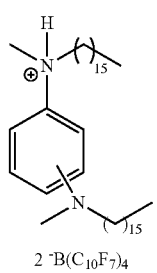
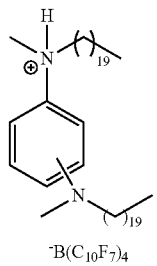
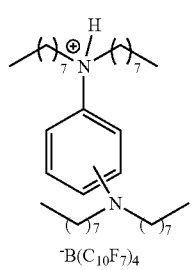
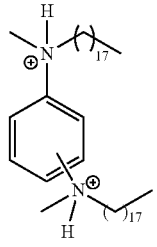
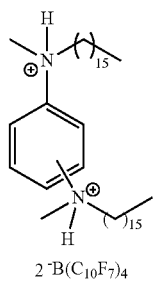

-continued

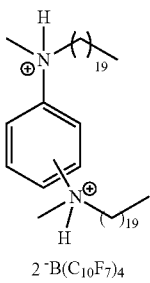

2 ⁻B(C₁₀F₇)₄

15

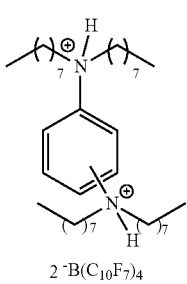

2 ⁻B(C₁₀F₇)₄

16

Activators—The Cations

The cation component of the activators of the present disclosure (such as those of Formulas (I), (IA), and (TB) above), is a protonated Lewis base that can be capable of protonating a moiety, such as an alkyl or aryl, from the transition metal compound. Thus, upon release of a neutral leaving group (e.g. an alkane resulting from the combination of a proton donated from the cationic component of the activator and an alkyl substituent of the transition metal compound) transition metal cation results, which is the catalytically active species. The cation component of the activators described may be a monocation, dication, trication, or tetracation.

In some embodiments of Formulas (I), (IA), or (IB), the cation is [Ar(E¹R¹R²H)x(E²R³R⁴)y], and Ar is a $C_6$-$C_{30}$ aromatic hydrocarbyl group, provided that if Ar is a multicyclic ring, then each $E^1$ and each $E^2$ are substitutions on a single ring of the multicyclic ring; x is 1 to 4; y is 0 to 3; x+y is 2 to 6; each of $E^1$ and $E^2$ are independently selected from nitrogen or phosphorous; and each of $R^1$, $R^2$, $R^3$, and $R^4$ are independently selected from $C_1$-$C_{40}$ aliphatic hydrocarbyl, substituted $C_1$-$C_{40}$ aliphatic hydrocarbyl, where $R^1$, $R^2$, $R^3$, and $R^4$ together include 15 or more carbon atoms.

In some embodiments of Formulas (I), (IA), or (IB), $R^1$, $R^2$, $R^3$, and $R^4$ together include 15 or more carbon atoms, such as 18 or more carbon atoms, such as 20 or more carbon atoms, such as 22 or more carbon atoms, such as 25 or more carbon atoms, such as 30 or more carbon atoms, such as 35 or more carbon atoms, such as 37 or more carbon atoms, such as 40 or more carbon atoms, such as 45 or more carbon atoms such as 15 to 100 carbon atoms, such as 23 to 75 carbon atoms, such as 38 to 70 carbon atoms.

In at least one embodiment, the cation is selected from the group consisting of:

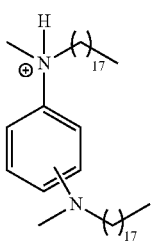

1

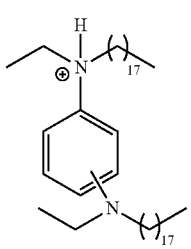

2

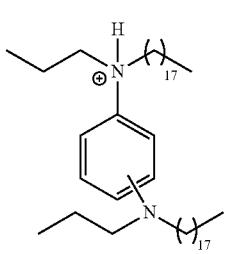

3

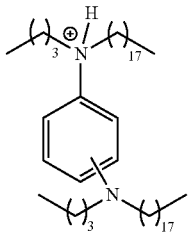

4

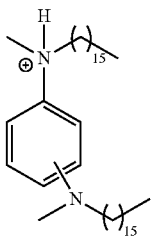

5

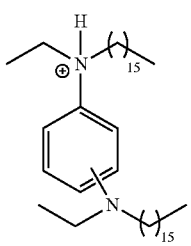

6

-continued
7
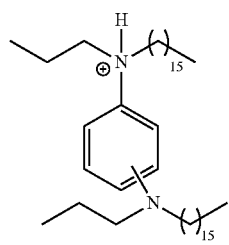
8
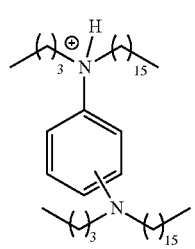
9
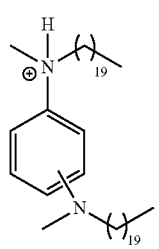
10
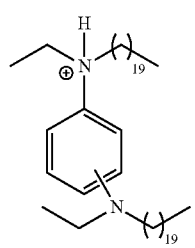
11
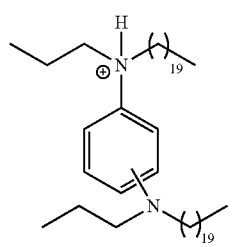
12
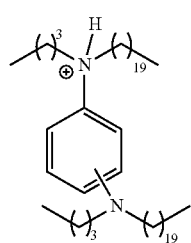
-continued
13
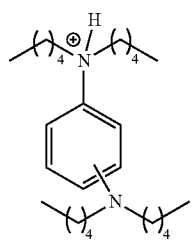
14
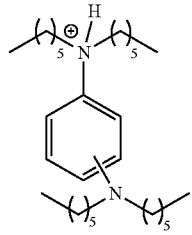
15
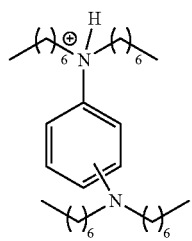
16
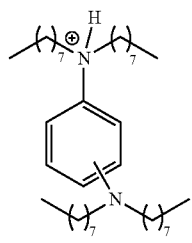
17
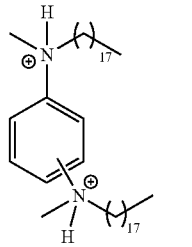
18
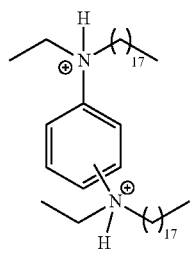

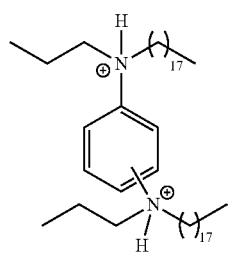
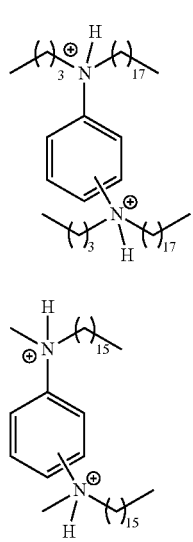
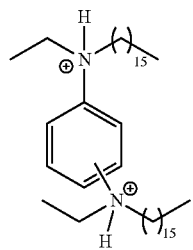
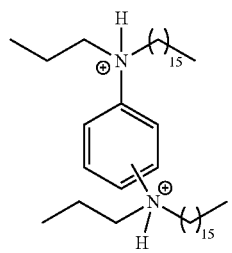
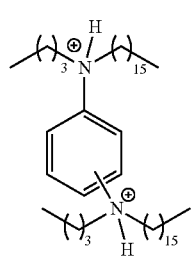
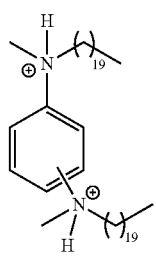
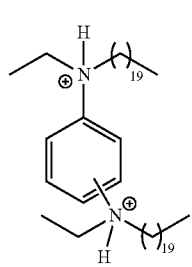
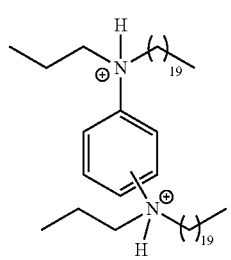
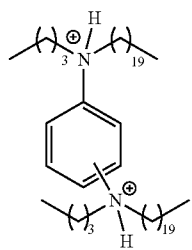
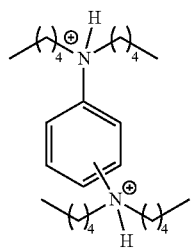
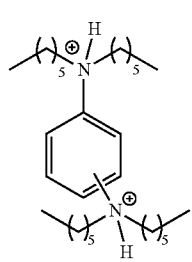

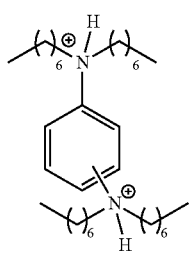

31

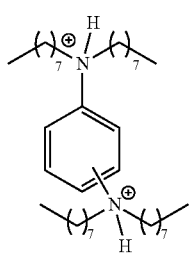

32

In at least one embodiment, the cation is selected from the group consisting of:

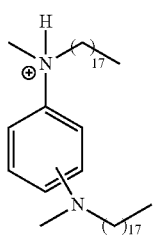

1

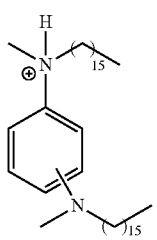

2

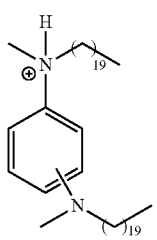

3

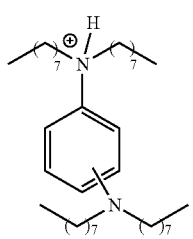

4

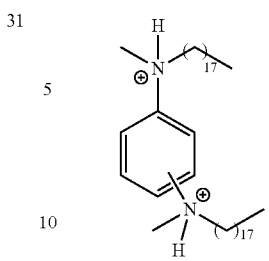

5

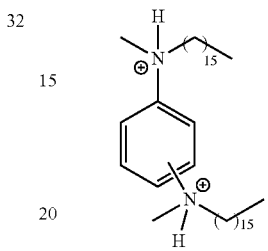

6

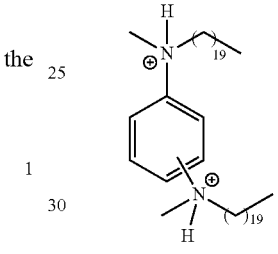

7

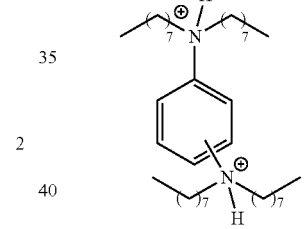

8

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

In at least one embodiment, little or no scavenger is used in the process to produce the ethylene polymer. Scavenger (such as trialkyl aluminum) can be present at zero mol %, alternately the scavenger is present at a molar ratio of scavenger metal to transition metal of less than 100:1, such as less than 50:1, such as less than 15:1, such as less than 10:1.

Transition Metal Catalyst Compounds

A transition metal compound capable of catalyzing a reaction, such as a polymerization reaction, upon activation with an activator as described above is suitable for use in polymerization processes of the present disclosure. Transition metal compounds including metallocenes are exemplary catalyst compounds according to the present disclosure.

In at least one embodiment, the present disclosure provides a catalyst system including a catalyst compound having a metal atom. The catalyst compound can be a metallocene catalyst compound. The metal can be a Group 3 through Group 12 metal atom, such as Group 3 through Group 10 metal atoms, or lanthanide Group atoms. The catalyst compound having a Group 3 through Group 12 metal atom can be monodentate or multidentate, such as bidentate, tridentate, or tetradentate, where a heteroatom of the catalyst, such as phosphorous, oxygen, nitrogen, or sulfur is chelated to the metal atom of the catalyst. Non-limiting examples include bis(phenolate)s. In at least one embodiment, the Group 3 through Group 12 metal atom is selected from Group 5, Group 6, Group 8, or Group 10 metal atoms. In at least one embodiment, a Group 3 through Group 10 metal atom is selected from Cr, Sc, Ti, Zr, Hf, V, Nb, Ta, Mn, Re, Fe, Ru, Os, Co, Rh, Ir, and Ni. In at least one embodiment, a metal atom is selected from Groups 4, 5, and 6 metal atoms. In at least one embodiment, a metal atom is a Group 4 metal atom selected from Ti, Zr, or Hf. The oxidation state of the metal atom can be from 0 to +7, for example +1, +2, +3, +4, or +5, for example +2, +3, or +4.

Metallocene Catalyst Compounds

A "metallocene" catalyst compound is a transition metal catalyst compound having one, two or three, typically one or two, substituted or unsubstituted cyclopentadienyl ligands (such as substituted or unsubstituted Cp, Ind or Flu) bound to the transition metal. Metallocene catalyst compounds include metallocenes including Group 3 to Group 12 metal complexes, such as, Group 4 to Group 6 metal complexes, for example, Group 4 metal complexes. The metallocene catalyst compound of catalyst systems of the present disclosure may be unbridged metallocene catalyst compounds represented by the formula: $Cp^A Cp^B M'X'_n$, where each $Cp^A$ and $Cp^B$ is independently selected from cyclopentadienyl ligands (for example, Cp, Ind, or Flu) and ligands isolobal to cyclopentadienyl, one or both $Cp^A$ and $Cp^B$ may contain heteroatoms, and one or both $Cp^A$ and $Cp^B$ may be substituted by one or more R" groups; M' is selected from Groups 3 through 12 atoms and lanthanide Group atoms; X' is an anionic leaving group; n is 0 or an integer from 1 to 4; each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether.

In at least one embodiment, each $Cp^A$ and $Cp^B$ is independently selected from cyclopentadienyl, indenyl, fluorenyl, indacenyl, tetrahydroindenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated and substituted versions thereof. Each $Cp^A$ and $Cp^B$ may independently be indacenyl or tetrahydroindenyl.

The metallocene catalyst compound may be a bridged metallocene catalyst compound represented by the formula: $Cp^A(T)Cp^B M'X'_n$, where each $Cp^A$ and $Cp^B$ is independently selected from cyclopentadienyl ligands (for example, Cp, Ind, or Flu) and ligands isolobal to cyclopentadienyl, where one or both $Cp^A$ and $Cp^B$ may contain heteroatoms, and one or both $Cp^A$ and $Cp^B$ may be substituted by one or more R" groups; M' is selected from Groups 3 through 12 atoms and lanthanide Group atoms, such as Group 4; X' is an anionic leaving group; n is 0 or an integer from 1 to 4; (T) is a bridging group selected from divalent alkyl, divalent substituted alkyl, divalent heteroalkyl, divalent alkenyl, divalent substituted alkenyl, divalent heteroalkenyl, divalent alkynyl, divalent substituted alkynyl, divalent heteroalkynyl, divalent alkoxy, divalent aryloxy, divalent alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether. R" is selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, germanium, ether, and thioether.

In at least one embodiment, each of $Cp^A$ and $Cp^B$ is independently selected from cyclopentadienyl, indenyl, fluorenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated, and substituted versions thereof, such as cyclopentadienyl, n-propylcyclopentadienyl, indenyl, pentamethylcyclopentadienyl, tetramethylcyclopentadienyl, and n-butylcyclopentadienyl. Each $Cp^A$ and $Cp^B$ may independently be indacenyl or tetrahydroindenyl.

(T) is a bridging group containing at least one Group 13, 14, 15, or 16 element, such as boron or a Group 14, 15 or 16 element. In some embodiments, (T) is O, S, NR', or SiR'$_2$, where each R' is independently hydrogen or $C_1$-$C_{20}$ hydrocarbyl.

In another embodiment, the metallocene catalyst compound is represented by the formula:

$$T_y Cp_m MG_n X_q$$

where Cp is independently a substituted or unsubstituted cyclopentadienyl ligand (for example, substituted or unsubstituted Cp, Ind, or Flu) or substituted or unsubstituted ligand isolobal to cyclopentadienyl; M is a Group 4 transition metal; G is a heteroatom group represented by the formula $JR^*_z$ where J is N, P, O or S, and R* is a linear, branched, or cyclic $C_1$-$C_{20}$ hydrocarbyl; z is 1 or 2; T is a bridging group; y is 0 or 1; X is a leaving group; m=1, n=1, 2 or 3, q=0, 1, 2 or 3, and the sum of m+n+q is equal to the coordination number of the transition metal.

In at least one embodiment, J is N, and R* is methyl, ethyl, propyl, butyl, pentyl, hexyl, heptyl, octyl, nonyl, cyclooctyl, cyclododecyl, decyl, undecyl, dodecyl, adamantyl or an isomer thereof.

In at least one embodiment, the catalyst compound is represented by Formula (II) or Formula (III):

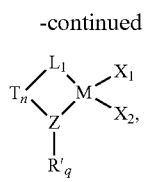
(III)

where in each of Formula (II) and Formula (III):
M is the metal center, and is a Group 4 metal, such as titanium, zirconium or hafnium, such as zirconium or hafnium when $L_1$ and $L_2$ are present and titanium when Z is present;
n is 0 or 1;
T is an optional bridging group which, if present, is a bridging group containing at least one Group 13, 14, 15, or 16 element, such as boron or a Group 14, 15 or 16 element, such as T is selected from dialkylsilyl, diarylsilyl, dialkylmethyl, ethylenyl (—CH$_2$—CH$_2$—) or hydrocarbylethylenyl where one, two, three or four of the hydrogen atoms in ethylenyl are substituted by hydrocarbyl, where hydrocarbyl can be independently $C_1$ to $C_{16}$ alkyl or phenyl, tolyl, xylyl and the like), and when T is present, the catalyst represented can be in a racemic or a meso form;
$L_1$ and $L_2$ are independently cyclopentadienyl, indenyl, tetrahydroindenyl or fluorenyl, optionally substituted, that are each bonded to M, or $L_1$ and $L_2$ are independently cyclopentadienyl, indenyl, tetrahydroindenyl or fluorenyl, which are optionally substituted, in which two adjacent substituents on $L_1$ and $L_2$ are optionally joined to form a substituted or unsubstituted, saturated, partially unsaturated, or aromatic cyclic or polycyclic substituent;
Z is nitrogen, oxygen, sulfur, or phosphorus;
q is 1 or 2;
R' is a cyclic, linear or branched $C_1$ to $C_{40}$ alkyl or substituted alkyl group;
$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or $X_1$ and $X_2$ are joined and bound to the metal atom to form a metallacycle ring containing from about 3 to about 20 carbon atoms; or both together can be an olefin, diolefin or aryne ligand.

In some embodiments of Formulas (II) or (III), Z is N. In some embodiments of Formulas (II) or (III), when Z is N then q is 1.

In some embodiments of Formulas (II) or (III), T is present and is a bridging group containing at least one Group 13, 14, 15, or 16 element, such as a Group 14 element. Examples of suitable bridging groups include P(=S)R', P(=Se)R', P(=O)R', R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$SiOSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', R'$_2$C—PR'—CR'$_2$, O, S, Se, Te, NR', PR', AsR', SbR', O—O, S—S, R'N—NR', R'P—PR', O—S, O—NR', O—PR', S—NR', S—PR', and R'N—PR' where R' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Suitable examples for the bridging group T include CH$_2$, CH$_2$CH$_2$, SiMe$_2$, SiPh$_2$, SiMePh, Si(CH$_2$)$_3$, Si(CH$_2$)$_4$, O, S, NPh, PPh, NMe, PMe, NEt, NPr, NBu, PEt, PPr, Me$_2$SiOSiMe$_2$, and PBu.

In some embodiments of Formulas (II) or (III), T is represented by the formula R$^a{}_2$J or (R$^a{}_2$J)$_2$, where J is C, Si, or Ge, and each R$^a$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two R$^a$ can form a cyclic structure including aromatic, partially saturated, or saturated cyclic or fused ring system. In some embodiments of Formulas (II) or (III), T is a bridging group including carbon or silica, such as dialkylsilyl, such as where T is selected from CH$_2$, CH$_2$CH$_2$, C(CH$_3$)$_2$, SiMe$_2$, SiPh$_2$, SiMePh, silylcyclobutyl (Si(CH$_2$)$_3$), (Ph)$_2$C, (p-(Et)$_3$SiPh)$_2$C, Me$_2$SiOSiMe$_2$, and cyclopentasilylene (Si(CH$_2$)$_4$).

In at least one embodiment of Formulas (II) or (III), the catalyst compound has a symmetry that is $C_2$ symmetrical.

The metallocene catalyst component may include a combination of two or more of the "embodiments" of the present disclosure.

Suitable metallocenes include the metallocenes disclosed and referenced in the US patents cited above, as well as those disclosed and referenced in U.S. Pat. Nos. 7,179,876; 7,169,864; 7,157,531; 7,129,302; 6,995,109; 6,958,306; 6,884,748; 6,689,847; US Patent publication 2007/0055028, and published PCT Applications WO 1997/22635; WO 2000/069922; WO 2001/030860; WO 2001/030861; WO 2002/046246; WO 2002/050088; WO2004/026921; and WO 2006/019494, all incorporated by reference. Additional suitable catalysts include those referenced in U.S. Pat. Nos. 6,309,997; 6,265,338; US Patent publication 2006/019925, and the following articles: Resconi, L. et al. (2000) "Selectivity in Propene Polymerization with Metallocene Catalysts," *Chem. Rev.*, v. 100(4), pp. 1253-1346; Gibson, V. C. et al. (2003) "Advances in Non-Metallocene Olefin Polymerization Catalysis," *Chem. Rev.*, v. 103(1), pp. 283-316; Nakayama, Y. et al. (2006) "MgCl$_2$/R'$_n$Al(OR)$_{3-n}$: An Excellent Activator/Support for Transition-Metal Complexes for Olefin Polymerization," *Chem. Eur. J*, v. 12, p. 7546-7556; Nakayama, Y et al. (2004), "Olefin Polymerization Behavior of bis(phenoxy-imine) Zr, Ti, and V complexes with MgCl$_2$-based Cocatalysts," *J. Mol. Catalysis A: Chemical*, v. 213, pp. 141-150; Nakayama, Y. et al. (2005), "Propylene Polymerization Behavior of Fluorinated Bis(phenoxy-imine) Ti Complexes with an MgCl$_2$-Based Compound (MgCl$_2$—Supported Ti-Based Catalysts)," *Macromol. Chem. Phys.*, v. 206(18), pp. 1847-1852; and Matsui, S. et al. (2001) "A Family of Zirconium Complexes Having Two Phenoxy-Imine Chelate Ligands for Olefin Polymerization," *J Am. Chem. Soc.*, v. 123(28), pp. 6847-6856.

Exemplary metallocene compounds useful in the present disclosure include:
bis(cyclopentadienyl)zirconium dichloride,
bis(n-butylcyclopentadienyl)zirconium dichloride, bis(n-butylcyclopentadienyl)zirconium dimethyl,
bis(pentamethylcyclopentadienyl)zirconium dichloride,
bis(pentamethylcyclopentadienyl)zirconium dimethyl,
bis(pentamethylcyclopentadienyl)hafnium dichloride,
bis(pentamethylcyclopentadienyl)zirconium dimethyl,
bis(1-methyl-3-n-butylcyclopentadienyl)zirconium dichloride,
bis(1-methyl-3-n-butylcyclopentadienyl)zirconium dimethyl,
bis(1-methyl-3-n-butylcyclopentadienyl)hafnium dichloride,
bis(1-methyl-3-n-butylcyclopentadienyl)zirconium dimethyl,
bis(indenyl)zirconium dichloride, bis(indenyl)zirconium dimethyl,
bis(tetrahydro-1-indenyl)zirconium dichloride,
bis(tetrahydro-1-indenyl)zirconium dimethyl,
(n-propyl cyclopentadienyl, pentamethyl cyclopentadienyl) zirconium dichloride, and
(n-propyl cyclopentadienyl, pentamethyl cyclopentadienyl) zirconium dimethyl.

In at least one embodiment, the catalyst compound may be selected from:
dimethylsilylbis(tetrahydroindenyl)MX$_n$,
dimethylsilyl bis(2-methylindenyl)MX$_n$,
dimethylsilyl bis(2-methylfluorenyl)MX$_n$,
dimethylsilyl bis(2-methyl-5,7-propylindenyl)MX$_n$,
dimethylsilyl bis(2-methyl-4-phenylindenyl)MX$_n$,
dimethylsilyl bis(2-ethyl-5-phenylindenyl)MX$_n$,
dimethylsilyl bis(2-methyl-4-biphenylindenyl)MX$_n$,
dimethylsilylene bis(2-methyl-4-carbazolylindenyl)MX$_n$,
rac-dimethylsilyl-bis-(5,6,7,8-tetrahydro-5,5,8,8-tetramethyl-2-methyl-1H-benz(f)indene)MX$_n$,
diphenylmethylene (cyclopentadienyl)(fluoreneyl)MX$_n$,
bis(methylcyclopentadienyl)MX$_n$,
rac-dimethylsiylbis(2-methyl,3-propyl indenyl)MX$_n$,
dimethylsilylbis(indenyl)MX$_n$,
Rac-meso-diphenylsilyl-bis(n-propylcyclopentadienyl) MX$_n$,
1,1'-bis(4-triethylsilylphenyl)methylene-(cyclopentadienyl) (3,8-di-tertiary-butyl-1-fluorenyl)MX$_n$ (bridge is considered the 1 position),
bis-trimethylsilylphenyl-methylene(cyclopentadienyl)(di-t-butylfluorenyl)MX$_n$,
bis-trimethylsilylphenyl-methylene(cyclopentadienyl)(fluorenyl)MX$_n$,
bisphenylmethylene(cyclopentadienyl)(dimethylfluorenyl) MX$_n$,
bis(n-propylcyclopentadienyl)MX$_n$,
bis(n-butylcyclopentadienyl)MX$_n$,
bis(n-pentylcyclopentadienyl)MX$_n$,
(n-propyl cyclopentadienyl)(n-butylcyclopentadienyl)MX$_n$,
bis[(2-trimethylsilylethyl)cyclopentadienyl]MX$_n$,
bis(trimethylsilyl cyclopentadienyl)MX$_n$,
dimethylsilylbis(n-propylcyclopentadienyl)MX$_n$,
dimethylsilylbis(n-butylcyclopentadienyl)MX$_n$,
bis(1-n-propyl-2-methylcyclopentadienyl)MX$_n$,
(n-propylcyclopentadienyl)(1-n-propyl-3-n-butylcyclopentadienyl)MX$_n$,
bis(1-methyl, 3-n-butyl cyclopentadienyl)MX$_n$,
bis(indenyl)MX$_n$,
dimethylsilyl (tetramethylcyclopentadienyl)(cyclododecylamido)MX$_n$,
dimethylsilyl (tetramethylcyclopentadienyl)(t-butylamido) MX$_n$,
μ-(CH$_3$)$_2$Si(cyclopentadienyl)(1-adamantylamido)MX$_n$,
μ-(CH$_3$)$_2$Si(3-tertbutylcyclopentadienyl)(1-adamantylamido)MX$_n$,
μ-(CH$_3$)$_2$(tetramethylcyclopentadienyl)(1-adamantylamido) MX$_n$,
μ-(CH$_3$)$_2$Si(tetramethylcyclopentadienyl)(1-adamantylamido)MX$_n$,
μ-(CH$_3$)$_2$C(tetramethylcyclopentadienyl)(1-adamantylamido)MX$_n$,
μ-(CH$_3$)$_2$Si(tetramethylcyclopentadienyl)(1-tertbutylamido) MX$_n$,
μ-(CH$_3$)$_2$Si(fluorenyl)(1-tertbutylamido)MX$_n$,
μ-(CH$_3$)$_2$Si(tetramethylcyclopentadienyl)(1-cyclododecylamido)MX$_n$,
μ-(C$_6$H$_5$)$_2$C(tetramethylcyclopentadienyl)(1-cyclododecylamido)MX$_n$,
μ-(CH$_3$)$_2$Si(η$^5$-2,6,6-trimethyl-1,5,6,7-tetrahydro-s-indacen-1-yl)(tertbutylamido)MX$_n$,
where M is selected from Ti, Zr, and Hf; where X is selected from the group consisting of halogens, hydrides, C$_{1-12}$ alkyls, C$_{2-12}$ alkenyls, C$_{6-12}$ aryls, C$_{7-20}$ alkylaryls, C$_{1-12}$ alkoxys, C$_{6-16}$ aryloxys, C$_{7-18}$ alkylaryloxys, C$_{1-12}$ fluoroalkyls, C$_{6-12}$ fluoroaryls, and C$_{1-12}$ heteroatom-containing hydrocarbons, substituted derivatives thereof, and combinations thereof, and where n is zero or an integer from 1 to 4. In some embodiments, X is selected from halogens (such as bromide, fluoride, chloride), or C$_1$ to C$_{20}$ alkyls (such as methyl, ethyl, propyl, butyl, and pentyl) and n is 1 or 2, such as n is 2.

In other embodiments, the catalyst is one or more of.
bis(1-methyl, 3-n-butyl cyclopentadienyl) M(R)$_2$;
dimethylsilyl bis(indenyl)M(R)$_2$;
bis(indenyl)M(R)$_2$;
dimethylsilyl bis(tetrahydroindenyl)M(R)$_2$;
bis(n-propylcyclopentadienyl)M(R)$_2$;
dimethylsilyl (tetramethylcyclopentadienyl)(cyclododecylamido)M(R)$_2$;
dimethylsilyl (tetramethylcyclopentadienyl)(cyclododecylamido)M(R)$_2$;
dimethylsilyl (tetramethylcyclopentadienyl)(t-butylamido) M(R)$_2$;
dimethylsilyl (tetramethylcyclopentadienyl)(t-butylamido) M(R)$_2$;
μ-(CH$_3$)$_2$Si(cyclopentadienyl)(1-adamantylamido)M(R)$_2$;
μ-(CH$_3$)$_2$Si(3-tertbutylcyclopentadienyl)(1-adamantylamido)M(R)$_2$;
μ-(CH$_3$)$_2$(tetramethylcyclopentadienyl)(1-adamantylamido) M(R)$_2$;
μ-(CH$_3$)$_2$Si(tetramethylcyclopentadienyl)(1-adamantylamido)M(R)$_2$;
μ-(CH$_3$)$_2$C(tetramethylcyclopentadienyl)(1-adamantylamido)M(R)$_2$;
μ-(CH$_3$)$_2$Si(tetramethylcyclopentadienyl)(1-tertbutylamido) M(R)$_2$;
μ-(CH$_3$)$_2$Si(fluorenyl)(1-tertbutylamido)M(R)$_2$;
μ-(CH$_3$)$_2$Si(tetramethylcyclopentadienyl)(1-cyclododecylamido)M(R)$_2$;
μ-(C$_6$H$_5$)$_2$C(tetramethylcyclopentadienyl)(1-cyclododecylamido)M(R)$_2$;
μ-(CH$_3$)$_2$Si(η$^5$-2,6,6-trimethyl-1,5,6,7-tetrahydro-s-indacen-1-yl)(tertbutylamido)M(R)$_2$;
where M is selected from Ti, Zr, and Hf; and R is selected from halogen or C$_1$ to C$_5$ alkyl.

In some embodiments of the present disclosure, the catalyst compound is one or more of.
dimethylsilyl (tetramethylcyclopentadienyl)(cyclododecylamido)titanium dimethyl;

dimethylsilyl (tetramethylcyclopentadienyl)(cyclododecylamido)titanium dimethyl;
dimethylsilyl (tetramethylcyclopentadienyl)(t-butylamido) titanium dimethyl;
dimethylsilyl (tetramethylcyclopentadienyl)(t-butylamido) titanium dimethyl;
μ-$(CH_3)_2$Si(cyclopentadienyl)(1-adamantylamido)titanium dimethyl;
μ-$(CH_3)_2$Si(3-tertbutylcyclopentadienyl)(1-adamantylamido)titanium dimethyl;
μ-$(CH_3)_2$(tetramethylcyclopentadienyl)(1-adamantylamido) titanium dimethyl;
μ-$(CH_3)_2$Si(tetramethylcyclopentadienyl)(1-adamantylamido)titanium dimethyl;
μ-$(CH_3)_2$C(tetramethylcyclopentadienyl)(1-adamantylamido)titanium dimethyl;
μ-$(CH_3)_2$Si(tetramethylcyclopentadienyl)(1-tertbutylamido) titanium dimethyl$_2$;
μ-$(CH_3)_2$Si(fluorenyl)(1-tertbutylamido)titanium dimethyl;
μ-$(CH_3)_2$Si(tetramethylcyclopentadienyl)(1-cyclododecylamido)titanium dimethyl;
μ-$(C_6H_5)_2$C(tetramethylcyclopentadienyl)(1-cyclododecylamido)titanium dimethyl; and/or
μ-$(CH_3)_2$Si($\eta^5$-2,6,6-trimethyl-1,5,6,7-tetrahydro-s-indacen-1-yl)(tertbutylamido)titanium dimethyl.

In at least one embodiment, the catalyst is rac-dimethylsilyl-bis(indenyl)hafnium dimethyl (MCN-1) and or 1, 1'-bis(4-triethylsilylphenyl)methylene-(cyclopentadienyl)(3,8-di-tertiary-butyl-1-fluorenyl)hafnium dimethyl (MCN-2).

In at least one embodiment, the catalyst compound is one or more of:
bis(1-methyl, 3-n-butyl cyclopentadienyl)hafnium dimethyl,
bis(1-methyl, 3-n-butyl cyclopentadienyl)zirconium dimethyl,
dimethylsilyl bis(indenyl)zirconium dimethyl,
dimethylsilyl bis(indenyl)hafnium dimethyl,
bis(indenyl)zirconium dimethyl,
bis(indenyl)hafnium dimethyl,
dimethylsilyl bis(tetrahydroindenyl)zirconium dimethyl,
bis(n-propylcyclopentadienyl)zirconium dimethyl,
dimethylsilylbis(tetrahydroindenyl)hafnium dimethyl,
dimethylsilyl bis(2-methylindenyl)zirconium dimethyl,
dimethylsilyl bis(2-methylfluorenyl)zirconium dimethyl,
dimethylsilyl bis(2-methylindenyl)hafnium dimethyl,
dimethylsilyl bis(2-methylfluorenyl)hafnium dimethyl,
dimethylsilyl bis(2-methyl-5,7-propylindenyl) zirconium dimethyl,
dimethylsilyl bis(2-methyl-4-phenylindenyl) zirconium dimethyl,
dimethylsilyl bis(2-ethyl-5-phenylindenyl) zirconium dimethyl,
dimethylsilyl bis(2-methyl-4-biphenylindenyl) zirconium dimethyl,
dimethylsilylene bis(2-methyl-4-carbazolylindenyl) zirconium dimethyl,
rac-dimethylsilyl-bis-(5,6,7,8-tetrahydro-5,5,8,8-tetramethyl-2-methyl-1H-benz(f)indene)hafnium dimethyl,
diphenylmethylene (cyclopentadienyl)(fluoreneyl)hafnium dimethyl,
bis(methylcyclopentadienyl)zirconium dimethyl,
rac-dimethylsiylbis(2-methyl,3-propyl indenyl)hafnium dimethyl,
dimethylsilylbis(indenyl)hafnium dimethyl,
dimethylsilylbis(indenyl)zirconium dimethyl,
rac-dimethylsilyl-bis-(5,6,7,8-tetrahydro-5,5,8,8-tetramethyl-2-methyl-1H-benz(f)indene)hafnium dimethyl,
Rac-meso-diphenylsilyl-bis(n-propylcyclopentadienyl)hafnium dimethyl,
1,1'-bis(4-triethylsilylphenyl)methylene-(cyclopentadienyl)(3,8-di-tertiary-butyl-1-fluorenyl)hafnium $X_n$ (bridge is considered the 1 position),
bis-trimethylsilylphenyl-methylene(cyclopentadienyl)(di-t-butylfluorenyl)hafnium dimethyl,
bis-trimethylsilylphenyl-methylene(cyclopentadienyl)(fluorenyl)hafnium dimethyl,
bisphenylmethylene(cyclopentadienyl)(dimethylfluorenyl) hafnium dimethyl,
bis(n-propylcyclopentadienyl)hafnium dimethyl,
bis(n-butylcyclopentadienyl)hafnium dimethyl,
bis(n-pentylcyclopentadienyl)hafnium dimethyl,
(n-propyl cyclopentadienyl)(n-butylcyclopentadienyl)hafnium dimethyl,
bis[(2-trimethylsilylethyl)cyclopentadienyl]hafnium dimethyl,
bis(trimethylsilyl cyclopentadienyl)hafnium dimethyl,
dimethylsilylbis(n-propylcyclopentadienyl)hafnium dimethyl,
dimethylsilylbis(n-butylcyclopentadienyl)hafnium dimethyl,
bis(1-n-propyl-2-methylcyclopentadienyl)hafnium dimethyl, and
(n-propylcyclopentadienyl)(1-n-propyl-3-n-butylcyclopentadienyl)hafnium dimethyl,
bis(n-propylcyclopentadienyl)hafnium dimethyl,
bis(n-butylcyclopentadienyl)hafnium dimethyl,
bis(n-pentylcyclopentadienyl)hafnium dimethyl,
(n-propyl cyclopentadienyl)(n-butylcyclopentadienyl)hafnium dimethyl,
bis[(2-trimethylsilylethyl)cyclopentadienyl]hafnium dimethyl,
bis(trimethylsilyl cyclopentadienyl)hafnium dimethyl,
dimethylsilylbis(n-propylcyclopentadienyl)hafnium dimethyl,
dimethylsilylbis(n-butylcyclopentadienyl)hafnium dimethyl,
bis(1-n-propyl-2-methylcyclopentadienyl)hafnium dimethyl,
(n-propylcyclopentadienyl)(1-n-propyl-3-n-butylcyclopentadienyl)hafnium dimethyl, and
dimethylsilyl(3-n-propylcyclopentadienyl)(tetramethylcyclopentadienyl)zirconium dimethyl.

Non-Metallocene Catalyst Compounds

Transition metal complexes for polymerization processes can include an olefin polymerization catalyst. Suitable catalyst components may include "non-metallocene complexes" that are defined to be transition metal complexes that do not feature a cyclopentadienyl anion or substituted cyclopentadienyl anion donors (e.g., cyclopentadienyl, fluorenyl, indenyl, methylcyclopentadienyl). Examples of families of non-metallocene complexes that may be suitable can include late transition metal pyridylbisimines (e.g., U.S. Pat. No. 7,087,686), group 4 pyridyldiamidos (e.g., U.S. Pat. No. 7,973,116), quinolinyldiamidos (e.g., US Pub. No. 2018/0002352 A1), pyridylamidos (e.g., U.S. Pat. No. 7,087,690), phenoxyimines (e.g., Makio, H. et al. (2009) "Development and Application of FI Catalysts for Olefin Polymerization: Unique Catalysis and Distinctive Polymer Formation," *Accounts of Chemical Research*, v. 42(10), pp. 1532-1544), and bridged bi-aromatic complexes (e.g., U.S. Pat. No. 7,091,292), the disclosures of which are incorporated by reference.

Catalyst complexes that are suitable for use in combination with the activators of the present disclosure include:

pyridyldiamido complexes; quinolinyldiamido complexes; phenoxyimine complexes; bisphenolate complexes; cyclopentadienyl-amidinate complexes; and iron pyridyl bis (imine) complexes or a combination thereof, including a combination with metallocene complexes.

The term "pyridyldiamido complex" or "pyridyldiamide complex" or "pyridyldiamido catalyst" or "pyridyldiamide catalyst" refers to a class of coordination complexes described in U.S. Pat. No. 7,973,116B2, US 2012/0071616A1, US 2011/0224391A1, US 2011/0301310A1, US 2015/0141601A1, U.S. Pat. Nos. 6,900,321 and 8,592,615 that feature a dianionic tridentate ligand that is coordinated to a metal center through one neutral Lewis basic donor atom (e.g., a pyridine group) and a pair of anionic amido or phosphido (i.e., deprotonated amine or phosphine) donors. In these complexes the pyridyldiamido ligand is coordinated to the metal with the formation of one five membered chelate ring and one seven membered chelate ring. It is possible for additional atoms of the pyridyldiamido ligand to be coordinated to the metal without affecting the catalyst function upon activation; an example of such coordination could be a cyclometalated substituted aryl group that forms an additional bond to the metal center.

The term "quinolinyldiamido complex" or "quinolinyldiamido catalyst" or "quinolinyldiamide complex" or "quinolinyldiamide catalyst" refers to a related class of pyridyldiamido complex/catalyst described in US 2018/0002352 where a quinolinyl moiety is present instead of a pyridyl moiety.

The term "phenoxyimine complex" or "phenoxyimine catalyst" refers to a class of coordination complexes described in EP 0874005 that feature a monoanionic bidentate ligand that is coordinated to a metal center through one neutral Lewis basic donor atom (e.g., an imine moiety) and an anionic aryloxy (i.e., deprotonated phenoxy) donor. Typically two of these bidentate phenoxyimine ligands are coordinated to a group 4 metal to form a complex that is useful as a catalyst component.

The term "bisphenolate complex" or "bisphenolate catalyst" refers to a class of coordination complexes described in U.S. Pat. No. 6,841,502, WO2017/004462, and WO2006/020624 that feature a dianionic tetradentate ligand that is coordinated to a metal center through two neutral Lewis basic donor atoms (e.g., oxygen bridge moieties) and two anionic aryloxy (i.e., deprotonated phenoxy) donors.

The term "cyclopentadienyl-amidinate complex" or "cyclopentadienyl-amidinate catalyst" refers to a class of coordination complexes described in U.S. Pat. No. 8,188,200 that typically feature a group 4 metal bound to a cyclopentadienyl anion, a bidentate amidinate anion, and a couple of other anionic groups.

The term "iron pyridyl bis(imine) complex" refers to a class of iron coordination complexes described in U.S. Pat. No. 7,087,686 that typically feature an iron metal center coordinated to a neutral, tridentate pyridyl bis(imine) ligand and two other anionic ligands.

Non-metallocene complexes can include iron complexes of tridentate pyridylbisimine ligands, zirconium and hafnium complexes of pyridylamido ligands, zirconium and hafnium complexes of tridentate pyridyldiamido ligands, zirconium and hafnium complexes of tridentate quinolinyldiamido ligands, zirconium and hafnium complexes of bidentate phenoxyimine ligands, and zirconium and hafnium complexes of bridged bi-aromatic ligands.

Suitable non-metallocene complexes can include zirconium and hafnium non-metallocene complexes. In at least one embodiment, non-metallocene complexes for the present disclosure include group 4 non-metallocene complexes including two anionic donor atoms and one or two neutral donor atoms. Suitable non-metallocene complexes for the present disclosure include group 4 non-metallocene complexes including an anionic amido donor. Suitable non-metallocene complexes for the present disclosure include group 4 non-metallocene complexes including an anionic aryloxide donor atom. Suitable non-metallocene complexes for the present disclosure include group 4 non-metallocene complexes including two anionic aryloxide donor atoms and two additional neutral donor atoms.

A catalyst compounds can be a quinolinyldiamido (QDA) transition metal complex represented by Formula (BI), such as by Formula (BII), such as by Formula (BIII):

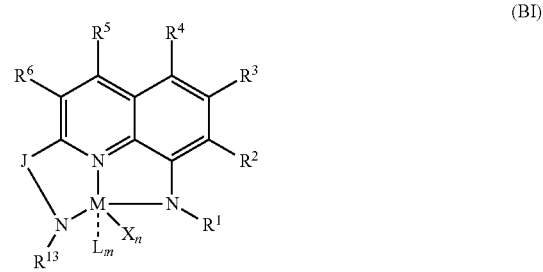

(BI)

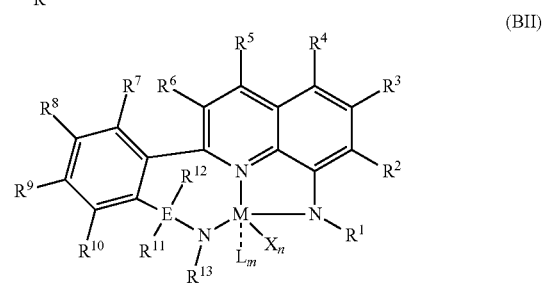

(BII)

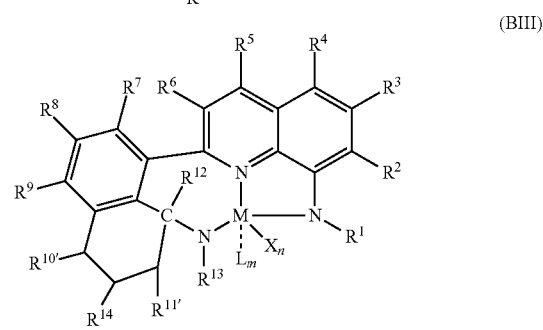

(BIII)

where:
M is a group 3, 4, 5, 6, 7, 8, 9, 10, 11, or 12 metal, such as a group 4 metal;
J is group including a three-atom-length bridge between the quinoline and the amido nitrogen, such as a group containing up to 50 non-hydrogen atoms;
E is carbon, silicon, or germanium;
X is an anionic leaving group, (such as a hydrocarbyl group or a halogen);
L is a neutral Lewis base;
$R^1$ and $R^{13}$ are independently selected from the group including of hydrocarbyls, substituted hydrocarbyls, and silyl groups;
$R^2$, $R^3$, $R^4$, $R^5$, $R^6$, $R^7$, $R^8$, $R^9$, $R^{10}$, $R^{10'}$, $R^{11}$, $R^{11'}$, $R^{12}$, and $R^{14}$ are independently hydrogen, hydrocarbyl, alkoxy, silyl, amino, aryloxy, substituted hydrocarbyl, halogen, or phosphino;

n is 1 or 2;
m is 0, 1, or 2, where
n+m is not greater than 4; and
two R groups (e.g., $R^1$ & $R^2$, $R^2$ & $R^3$, $R^{10}$ and $R^{11}$, etc.) may be joined to form a substituted hydrocarbyl, unsubstituted hydrocarbyl, substituted heterocyclic, or unsubstituted heterocyclic, saturated or unsaturated ring, where the ring has 5, 6, 7, or 8 ring atoms and where substitutions on the ring can join to form additional rings;
two X groups may be joined together to form a dianionic group;
two L groups may be joined together to form a bidentate Lewis base; and
X group may be joined to an L group to form a monoanionic bidentate group.

In at least one embodiment of Formulas (BI), (BII), or (BIII), M is a group 4 metal, such as zirconium or hafnium, such as M is hafnium.

Representative non-metallocene transition metal compounds usable for forming poly(alpha-olefin)s of the present disclosure also include tetrabenzyl zirconium, tetra bis(trimethylsilymethyl) zirconium, oxotris(trimethlsilylmethyl) vanadium, tetrabenzyl hafnium, tetrabenzyl titanium, bis(hexamethyl disilazido)dimethyl titanium, tris(trimethyl silyl methyl) niobium dichloride, and tris(trimethylsilylmethyl) tantalum dichloride.

In at least one embodiment of Formulas (BI), (BII), or (BIII), J is an aromatic substituted or unsubstituted hydrocarbyl having from 3 to 30 non-hydrogen atoms, such as J is represented by the Formulas (JI) and (JII):

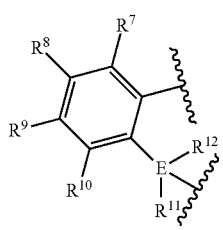

(JI)

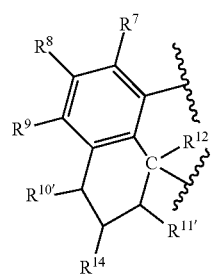

(JII)

where $R^7$, $R^8$, $R^9$, $R^{10}$, $R^{10'}$, $R^{11}$, $R^{11'}$, $R^{12}$, $R^{14}$ and E are as defined above, and two R groups (e.g., $R^7$ & $R^8$, $R^8$ & $R^9$, $R^9$ & $R^{10}$, $R^{10}$ & $R^{11}$, etc.) may be joined to form a substituted or unsubstituted hydrocarbyl or heterocyclic ring, where the ring has 5, 6, 7, or 8 ring atoms (such as 5 or 6 atoms), and said ring may be saturated or unsaturated (such as partially unsaturated or aromatic), such as J is an arylalkyl (such as arylmethyl, etc.) or dihydro-TH-indenyl, or tetrahydronaphthalenyl group.

In at least one embodiment of Formulas (BI), (BII), or (BIII), J is selected from the following structures:

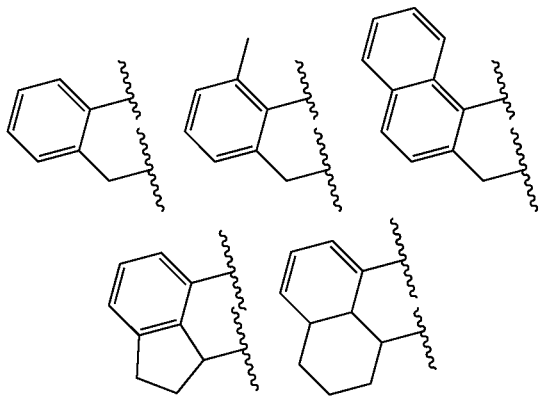

where ⸗ indicates connection to the complex.

In at least one embodiment of Formulas (BI), (BII), or (BIII), E is carbon.

In some embodiments of Formulas (BI), (BII), or (BIII), X is an alkyl (such as alkyl groups having 1 to 10 carbons, such as methyl, ethyl, propyl, butyl, pentyl, hexyl, heptyl, octyl, nonyl, decyl, and isomers thereof), aryl, hydride, alkylsilane, fluoride, chloride, bromide, iodide, triflate, carboxylate, amido (such as $NMe_2$), or alkylsulfonate.

In at least one embodiment of Formulas (BI), (BII), or (BIII), L is an ether, amine or thioether.

In at least one embodiment of Formulas (BI), (BII), or (BIII), $R^7$ and $R^8$ are joined to form a six-membered aromatic ring with the joined $R^7/R^8$ group being —CH=CHCH=CH—.

In at least one embodiment of Formulas (BI), (BII), or (BIII), $R^{10}$ and $R^{11}$ are joined to form a five-membered ring with the joined $R^{10}R^{11}$ group being —$CH_2CH_2$—.

In at least one embodiment, $R^{10}$ and $R^{11}$ are joined to form a six-membered ring with the joined $R^{10}$-$R^{11}$ group being —$CH_2CH_2CH_2$—.

In at least one embodiment of Formulas (BI), (BII), or (BIII), $R^1$ and $R^{13}$ are independently selected from phenyl groups that are variously substituted with zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In at least one embodiment, the QDA transition metal complex is represented by the Formula (BII) above where:
M is a group 4 metal (such hafnium);
E is selected from carbon, silicon, or germanium (such as carbon);
X is an alkyl, aryl, hydride, alkylsilane, fluoride, chloride, bromide, iodide, triflate, carboxylate, amido, alkoxo, or alkylsulfonate;
L is an ether, amine, or thioether;
$R^1$ and $R^{13}$ are independently selected from the group consisting of hydrocarbyls, substituted hydrocarbyls, and silyl groups (such as aryl);
$R^2$, $R^3$, $R^4$, $R^5$, $R^6$, $R^7$, $R^8$, $R^9$, $R^{10}$, $R^{11}$, and $R^{12}$ are independently hydrogen, hydrocarbyl, alkoxy, silyl, amino, aryloxy, substituted hydrocarbyls, halogen, and phosphino;
n is 1 or 2;
m is 0, 1, or 2;
n+m is from 1 to 4;
two X groups may be joined together to form a dianionic group;

two L groups may be joined together to form a bidentate Lewis base;

an X group may be joined to an L group to form a monoanionic bidentate group;

$R^7$ and $R^8$ may be joined to form a ring (such as an aromatic ring, a six-membered aromatic ring with the joined $R^7R^8$ group being —CH=CHCH=CH—); and $R^{10}$ and $R^{11}$ may be joined to form a ring (such as a five-membered ring with the joined $R^{10}R^{11}$ group being —CH$_2$CH$_2$—, a six-membered ring with the joined $R^{10}R^{11}$ group being —CH$_2$CH$_2$CH$_2$—.

In at least one embodiment of Formulas (BI), (BII), or (BIII), $R^4$, $R^5$, and $R^6$ are independently selected from the group including hydrogen, hydrocarbyls, substituted hydrocarbyls, alkoxy, aryloxy, halogen, amino, and silyl, and where adjacent R groups ($R^4$ and $R^5$ and/or $R^5$ and $R^6$) are joined to form a substituted hydrocarbyl, unsubstituted hydrocarbyl, unsubstituted heterocyclic ring or substituted heterocyclic ring, where the ring has 5, 6, 7, or 8 ring atoms and where substitutions on the ring can join to form additional rings.

In at least one embodiment of Formula (BI), (BII), or (BIII), $R^7$, $R^8$, $R^9$, and $R^{10}$ are independently selected from the group including hydrogen, hydrocarbyls, substituted hydrocarbyls, alkoxy, halogen, amino, and silyl, and where adjacent R groups ($R^7$ and $R^8$ and/or $R^9$ and $R^{10}$) may be joined to form a saturated, substituted hydrocarbyl, unsubstituted hydrocarbyl, unsubstituted heterocyclic ring or substituted heterocyclic ring, where the ring has 5, 6, 7, or 8 ring carbon atoms and where substitutions on the ring can join to form additional rings.

In at least one embodiment of Formulas (BI), (BII), or (BIII), $R^2$ and $R^3$ are each, independently, selected from the group including hydrogen, hydrocarbyls, and substituted hydrocarbyls, alkoxy, silyl, amino, aryloxy, halogen, and phosphino, $R^2$ and $R^3$ may be joined to form a saturated, substituted or unsubstituted hydrocarbyl ring, where the ring has 4, 5, 6, or 7 ring carbon atoms and where substitutions on the ring can join to form additional rings, or $R^2$ and $R^3$ may be joined to form a saturated heterocyclic ring, or a saturated substituted heterocyclic ring where substitutions on the ring can join to form additional rings.

In at least one embodiment of Formulas (BI), (BII), or (BIII), $R^{11}$ and $R^{12}$ are each, independently, selected from the group including hydrogen, hydrocarbyls, and substituted hydrocarbyls, alkoxy, silyl, amino, aryloxy, halogen, and phosphino, $R^{11}$ and $R^{12}$ may be joined to form a saturated, substituted or unsubstituted hydrocarbyl ring, where the ring has 4, 5, 6, or 7 ring carbon atoms and where substitutions on the ring can join to form additional rings, or $R^{11}$ and $R^{12}$ may be joined to form a saturated heterocyclic ring, or a saturated substituted heterocyclic ring where substitutions on the ring can join to form additional rings, or $R^1$ and $R^{10}$ may be joined to form a saturated heterocyclic ring, or a saturated substituted heterocyclic ring where substitutions on the ring can join to form additional rings.

In at least one embodiment of Formulas (BI), (BII), or (BIII), $R^1$ and $R^{13}$ are independently selected from phenyl groups that are variously substituted with zero to five substituents that include F, Cl, Br, I, CF$_3$, NO$_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In at least one embodiment of Formula (BII), suitable $R^{12}$-E-$R^{11}$ groups include CH$_2$, CMe$_2$, SiMe$_2$, SiEt$_2$, SiPr$_2$, SiBu$_2$, SiPh$_2$, Si(aryl)$_2$, Si(alkyl)$_2$, CH(aryl), CH(Ph), CH(alkyl), and CH(2-isopropylphenyl), where alkyl is a C$_1$ to C$_{40}$ alkyl group (such as C$_1$ to C$_{20}$ alkyl, such as one or more of methyl, ethyl, propyl, butyl, pentyl, hexyl, heptyl, octyl, nonyl, decyl, undecyl, dodecyl, and isomers thereof), aryl is a C$_5$ to C$_{40}$ aryl group (such as a C$_6$ to C$_{20}$ aryl group, such as phenyl or substituted phenyl, such as phenyl, 2-isopropylphenyl, or 2-tertbutylphenyl).

In at least one embodiment of Formula (BIII), $R^{11}$, $R^{12}$, $R^9$, $R^{14}$, and $R^{10}$ are independently selected from the group consisting of hydrogen, hydrocarbyls, substituted hydrocarbyls, alkoxy, halogen, amino, and silyl, and where adjacent R groups ($R^{10}$ and $R^{14}$, and/or $R^{11}$ and $R^{14}$, and/or $R^9$ and $R^{10}$) may be joined to form a saturated, substituted hydrocarbyl, unsubstituted hydrocarbyl, unsubstituted heterocyclic ring or substituted heterocyclic ring, where the ring has 5, 6, 7, or 8 ring carbon atoms and where substitutions on the ring can join to form additional rings.

In at least one embodiment of Formulas (BI), (BII), or (BIII), the R groups above (e.g., one or more of $R^2$ to $R^{14}$) and other R groups mentioned hereafter contain from 1 to 30, such as 2 to 20 carbon atoms, such as from 6 to 20 carbon atoms. The R groups above (e.g., one or more of $R^2$ to $R^{14}$) and other R groups mentioned hereafter, may be independently selected from the group including hydrogen, methyl, ethyl, phenyl, isopropyl, isobutyl, trimethylsilyl, and —CH$_2$—Si(Me)$_3$.

In at least one embodiment of Formulas (BI), (BII), or (BIII), the quinolinyldiamide complex is linked to one or more additional transition metal complex, such as a quinolinyldiamide complex or another suitable non-metallocene, through an R group in such a fashion as to make a bimetallic, trimetallic, or multimetallic complex that may be used as a catalyst component for olefin polymerization. The linker R-group in such a complex may contain 1 to 30 carbon atoms.

In at least one embodiment of Formulas (BI), (BII), or (BIII), E is carbon and $R^{11}$ and $R^{12}$ are independently selected from phenyl groups that are substituted with 0, 1, 2, 3, 4, or 5 substituents selected from the group consisting of F, Cl, Br, I, CF$_3$, NO$_2$, alkoxy, dialkylamino, hydrocarbyl, and substituted hydrocarbyl groups with from one to ten carbons. In at least one embodiment of Formulas (BII) or (BIII), $R^{11}$ and $R^{12}$ are independently selected from hydrogen, methyl, ethyl, phenyl, isopropyl, isobutyl, —CH$_2$—Si(Me)$_3$, and trimethylsilyl.

In at least one embodiment of Formulas (BII) or (BIII), $R^7$, $R^8$, $R^9$, and $R^{10}$ are independently selected from hydrogen, methyl, ethyl, propyl, isopropyl, phenyl, cyclohexyl, fluoro, chloro, methoxy, ethoxy, phenoxy, —CH$_2$—Si(Me)$_3$, and trimethylsilyl.

In at least one embodiment of Formulas (BI), (BII), or (BIII), $R^2$, $R^3$, $R^4$, $R^5$, and $R^6$ are independently selected from the group consisting of hydrogen, hydrocarbyls, alkoxy, silyl, amino, substituted hydrocarbyls, and halogen.

In at least one embodiment of Formula (BIII), $R^{10}$, $R^{11}$ and $R^{14}$ are independently selected from hydrogen, methyl, ethyl, phenyl, isopropyl, isobutyl, —CH$_2$—Si(Me)$_3$, and trimethylsilyl.

In at least one embodiment of Formulas (BI), (BII), or (BIII), each L is independently selected from Et$_2$O, MeOtBu, Et$_3$N, PhNMe$_2$, MePh$_2$N, tetrahydrofuran, and dimethylsulfide.

In at least one embodiment of Formulas (BI), (BII), or (BIII), each X is independently selected from methyl, benzyl, trimethylsilyl, neopentyl, ethyl, propyl, butyl, phenyl, hydrido, chloro, fluoro, bromo, iodo, dimethylamido, diethylamido, dipropylamido, and diisopropylamido.

In at least one embodiment of Formulas (BI), (BII), or (BIII), $R^1$ is 2,6-diisopropylphenyl, 2,4,6-triisopropylphenyl, 2,6-diisopropyl-4-methylphenyl, 2,6-diethylphenyl, 2-ethyl-6-isopropylphenyl, 2,6-bis(3-pentyl)phenyl, 2,6-dicyclopentylphenyl, or 2,6-dicyclohexylphenyl.

In at least one embodiment of Formulas (BI), (BII), or (BIII), $R^{13}$ is phenyl, 2-methylphenyl, 2-ethylphenyl, 2-propylphenyl, 2,6-dimethylphenyl, 2-isopropylphenyl, 4-methylphenyl, 3,5-dimethylphenyl, 3,5-di-tert-butylphenyl, 4-fluorophenyl, 3-methylphenyl, 4-dimethylaminophenyl, or 2-phenylphenyl.

In at least one embodiment of Formula (BII), J is dihydro-TH-indenyl and $R^1$ is 2,6-dialkylphenyl or 2,4,6-trialkylphenyl.

In at least one embodiment of Formula (BI), (BII), and (BIII), $R^1$ is 2,6-diisopropylphenyl and $R^{13}$ is a hydrocarbyl group containing 1, 2, 3, 4, 5, 6, or 7 carbon atoms.

An exemplary catalyst used for polymerizations of the present disclosure is (QDA-1)HfMe$_2$, as described in US Pub. No. 2018/0002352 A1.

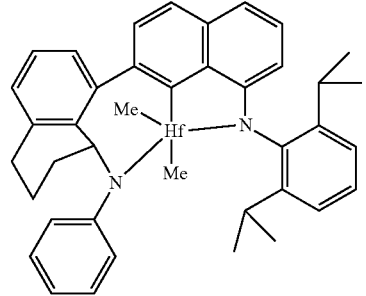

(QDA-1)HfMe$_2$

In at least one embodiment, the catalyst compound is a bis(phenolate) catalyst compound represented by Formula (CI):

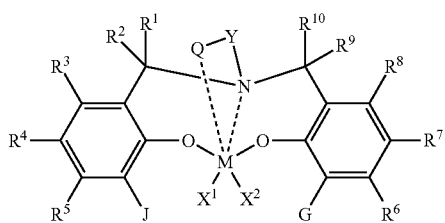

(CI)

M is a Group 4 metal, such as Hf or Zr. $X^1$ and $X^2$ are independently a univalent $C_1$-$C_{20}$ hydrocarbyl, substituted $C_1$-$C_{20}$ hydrocarbyl, a heteroatom or a heteroatom-containing group, or $X^1$ and $X^2$ join together to form a $C_4$-$C_{62}$ cyclic or polycyclic ring structure. $R^1$, $R^2$, $R^3$, $R^4$, $R^5$, $R^6$, $R^7$, $R^8$, $R^9$, and $R^{10}$ is independently hydrogen, $C_1$-$C_{40}$ hydrocarbyl, substituted $C_1$-$C_{40}$ hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a $C_4$-$C_{62}$ cyclic or polycyclic ring structure, or a combination thereof; Q is a neutral donor group; J is heterocycle, a substituted or unsubstituted $C_7$-$C_{60}$ fused polycyclic group, where at least one ring is aromatic and where at least one ring, which may or may not be aromatic, has at least five ring atoms' G is as defined for J or may be hydrogen, $C_2$-$C_{60}$ hydrocarbyl, $C_1$-$C_{60}$ substituted hydrocarbyl, or may independently form a $C_4$-$C_{60}$ cyclic or polycyclic ring structure with $R^6$, $R^7$, or $R^8$ or a combination thereof, Y is divalent $C_1$-$C_{20}$ hydrocarbyl or divalent $C_1$-$C_{20}$ substituted hydrocarbyl or (-Q-Y—) together form a heterocycle; and heterocycle may be aromatic and/or may have multiple fused rings.

In at least one embodiment, the catalyst compound represented by Formula (CI) is represented by Formula (CII) or Formula (CIII):

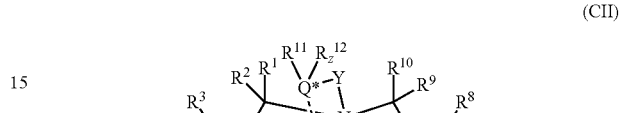

(CII)

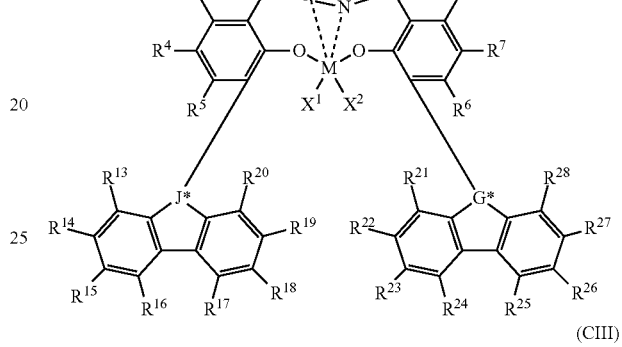

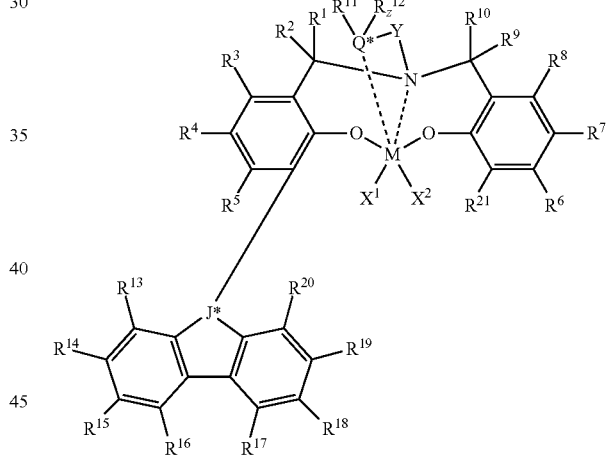

(CIII)

where M is Hf, Zr, or Ti. $X^1$, $X^2$, $R^1$, $R^2$, $R^3$, $R^4$, $R^5$, $R^6$, $R^7$, $R^8$, $R^9$, $R^{10}$, and Y are as defined for Formula (CI). $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is independently a hydrogen, $C_1$-$C_{40}$ hydrocarbyl, substituted $C_1$-$C_{40}$ hydrocarbyl, a functional group including elements from Groups 13 to 17, or two or more of $R^1$, $R^2$, $R^3$, $R^4$, $R^5$, $R^6$, $R^7$, $R^8$, $R^9$, $R^{10}$ $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ may independently join together to form a $C_4$-$C_{62}$ cyclic or polycyclic ring structure, or a combination thereof; $R^{11}$ and $R^{12}$ may join together to form a five- to eight-membered heterocycle; Q* is a group 15 or 16 atom; z is 0 or 1; J* is CR" or N, and G* is CR" or N, where R" is $C_1$-$C_{20}$ hydrocarbyl or carbonyl-containing $C_1$-$C_{20}$ hydrocarbyl; and z=0 if Q* is a group 16 atom, and z=1 if Q* is a group 15 atom.

In at least one embodiment the catalyst is an iron complex represented by Formula (IV):

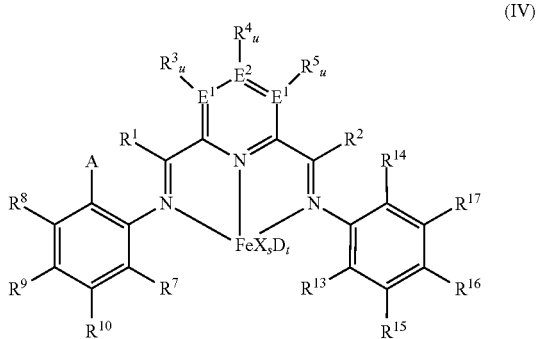

(IV)

where:
A is chlorine, bromine, iodine, —$CF_3$ or —$OR^{11}$;
each of $R^1$ and $R^2$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or five-, six- or seven-membered heterocyclyl including at least one atom selected from the group consisting of N, P, O and S;
where each of $R^1$ and $R^2$ is optionally substituted by halogen, —$NR^{11}{}_2$, —$OR^{11}$ or —$SiR^{12}{}_3$;
where $R^1$ optionally bonds with $R^3$, and $R^2$ optionally bonds with $R^5$, in each case to independently form a five-, six- or seven-membered ring;
$R^7$ is a $C_1$-$C_{20}$ alkyl;
each of $R^3$, $R^4$, $R^5$, $R^8$, $R^9$, $R^{10}$, $R^{15}$, $R^{16}$, and $R^{17}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, —$NR^{11}{}_2$, —$OR^{11}$, halogen, —$SiR^{12}{}_3$ or five-, six- or seven-membered heterocyclyl including at least one atom selected from the group consisting of N, P, O, and S;
where $R^3$, $R^4$, $R^5$, $R^7$, $R^8$, $R^9$, $R^{10}$, $R^{15}$, $R^{16}$, and $R^{17}$ are optionally substituted by halogen, —$NR^{11}{}_2$, —$OR^{11}$ or —$SiR^{12}{}_3$;
where $R^3$ optionally bonds with $R^4$, $R^4$ optionally bonds with $R^5$, $R^7$ optionally bonds with $R^{10}$, $R^{10}$ optionally bonds with $R^9$, $R^9$ optionally bonds with $R^8$, $R^{17}$ optionally bonds with $R^{16}$, and $R^{16}$ optionally bonds with $R^{15}$, in each case to independently form a five-, six- or seven-membered carbocyclic or heterocyclic ring, the heterocyclic ring including at least one atom from the group consisting of N, P, O and S;
$R^{13}$ is $C_1$-$C_{20}$-alkyl bonded with the aryl ring via a primary or secondary carbon atom;
$R^{14}$ is chlorine, bromine, iodine, —$CF_3$ or —$OR^{11}$, or $C_1$-$C_{20}$-alkyl bonded with the aryl ring;
each $R^{11}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —$SiR^{123}$, where $R^{11}$ is optionally substituted by halogen, or two $R^{11}$ radicals optionally bond to form a five- or six-membered ring;
each $R^{12}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two $R^{12}$ radicals optionally bond to form a five- or six-membered ring;
each of $E^1$, $E^2$, and $E^3$ is independently carbon, nitrogen or phosphorus;
each u is independently 0 if $E^1$, $E^2$, and $E^3$ is nitrogen or phosphorus and is 1 if $E^1$, $E^2$, and $E^3$ is carbon;
each X is independently fluorine, chlorine, bromine, iodine, hydrogen, $C_1$-$C_{20}$-alkyl, $C_2$-$C_{10}$-alkenyl, $C_6$-$C_{20}$-aryl, arylalkyl where alkyl has from 1 to 10 carbon atoms and aryl has from 6 to 20 carbon atoms, —$NR^{18}{}_2$, —$OR^{18}$, —$SR^{18}$, —$SO_3R^{18}$, —$OC(O)R^{18}$, —CN, —SCN, β-diketonate, —CO, —$BF_4{}^-$, —$PF_6{}^-$ or bulky non-coordinating anions, and the radicals X can be bonded with one another;
each $R^{18}$ is independently hydrogen, $C_1$-$C_{20}$-alkyl, $C_2$-$C_{20}$-alkenyl, $C_6$-$C_{20}$-aryl, arylalkyl where alkyl has from 1 to 10 carbon atoms and aryl has from 6 to 20 carbon atoms, or —$SiR^{19}{}_3$, where $R^{18}$ can be substituted by halogen or nitrogen- or oxygen-containing groups and two $R^{18}$ radicals optionally bond to form a five- or six-membered ring;
each $R^{19}$ is independently hydrogen, $C_1$-$C_{20}$-alkyl, $C_2$-$C_{20}$-alkenyl, $C_6$-$C_{20}$-aryl or arylalkyl where alkyl has from 1 to 10 carbon atoms and aryl has from 6 to 20 carbon atoms, where $R^{19}$ can be substituted by halogen or nitrogen- or oxygen-containing groups or two $R^{19}$ radicals optionally bond to form a five- or six-membered ring;
s is 1, 2, or 3;
D is a neutral donor; and
t is 0 to 2.

In another embodiment, the catalyst is a phenoxyimine compound represented by the Formula (VII):

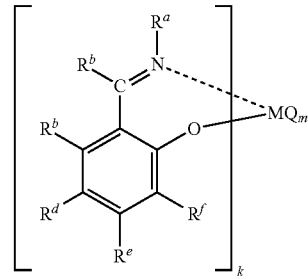

(VII)

where M represents a transition metal atom selected from the groups 3 to 11 metals in the periodic table; k is an integer of 1 to 6; m is an integer of 1 to 6; $R^a$ to $R^f$ may be the same or different from one another and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, among which 2 or more groups may be bound to each other to form a ring; when k is 2 or more, $R^a$ groups, $R^b$ groups, $R^c$ groups, $R^d$ groups, $R^e$ groups, or $R^f$ groups may be the same or different from one another, one group of $R^a$ to $R^f$ contained in one ligand and one group of $R^a$ to $R^f$ contained in another ligand may form a linking group or a single bond, and a heteroatom contained in $R^a$ to $R^f$ may coordinate with or bind to M; m is a number satisfying the valence of M; Q represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group; when m is 2 or more, a plurality of groups represented by Q may be the same or different from one another, and a plurality of groups represented by Q may be mutually bound to form a ring.

In another embodiment, the catalyst is a bis(imino)pyridyl of the Formula (VIII):

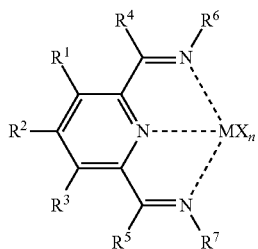

(VIII)

where:
M is Co or Fe; each X is an anion; n is 1, 2 or 3, so that the total number of negative charges on said anion or anions is equal to the oxidation state of a Fe or Co atom present in Formula (VIII);
$R^1$, $R^2$, and $R^3$ are each independently hydrogen, hydrocarbyl, substituted hydrocarbyl, or an inert functional group;
$R^4$ and $R^5$ are each independently hydrogen, hydrocarbyl, an inert functional group or substituted hydrocarbyl;
$R^6$ is Formula (IX):

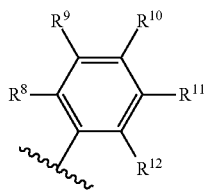

(IX)

and $R^7$ is Formula (X):

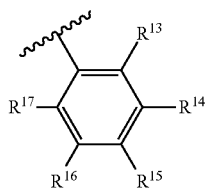

(X)

$R^8$ and $R^{13}$ are each independently hydrocarbyl, substituted hydrocarbyl or an inert functional group;
$R^9$, $R^{10}$, $R^{11}$, $R^{14}$, $R^{15}$ and $R^{16}$ are each independently hydrogen, hydrocarbyl, substituted hydrocarbyl or an inert functional group;
$R^{12}$ and $R^{17}$ are each independently hydrogen, hydrocarbyl, substituted hydrocarbyl or an inert functional group;
and provided that two of $R^8$, $R^9$, $R^{10}$, $R^{11}$, $R^{12}$, $R^{13}$, $R^{14}$, $R^{15}$, $R^{16}$ and $R^{17}$ that are adjacent to one another, together may form a ring.

In at least one embodiment, the catalyst compound is represented by the Formula (XI):

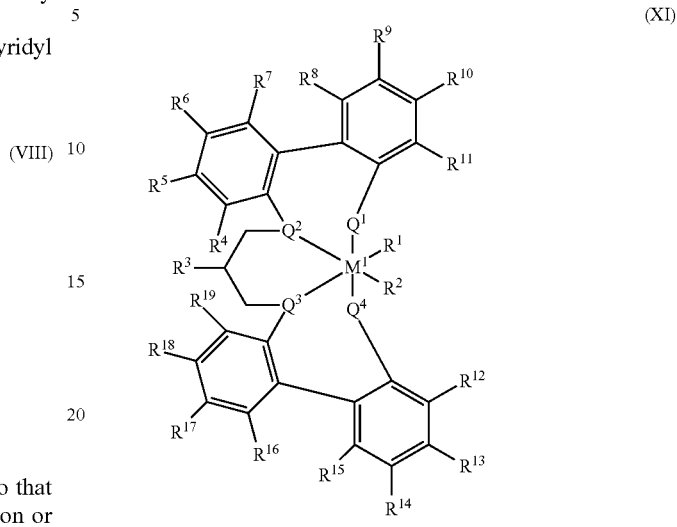

(XI)

where $M^1$ is selected from the group consisting of titanium, zirconium, hafnium, vanadium, niobium, tantalum, chromium, molybdenum and tungsten;
each of $Q^1$, $Q^2$, $Q^3$, and $Q^4$ is independently oxygen or sulfur;
each of $R^1$ and $R^2$ are independently hydrogen, halogen, hydroxyl, hydrocarbyl, or substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen);
each of $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, halogen, $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen), —NR'$_2$, —SR', —OR, —OSiR'$_3$, —PR'$_2$, where each R' is hydrogen, halogen, $C_1$-$C_{10}$ alkyl, or $C_6$-$C_{10}$ aryl, or one or more of $R^4$ and $R^5$, $R^5$ and $R^6$, $R^6$ and $R^7$, $R^8$ and $R^9$, $R^9$ and $R^{10}$, $R^{10}$ and $R^{11}$, $R^{12}$ and $R^{13}$, $R^{13}$ and $R^{14}$, $R^{14}$ and $R^{15}$, $R^{16}$ and $R^{17}$, $R^{17}$ and $R^{18}$, and $R^{18}$ and $R^{19}$ are joined to form a saturated ring, unsaturated ring, substituted saturated ring, or substituted unsaturated ring.

In at least one embodiment of Formula (XI), $M^1$ is zirconium.

In at least one embodiment of Formula (XI), at least one of $Q^1$, $Q^2$, $Q^3$, and $Q^4$ is oxygen, alternately all of $Q^1$, $Q^2$, $Q^3$, and $Q^4$ are oxygen.

In some embodiments of Formula (XI), $R^1$ and $R^2$ are a halogen selected from fluorine, chlorine, bromine, or iodine. In some embodiments of Formula (XI), $R^1$ and $R^2$ are chlorine. In some embodiments, $R^1$ and $R^2$ may also be joined together to form an alkanediyl group or a conjugated $C_4$-$C_{40}$ diene ligand which is coordinated to $M^1$. $R^1$ and $R^2$ may also be identical or different conjugated dienes, optionally substituted with one or more hydrocarbyl, tri(hydrocarbyl) silyl or tri(hydrocarbyl) silylhydrocarbyl, the dienes having up to 30 atoms not counting hydrogen and/or forming a n-complex with $M^1$.

Exemplary groups suitable for $R^1$ and or $R^2$ can include 1,4-diphenyl, 1,3-butadiene, 1,3-pentadiene, 2-methyl 1,3-pentadiene, 2,4-hexadiene, 1-phenyl, 1,3-pentadiene, 1,4-dibenzyl, 1,3-butadiene, 1,4-ditolyl-1,3-butadiene, 1,4-bis(trimethylsilyl)-1,3-butadiene, and 1,4-dinaphthyl-1,3-butadiene. $R^1$ and $R^2$ can be identical and are $C_1$-$C_3$ alkyl or alkoxy, $C_6$-$C_{10}$ aryl or aryloxy, $C_2$-$C_4$ alkenyl, $C_7$-$C_{10}$ arylalkyl, $C_7$-$C_{12}$ alkylaryl, or halogen.

In at least one embodiment of Formula (XI), each of $R^4$, $R^5$, $R^6$, $R^7$, $R^8$, $R^9$, $R^{10}$, $R^{13}$, $R^{14}$, $R^{15}$, $R^{16}$, $R^{17}$, $R^{18}$, and $R^{19}$ is independently hydrogen or $C_1$-$C_{40}$ hydrocarbyl. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl. In some embodiments, $R^{11}$ and $R^{12}$ are $C_6$-$C_{10}$ aryl such as phenyl or naphthyl optionally substituted with $C_1$-$C_{40}$ hydrocarbyl, such as $C_1$-$C_{10}$ hydrocarbyl. In some embodiments, $R^6$ and $R^{17}$ are $C_{1-40}$ alkyl, such as $C_1$-$C_{10}$ alkyl. In some embodiments, each of $R^6$ and $R^{17}$ is $C_1$-$C_{40}$ hydrocarbyl and $R^4$, $R^5$, $R^7$, $R^8$, $R^9$, $R^{10}$, $R^{13}$, $R^{14}$, $R^{15}$, $R^{16}$, $R^{18}$, and $R^{19}$ is hydrogen. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

In some embodiments, $R^3$ is a $C_1$-$C_{40}$ unsaturated alkyl or substituted $C_1$-$C_{40}$ unsaturated alkyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen).

In some embodiments, $R^3$ is a hydrocarbyl including a vinyl moiety. "Vinyl" and "vinyl moiety" are used interchangeably and include a terminal alkene, e.g., represented by the structure

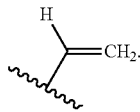

Hydrocarbyl of $R^3$ may be further substituted (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen). In some embodiments, $R^3$ is $C_1$-$C_{40}$ unsaturated alkyl that is vinyl or substituted $C_1$-$C_{40}$ unsaturated alkyl that is vinyl. $R^3$ can be represented by the structure —R'CH=$CH_2$ where R' is $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen). In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

In at least one embodiment, $R^3$ is 1-propenyl, 1-butenyl, 1-pentenyl, 1-hexenyl, 1-heptenyl, 1-octenyl, 1-nonenyl, or 1-decenyl.

In at least one embodiment, the catalyst is a Group 15-containing metal compound represented by Formulas (XII) or (XIII):

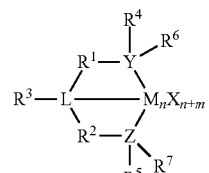

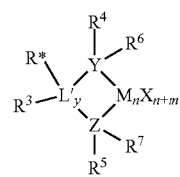

where M is a Group 3 to 12 transition metal or a Group 13 or 14 main group metal, a Group 4, 5, or 6 metal. In many embodiments, M is a Group 4 metal, such as zirconium, titanium, or hafnium. Each X is independently a leaving group, such as an anionic leaving group. The leaving group may include a hydrogen, a hydrocarbyl group, a heteroatom, a halogen, or an alkyl; y is 0 or 1 (when y is 0 group L' is absent). The term 'n' is the oxidation state of M. In various embodiments, n is +3, +4, or +5. In many embodiments, n is +4. The term 'm' represents the formal charge of the YZL or the YZL' ligand, and is 0, −1, −2 or −3 in various embodiments. In many embodiments, m is −2. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus. In many embodiments, Y is nitrogen. Z is a Group 15 element, such as nitrogen or phosphorus. In many embodiments, Z is nitrogen. $R^1$ and $R^2$ are, independently, a $C_1$ to $C_{20}$ hydrocarbon group, a heteroatom containing group having up to twenty carbon atoms, silicon, germanium, tin, lead, or phosphorus. In many embodiments, $R^1$ and $R^2$ are a $C_2$ to $C_{20}$ alkyl, aryl or aralkyl group, such as a $C_2$ to $C_{20}$ linear, branched or cyclic alkyl group, or a $C_2$ to $C_{20}$ hydrocarbon group. $R^1$ and $R^2$ may also be interconnected to each other. $R^3$ may be absent or may be a hydrocarbon group, a hydrogen, a halogen, a heteroatom containing group. In many embodiments, $R^3$ is absent, for example, if L is an oxygen, or a hydrogen, or a linear, cyclic, or branched alkyl group having 1 to 20 carbon atoms. $R^4$ and $R^5$ are independently an alkyl group, an aryl group, substituted aryl group, a cyclic alkyl group, a substituted cyclic alkyl group, a cyclic aralkyl group, a substituted cyclic aralkyl group, or multiple ring system, often having up to 20 carbon atoms. In many embodiments, $R^4$ and $R^5$ have 3 to 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other. $R^6$ and $R^7$ are independently absent, hydrogen, an alkyl group, halogen, heteroatom, or a hydrocarbyl group, such as a linear, cyclic or branched alkyl group having 1 to 20 carbon atoms. In many embodiments, $R^6$ and $R^7$ are absent. R* may be absent, or may be a hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups. An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In one or more embodiments, $R^4$ and $R^5$ are independently a group represented by structure (XIV):

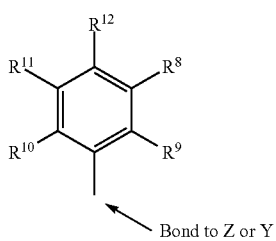

where $R^8$ to $R^{12}$ are each independently hydrogen, a $C_1$ to $C_{40}$ alkyl group, a halide, a heteroatom, a heteroatom containing group containing up to 40 carbon atoms. In many embodiments, $R^8$ to $R^{12}$ are a $C_1$ to $C_{20}$ linear or branched alkyl group, such as a methyl, ethyl, propyl, or butyl group. Two of the R groups may form a cyclic group and/or a heterocyclic group. The cyclic groups may be aromatic. In at least one embodiment $R^9$, $R^{10}$ and $R^{12}$ are independently a methyl, ethyl, propyl, or butyl group (including all isomers). In another embodiment, $R^9$, $R^{10}$ and $R^{12}$ are methyl groups, and $R^8$ and $R^{11}$ are hydrogen.

In one or more embodiments, $R^4$ and $R^5$ are independently a group represented by structure (XV):

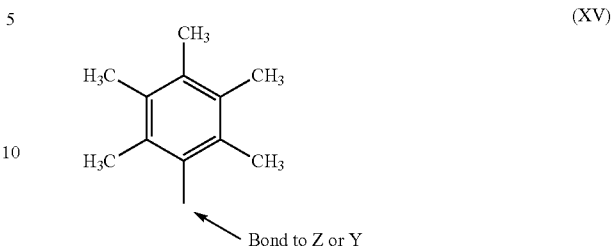

where M is a Group 4 metal, such as zirconium, titanium, or hafnium. In at least one embodiment, M is zirconium. Each of L, Y, and Z may be a nitrogen. Each of $R^1$ and $R^2$ may be —$CH_2$—$CH_2$—. $R^3$ may be hydrogen, and $R^6$ and $R^7$ may be absent.

In some embodiments, the catalyst compounds described in PCT/US2018/051345, filed Sep. 17, 2018, incorporated by reference, may be used with the activators of the present disclosure, such as the catalyst compounds described at Page 16 to Page 32 of the application as filed.

In some embodiments, a co-activator is combined with the catalyst compound (such as halogenated catalyst compounds described above) to form an alkylated catalyst compound. Organoaluminum compounds which may be utilized as co-activators include, for example, trialkyl aluminum compounds, such as trimethylaluminum, triethylaluminum, triisobutylaluminum, tri-n-hexylaluminum, tri-n-octylaluminum, and the like, or alumoxanes.

In some embodiments, two or more different catalyst compounds are present in the catalyst system. In some embodiments, two or more different catalyst compounds are present in the reaction zone where the polymerization process(es) occur. When two transition metal compound based catalysts are used in one reactor as a mixed catalyst system, the two transition metal compounds may be chosen such that the two are compatible. A simple screening method such as by $^1H$ or $^{13}C$ NMR, can be used to determine which transition metal compounds are compatible. In some embodiments, the same activator is used for the transition metal compounds; however, two different activators may be used in combination. If one or more transition metal compounds contain an anionic ligand as a leaving group which is not a hydride, hydrocarbyl, or substituted hydrocarbyl, then the alumoxane or other alkyl aluminum is typically contacted with the transition metal compounds prior to addition of the non-coordinating anion activator.

The two transition metal compounds (pre-catalysts) may be used in any suitable ratio. Suitable molar ratios of (A) transition metal compound to (B) transition metal compound (A:B) may be from 1:1000 to 1000:1, alternatively from 1:100 to 500:1, alternatively from 1:10 to 200:1, alternatively from 1:1 to 100:1, and alternatively from 1:1 to 75:1, and alternatively from 5:1 to 50:1. The particular ratio chosen will depend on the exact pre-catalysts chosen, the method of activation, and the desired end product. In at least one embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Polymer Processes

The present disclosure provides polymerization processes where monomer (such as propylene or ethylene), and optionally comonomer, are contacted with a catalyst system including an activator and at least one catalyst compound, as described above. The catalyst compound and activator may be combined in any suitable order, and are combined typically prior to contacting with the monomer.

In at least one embodiment, a polymerization process includes a) contacting one or more olefin monomers with a catalyst system including: i) an activator and ii) a catalyst compound of the present disclosure. The activator is a non-coordination anion activator. The one or more olefin monomers may be propylene and/or ethylene and the polymerization process further includes heating the one or more olefin monomers and the catalyst system to 70° C. or more to form propylene polymers or ethylene polymers, such as propylene polymers.

Suitable monomers include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer includes propylene and an optional comonomers including one or more propylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer includes propylene and an optional comonomers including one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include propylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer(s) produced at about 10 wt % or less, such as at about 0.00001 wt % to about 1 wt %, such as about 0.002 wt % to about 0.5 wt %, such as about 0.003 wt % to about 0.2 wt %, based upon the total weight of the polymer composition. In some embodiments, about 500 ppm or less of diene is added to the polymerization, such as about 400 ppm or less, such as about 300 ppm or less. In other embodiments about 50 ppm or more of diene is added to the polymerization, such as about 100 ppm or more, or about 150 ppm or more.

Diene monomers include a hydrocarbon structure, such as $C_4$ to $C_{30}$, having at least two unsaturated bonds, where at least two of the unsaturated bonds are readily incorporated into a polymer by either a stereospecific or a non-stereospecific catalyst(s). The diene monomers can be selected from alpha, omega-diene monomers (i.e. di-vinyl monomers). The diolefin monomers are linear di-vinyl monomers, such as those containing from 4 to 30 carbon atoms.

Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1,000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable suspension, homogeneous, bulk, or solution polymerization process can be used. Such processes can be run in a batch, semi-batch, or continuous mode. Homogeneous polymerization processes can be performed. (A useful homogeneous polymerization process is one where at least 90 wt % of the product is soluble in the reaction media.) A bulk homogeneous process can be used. (An example bulk process is one where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); aromatic and alkyl-substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, the solvent is not aromatic, such that aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. The polymerization can be performed in a bulk process.

Polymerizations can be performed at a temperature and/or pressure suitable to obtain the desired polymers, such as ethylene and or propylene polymers. Typical temperatures and/or pressures include a temperature from about 0° C. to about 300° C., such as about 20° C. to about 200° C., such as about 35° C. to about 150° C., such as about 40° C. to about 120° C., such as about 45° C. to about 80° C., for example about 74° C., and at a pressure from about 0.35 MPa to about 10 MPa, such as about 0.45 MPa to about 6 MPa, such as about 0.5 MPa to about 4 MPa.

In a typical polymerization, the run time of the reaction is up to 300 minutes, such as from about 5 to about 250 minutes, such as about 10 to about 120 minutes.

In at least one embodiment, hydrogen is present in the polymerization reactor at a partial pressure of about 0.001 psig to about 50 psig (about 0.007 kPa to about 345 kPa), such as from about 0.01 psig to about 25 psig (about 0.07 kPa to about 172 kPa), such as about 0.1 psig to about 10 psig (about 0.7 kPa to about 70 kPa).

In at least one embodiment, the activity of the catalyst is from about 50 gP/mmolCat/hour to about 200,000 gP/mmolCat/hr, such as from about 10,000 gP/mmolCat/hr to about 150,000 gP/mmolCat/hr, such as from about 40,000 gP/mmolCat/hr to about 100,000 gP/mmolCat/hr, such as about 50,000 gP/mmolCat/hr or more, such as about 70,000 gP/mmolCat/hr or more. In at least one embodiment, the conversion of olefin monomer is at least 10%, based upon polymer yield and the weight of the monomer entering the reaction zone, such as 20% or more, such as 30% or more, such as 50% or more, such as 80% or more.

In at least one embodiment, a catalyst system of the present disclosure is capable of producing a polyolefin. In at least one embodiment, a polyolefin is a homopolymer of ethylene or propylene or a copolymer of ethylene such as a copolymer of ethylene having from 0.1 wt % to 25 wt % (such as from 0.5 wt % to 20 wt %, such as from 1 wt % to 15 wt %, such as from 5 wt % to 17 wt %) of ethylene with the remainder balance being one or more $C_3$ to $C_{20}$ olefin comonomers (such as $C_3$ to $C_{12}$ alpha-olefin, such as propylene, butene, hexene, octene, decene, dodecene, such as propylene, butene, hexene, octene). A polyolefin can be a copolymer of propylene such as a copolymer of propylene having from 0.1 wt % to 25 wt % (such as from 0.5 wt % to 20 wt %, such as from 1 wt % to 15 wt %, such as from 3 wt % to 10 wt %) of propylene and from 99.9 wt % to 75 wt % of one or more of $C_2$ or $C_4$ to $C_{20}$ olefin comonomer (such as ethylene or $C_4$ to $C_{12}$ alpha-olefin, such as butene, hexene, octene, decene, dodecene, such as ethylene, butene, hexene, octene).

In at least one embodiment, a catalyst system of the present disclosure is capable of producing polyolefins, such as polypropylene (e.g., iPP) or ethylene-octene copolymers, having an Mw from 40,000 to 1,500,000, such as from 70,000 to 1,000,000, such as from 90,000 to 500,000, such as from 90,000 to 250,000, such as from 90,000 to 200,000, such as from 90,000 to 110,000.

In at least one embodiment, a catalyst system of the present disclosure is capable of producing polyolefins, such as polypropylene (e.g., iPP) or ethylene-octene copolymers, having an Mn from 5,000 to 1,000,000, such as from 20,000 to 160,000, such as from 30,000 to 70,000, such as from 40,000 to 70,000. In at least one embodiment, a catalyst system of the present disclosure is capable of producing propylene polymers having an Mw/Mn value from 1 to 10, such as from 1.5 to 9, such as from 2 to 7, such as from 2 to 4, such as from 2.5 to 3, for example about 2.

In at least one embodiment, a catalyst system of the present disclosure is capable of producing polyolefins, such as polypropylene (e.g., iPP) or ethylene-octene, ethylene-propylene, or ethylene-butene copolymers, having a melting temperature (Tm) of about 140° C. or less, such as from about 100° C. to about 150° C., from about 110° C. to about 140° C., from about 120° C. to about 135° C., or from about 130° C. to about 135° C.

In at least one embodiment, little or no scavenger is used in the process to produce polymer, such as propylene polymer. Scavenger (such as trialkyl aluminum) can be present at zero mol %, alternately the scavenger is present at a molar ratio of scavenger metal to transition metal of less than 100:1, such as less than 50:1, such as less than 15:1, such as less than 10:1.

In at least one embodiment, the polymerization: 1) is conducted at temperatures of about 0° C. to about 300° C. (such as about 25° C. to about 150° C., such as about 40° C. to about 120° C., such as about 70° C. to about 110° C., such as about 85° C. to about 100° C.); 2) is conducted at a pressure of about atmospheric pressure to about 10 MPa (such as about 0.35 MPa to about 10 MPa, such as from about 0.45 MPa to about 6 MPa, such as from about 0.5 MPa to about 4 MPa); 3) is conducted in an aliphatic hydrocarbon solvent (such as isobutane, butane, pentane, isopentane, hexanes, isohexane, heptane, octane, dodecane, and mixtures thereof, cyclic and alicyclic hydrocarbons, such as cyclohexane, cycloheptane, methylcyclohexane, methylcycloheptane, and mixtures thereof, where aromatics are present in the solvent at less than 1 wt %, such as less than 0.5 wt %, such as at 0 wt % based upon the weight of the solvents); and 4) the productivity of the catalyst compound is at least 30,000 gP/mmolCat/hr (such as at least 50,000 gP/mmolCat/hr, such as at least 60,000 gP/mmolCat/hr, such as at least 80,000 gP/mmolCat/hr, such as at least 100,000 gP/mmolCat/hr).

In at least one embodiment, the catalyst system used in the polymerization includes no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone.

Other additives may also be used in the polymerization, as desired, such as one or more scavengers, promoters, modifiers, chain transfer agents (such as diethyl zinc), hydrogen, or aluminum alkyls. Useful chain transfer agents are typically alkylalumoxanes, a compound represented by the formula $AlR_3$, $ZnR_2$ (where each R is, independently, a $C_1$-$C_8$ aliphatic radical, such as methyl, ethyl, propyl, butyl, phenyl, hexyl, octyl or an isomer thereof) or a combination thereof, such as diethyl zinc, methylalumoxane, trimethylaluminum, triisobutylaluminum, trioctylaluminum, or a combination thereof.

Solution Polymerization

A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are typically not turbid as described in Oliveira, J. V. et al. (2000) "High-Pressure Phase Equilibria for Polypropylene-Hydrocarbon Systems," *Ind. Eng. Chem. Res.*, v. 39, pp. 4627-4633. Solution polymerization involves polymerization in a continuous reactor in which the polymer formed and the starting monomer and catalyst materials supplied, are agitated to reduce or avoid concentration gradients and in which the monomer acts as a diluent or solvent or in which a hydrocarbon is used as a diluent or solvent. Suitable processes typically operate at temperatures from about 0° C. to about 250° C., such as about 10° C. to about 150° C., such as about 40° C. to about 140° C., such as about 50° C. to about 120° C. Additionally, suitable processes may operate at pressures of about 0.1 MPa or more, such as 2 MPa or more, such as about 0.1 MPa to about 200 MPa, or about 2 MPa to about 120 MPa. Temperature control in the reactor may be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be adjusted for the improved catalyst productivity for a type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

Polyolefin Products

The present disclosure also provides compositions of matter which can be produced by the polymerization methods described.

In at least one embodiment, a polyolefin is a propylene homopolymer, an ethylene homopolymer or an ethylene copolymer, such as propylene-ethylene and/or ethylene-alpha-olefin (such as $C_4$ to $C_{20}$) copolymer (such as an ethylene-hexene copolymer or an ethylene-octene copolymer). A polyolefin can have an Mw/Mn of greater than 1 to 4 (such as greater than 1 to 3).

In at least one embodiment, a polyolefin is a homopolymer of ethylene or propylene or a copolymer of ethylene such as a copolymer of ethylene having from 0.1 to 25 wt % (such as from 0.5 to 20 wt %, such as from 1 to 15 wt %, such as from 5 to 17 wt %) of ethylene with the remainder balance being one or more $C_3$ to $C_{20}$ olefin comonomers (such as $C_3$ to $C_{12}$ alpha-olefin, such as propylene, butene, hexene, octene, decene, dodecene, such as propylene, butene, hexene, octene). A polyolefin can be a copolymer of propylene such as a copolymer of propylene having from 0.1 to 25 wt % (such as from 0.5 to 20 wt %, such as from 1 to 15 wt %, such as from 3 to 10 wt %) of propylene and from 99.9 to 75 wt % of one or more of $C_2$ or $C_4$ to $C_{20}$ olefin comonomer (such as ethylene or $C_4$ to $C_{12}$ alpha-olefin, such as butene, hexene, octene, decene, dodecene, such as ethylene, butene, hexene, octene).

In at least one embodiment, a polyolefin, such as a polypropylene (e.g., iPP) or an ethylene-octene copolymer, has an Mw from 40,000 to 1,500,000, such as from 70,000 to 1,000,000, such as from 90,000 to 500,000, such as from 90,000 to 250,000, such as from 90,000 to 200,000, such as from 90,000 to 110,000.

In at least one embodiment, a polyolefin, such as a polypropylene (e.g., iPP) or an ethylene-octene copolymer, has an Mn from 5,000 to 1,000,000, such as from 20,000 to 160,000, such as from 30,000 to 70,000, such as from 40,000 to 70,000. In at least one embodiment, a polyolefin, such as a polypropylene (e.g., iPP) or an ethylene-octene copolymer, has an Mw/Mn value from 1 to 10, such as from 1.5 to 9, such as from 2 to 7, such as from 2 to 4, such as from 2.5 to 3, for example about 2.

In at least one embodiment, a polyolefin, such as a polypropylene (e.g., iPP) or an ethylene-octene copolymer, has a melt temperature (Tm) of from about 100° C. to about 150° C., such as about 110° C. to about 140° C., such as about 120° C. to about 135° C., such as about 130° C. to about 135° C.

In at least one embodiment, a polymer of the present disclosure has a g'$_{vis}$ of greater than 0.9, such as greater than 0.92, such as greater than 0.95.

In at least one embodiment, the polymer is an ethylene copolymer, and the comonomer is octene, at a comonomer content of from 1 wt % to 18 wt % octene, such as from 5 wt % to 15 wt %, such as from 8 wt % to 13 wt %, such as from 9 wt % to 12 wt %.

In at least one embodiment, the polymer produced has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

In at least one embodiment, the polymer produced has a composition distribution breadth index (CDBI) of 50% or more, such as 60% or more, such as 70% or more. CDBI is a measure of the composition distribution of monomer within the polymer chains and is measured by the procedure described in PCT publication WO1993/003093, published Feb. 18, 1993, specifically columns 7 and 8 as well as in Wild, L. et al. (1982) "Determination of Branching Distributions in Polyethylene and Ethylene Copolymers," *J. Poly. Sci., Poly. Phys. Ed.*, v. 20(3), pp. 441-455; and U.S. Pat. No. 5,008,204, including that fractions having a weight average molecular weight (Mw) below 15,000 are ignored when determining CDBI.

Copolymer of the present disclosure can have a reversed comonomer index. The reversed-co-monomer index (RCI, m) is computed from x2 (mol % co-monomer $C_3$, $C_4$, $C_6$, $C_8$, etc.), as a function of molecular weight, where x2 is obtained from the following expression in which η is the number of carbon atoms in the comonomer (3 for $C_3$, 4 for $C_4$, 6 for $C_6$, etc.):

$$x2 = -\frac{200w2}{-100\eta - 2w2 + \eta w2}.$$

Then the molecular-weight distribution, w(z) where z=$\log_{10}$ M, is modified to w'(z) by setting to 0 the points in w that are less than 5% of the maximum of w; the modification is to effectively remove points for which the S/N in the composition signal is low. Also, points of w' for molecular weights below 2000 gm/mole are set to 0. Then w' is renormalized so that $$1 = \int_{-\infty}^{\infty} W'dz$$

and a modified weight-average molecular weight ($M_w$') is calculated over the effectively reduce rang of molecular weights as follows:

$$M_w' = \int_{-\infty}^{\infty} 10^z * W'dz.$$

The RCI,m is then computed as:

$$\text{RCI},m = \int_{-\infty}^{\infty} x2(10^z - M_w')W'dz$$

A reversed-co-monomer index (RCI, w) is also defined on the basis of the weight fraction co-monomer signal (w2/100) and is computed as follows:

$$RCI, w = \int_{-\infty}^{\infty} \frac{w2}{100}(10^z - M_w')W'dz.$$

Note that in the above definite integrals, the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR-1, w = \frac{w2(Mz)}{w2(Mw)}$$

$$CDR-2, w = \frac{w2(Mz)}{w2\left(\frac{Mw+Mn}{2}\right)}$$

$$CDR-3, w = \frac{w2\left(\frac{Mz+Mw}{2}\right)}{w2\left(\frac{Mw+Mn}{2}\right)}$$

where w2(Mw) is the % weight co-monomer signal corresponding to a molecular weight of Mw, w2(Mz) is the % weight co-monomer signal corresponding to a molecular weight of Mz, w2[(Mw+Mn/2)] is the % weight co-monomer signal corresponding to a molecular weight of (Mw+Mn/2), and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1, m, CDR-2, m, CDR-3, m as:

$$CDR-1, m = \frac{x2(Mz)}{x2(Mw)}$$

$$CDR-2, m = \frac{x2(Mz)}{x2\left(\frac{Mw+Mn}{2}\right)}$$

$$CDR-3, m = \frac{x2\left(\frac{Mz+Mw}{2}\right)}{x2\left(\frac{Mw+Mn}{2}\right)}$$

where x2(Mw) is the % mole co-monomer signal corresponding to a molecular weight of Mw, x2(Mz) is the % mole co-monomer signal corresponding to a molecular weight of Mz, x2[(Mw+Mn/2)] is the % mole co-monomer signal corresponding to a molecular weight of (Mw+Mn)/2, and x2 [(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

In at least one embodiment of the present disclosure, the polymer produced by the processes of the present disclosure includes ethylene and one or more comonomers and the polymer has: 1) an RCI,m of 30 or more (alternatively from 30 to 250).

Molecular Weight, Comonomer Composition and Long Chain Branching Determination by Polymer Char GPC-IR Hyphenated with Multiple Detectors The distribution and the moments of molecular weight (Mw, Mn, Mw/Mn, etc.), the comonomer content ($C_2$, $C_3$, $C_6$, etc.) and the long chain branching (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 m Teflon filter and degassed with an online degasser before entering the GPC instrument. The nominal flow rate is 1 m/min and the nominal injection volume is 200 µL. The whole system including transfer lines, columns, detectors are contained in an oven maintained at 145° C. Given amount of polymer sample is weighed and sealed in a standard vial with 80 µL flow marker (Heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2 mg/ml, with lower concentrations being used for higher molecular weight samples.

The concentration (c), at each point in the chromatogram is calculated from the baseline-subtracted IR5 broadband signal intensity (I), using the following equation:

$$c = \beta I$$

where β is the mass constant determined with PE or PP standards. The mass recovery is calculated from the ratio of the integrated area of the concentration chromatography over elution volume and the injection mass which is equal to the pre-determined concentration multiplied by injection loop volume.

The conventional molecular weight (IR MW) is determined by combining universal calibration relationship with the column calibration which is performed with a series of monodispersed polystyrene (PS) standards ranging from 700 to 10 M. The MW at each elution volume is calculated with following equation;

$$\log M = \frac{\log(K_{PS}/K)}{\alpha+1} + \frac{\alpha_{PS}+1}{\alpha+1}\log M_{PS}$$

where the variables with subscript "PS" stands for polystyrene while those without a subscript are for the test samples. In this method, $\alpha_{PS}=0.67$ and $K_{PS}=0.000175$ while a and K are calculated as described in the published in literature (Sun, T. et al. (2001) "Effect of Short Chain Branching on the Coil Dimensions of Polyolefins in Dilute Solutions," *Macromolecules*, v. 34(19), pp. 6812-6820), except that for purposes of this disclosure and claims thereto, α=0.695 and K=0.000579 for linear ethylene polymers, α=0.705 and K=0.0002288 for linear propylene polymers, α=0.695+(0.01*(wt. fraction propylene)) and K=0.000579-(0.0003502*(wt. fraction propylene)) for ethylene-propylene copolymers. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR such as EMCC commercial grades about LLDPE, Vistamaxx, ICP, etc.

The LS detector is the 18-angle Wyatt Technology High Temperature DAWN HELEOSII. The LS molecular weight (M) at each point in the chromatogram is determined by analyzing the LS output using the Zimm model for static light scattering (M. B. Huglin, *Light Scattering from Polymer Solutions*, Academic Press, 1971):

$$\frac{K_o c}{\Delta R(\theta)} = \frac{1}{MP(\theta)} + 2A_2 c.$$

Here, $\Delta R$ (0) is the measured excess Rayleigh scattering intensity at scattering angle $\theta$, c is the polymer concentration determined from the IR5 analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta s$, for the solution flowing through the viscometer is calculated from their outputs. The intrinsic viscosity, $[\eta]$, at each point in the chromatogram is calculated from the following equation:

$$[\eta]=\eta_s/c$$

where c is concentration and was determined from the IR5 broadband channel output. The viscosity MW at each point is calculated from the below equation:

$$M=K_{PS}M^{\alpha_{PS}+1}/[\eta]$$

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'_{vis} = \frac{[\eta]_{avg}}{kM_v^\alpha}$$

$M_v$ is the viscosity-average molecular weight based on molecular weights determined by LS analysis. The K/a are for the reference linear polymers are as described above.

All the concentration is expressed in g/cm³, molecular weight is expressed in g/mole, and intrinsic viscosity is expressed in dL/g unless otherwise noted.

All molecular weights are reported in g/mol unless otherwise noted.

Differential Scanning Calorimetry (DSC-Procedure-2). Melting Temperature, Tm, is measured by differential scanning calorimetry ("DSC") using a DSCQ200 unit. The sample is first equilibrated at 25° C. and subsequently heated to 220° C. using a heating rate of 10° C./min. (first heat). The sample is held at 220° C. for 3 minutes. The sample is subsequently cooled down to −100° C. with a constant cooling rate of 10° C./min. (first cool). The sample is equilibrated at −100° C. before being heated to 220° C. at a constant heating rate of 10° C./min. (second heat). The exothermic peak of crystallization (first cool) is analyzed using the TA Universal Analysis software and the corresponding to 10° C./min. cooling rate is determined. The endothermic peak of melting (second heat) is also analyzed using the TA Universal Analysis software and the peak melting temperature (Tm) corresponding to 10° C./min heating rate is determined. In the event of conflict between the DSC Procedure-1 and DSC procedure-2, DSC procedure-2 is used.

Blends

In another embodiment, the polymer (such as the polyethylene or polypropylene) produced is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, low density polyethylene (LDPE), linear low density polyethylene (LLDPE), high density polyethylene (HDPE), ethylene vinyl acetate, ethylene methyl acrylate, copolymers of acrylic acid, polymethylmethacrylate or other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as polyethylene or polypropylene) is present in the above blends, at from 10 to 99 wt %, based upon the weight of the polymers in the blend, such as 20 to 95 wt %, such as at least 30 to 90 wt %, such as at least 40 to 90 wt %, such as at least 50 to 90 wt %, such as at least 60 to 90 wt %, such as at least 70 to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using various equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; and talc.

Embodiments of the Present Disclosure

Clause 1. A compound represented by Formula (I):

$$[Ar(E^1R^1R^2H)x(E^2R^3R^4)y][QR^5R^6R^7R^8]z. \quad (I)$$

where:
Ar is a $C_6-C_{30}$ aromatic hydrocarbyl group, provided that if Ar is a multicyclic ring, then each $E^1$ and each $E^2$ are substitutions on a single ring of the multicyclic ring;
x is 1 to 4;
y is 0 to 3;
z=x;
x+y is 2 to 6;
each of $E^1$ and $E^2$ are independently selected from nitrogen or phosphorous;
each of $R^1$, $R^2$, $R^3$, and $R^4$ are independently selected from $C_1-C_{40}$ aliphatic hydrocarbyl, substituted $C_1-C_{40}$ aliphatic hydrocarbyl, where $R^1$, $R^2$, $R^3$, and $R^4$ together include 15 or more carbon atoms;
Q is an element selected from group 13 of the Periodic Table of the Elements;
each of $R^5$, $R^6$, $R^7$, and $R^8$ is independently a $C_6-C_{24}$ hydrocarbyl or a $C_6-C_{24}$ substituted hydrocarbyl.

Clause 2. The compound of clause 1, where x is 1 and y is 1.

Clause 3. The compound of clause 1, where x is 2 and y is 0.

Clause 4. The compound of any of clauses 1 to 3, where Ar is a single ring aromatic hydrocarbyl.

Clause 5. The compound of any of clauses 1 to 3, where Ar is a $C_6$ aromatic hydrocarbyl.

Clause 6. The compound of any of clauses 1 to 5, where $E^1$ and $E^2$ are nitrogen.

Clause 7. The compound of any of clauses 1 to 6, where $R^1$ and $R^3$ are independently an optionally substituted $C_1-C_{10}$ aliphatic hydrocarbyl and $R^2$ and $R^4$ are independently an optionally substituted $C_{10}-C_{20}$ aliphatic hydrocarbyl.

Clause 8. The compound of any of clauses 1 to 6, where:
$R^1$ and $R^3$ are methyl, and
$R^2$ and $R^4$ are independently an optionally substituted $C_{10}-C_{20}$ aliphatic hydrocarbyl.

Clause 9. The compound of any of clauses 1 to 6, where:
$R^1$ and $R^3$ are methyl, and
$R^2$ and $R^4$ are independently an optionally substituted $C_{10}-C_{20}$ linear alkyl group.

Clause 10. The compound of any of clauses 1 to 6, where $R^1$ and $R^3$ are methyl and $R^2$ and $R^4$ are independently an optionally substituted $C_{18}$ linear aliphatic hydrocarbyl.

Clause 11. The compound of any of clauses 1 to 10, where $R^1$, $R^2$, $R^3$, and $R^4$ together include 24 or more carbon atoms.

Clause 12. The compound of any of clauses 1 to 11, where each of $R^5$, $R^6$, $R^7$, and $R^8$ is independently a $C_6-C_{24}$ aromatic hydrocarbyl or a substituted $C_6-C_{24}$ aromatic hydrocarbyl.

Clause 13. The compound of any of clauses 1 to 11, where each of $R^5$, $R^6$, $R^7$, and $R^8$ is independently a pentafluorophenyl or heptafluoronaphthyl.

Clause 14. The compound of clause 1, where [Ar($E^1R^1R^2H$)x($E^2R^3R^4$)y][QR^5R^6R^7R^8]_z of formula (I) is selected from the group consisting of:

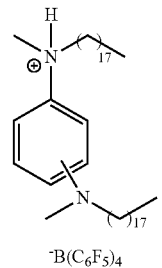

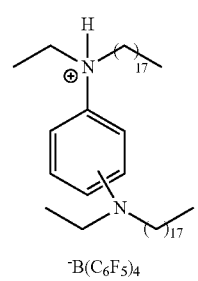

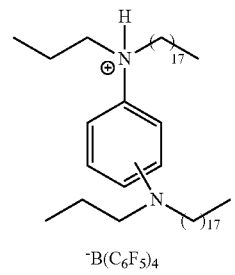

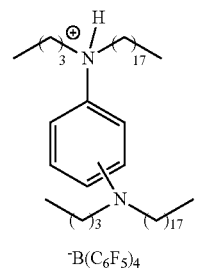

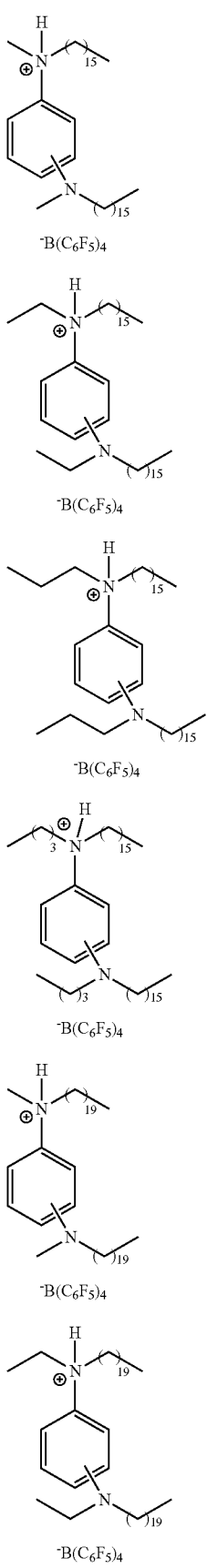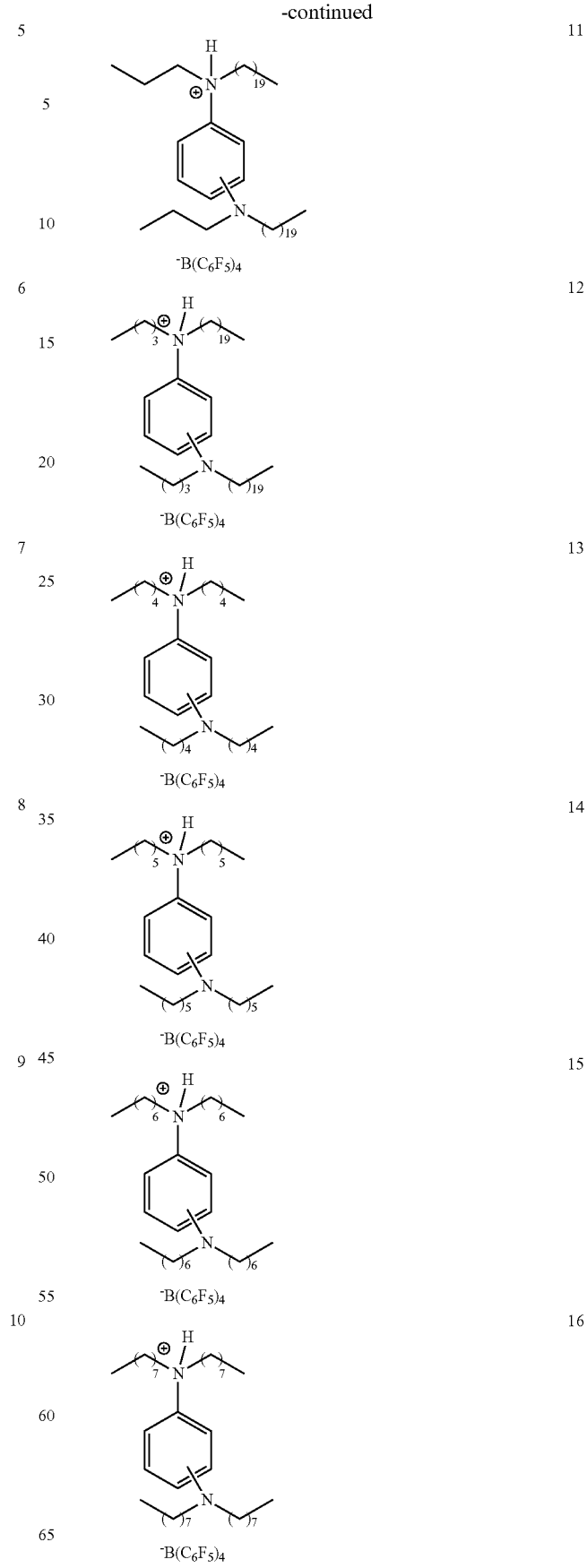

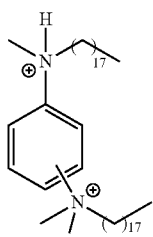
2 ⁻B(C₆F₅)₄
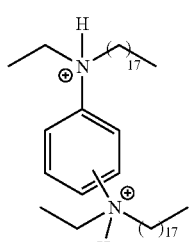
2 ⁻B(C₆F₅)₄
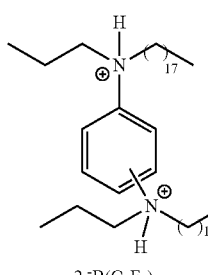
2 ⁻B(C₆F₅)₄
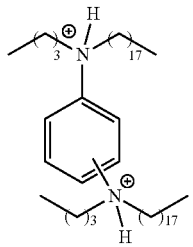
2 ⁻B(C₆F₅)₄
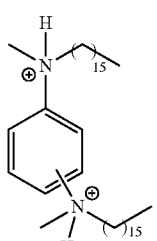
2 ⁻B(C₆F₅)₄
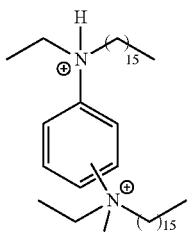
2 ⁻B(C₆F₅)₄
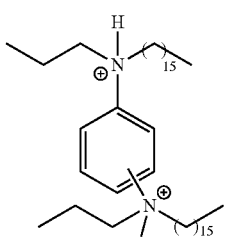
2 ⁻B(C₆F₅)₄
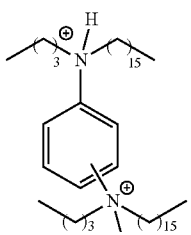
2 ⁻B(C₆F₅)₄
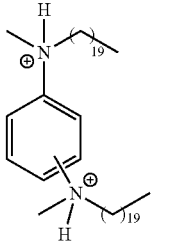
2 ⁻B(C₆F₅)₄
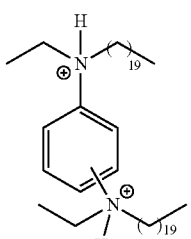
2 ⁻B(C₆F₅)₄

27
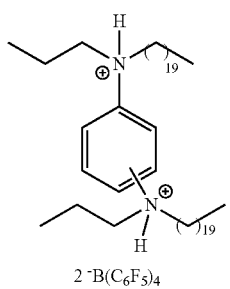
2 ⁻B(C₆F₅)₄
28
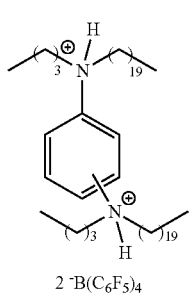
2 ⁻B(C₆F₅)₄
29
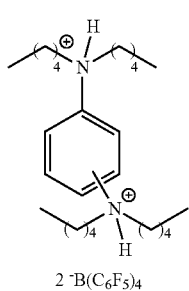
2 ⁻B(C₆F₅)₄
30
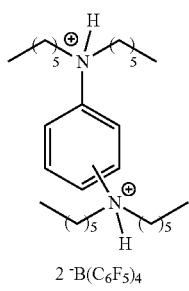
2 ⁻B(C₆F₅)₄
31
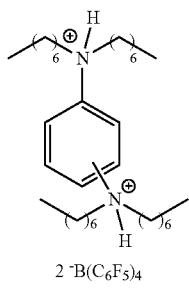
2 ⁻B(C₆F₅)₄
32
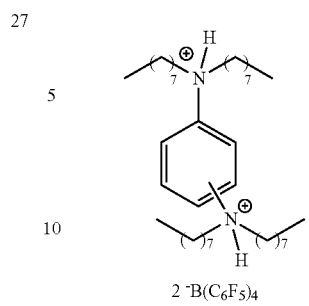
2 ⁻B(C₆F₅)₄
33
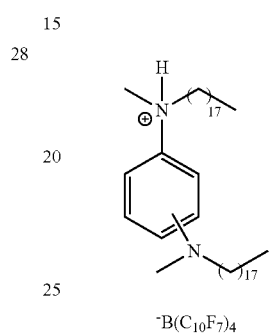
⁻B(C₁₀F₇)₄
34
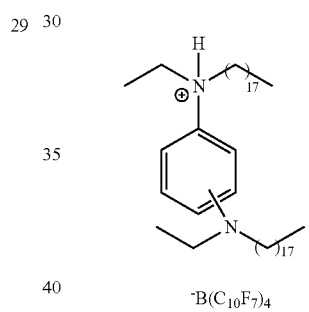
⁻B(C₁₀F₇)₄
35
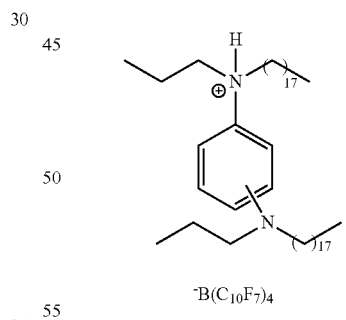
⁻B(C₁₀F₇)₄
36
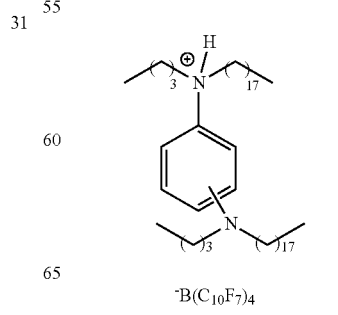
⁻B(C₁₀F₇)₄

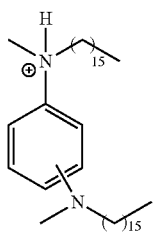
37
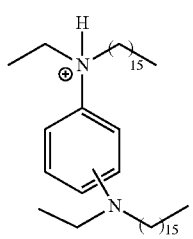
38
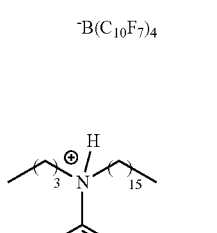
39
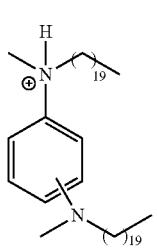
41
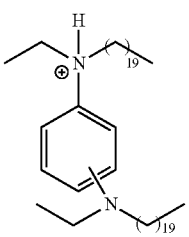
42
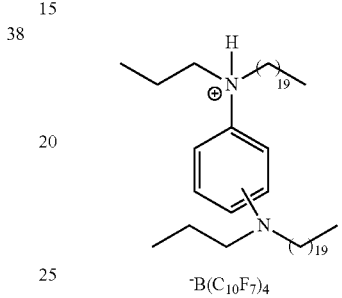
43
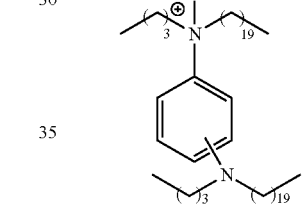
44
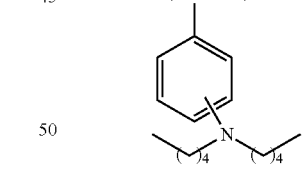
45
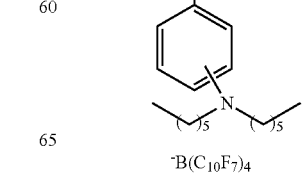
46

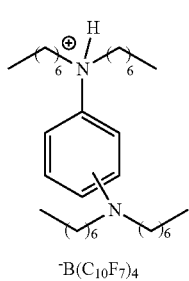
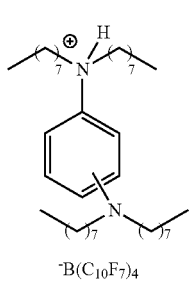
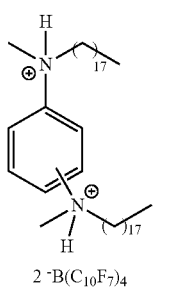
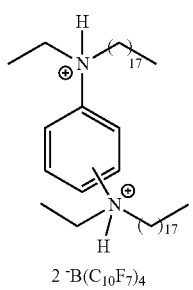
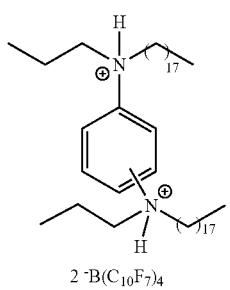
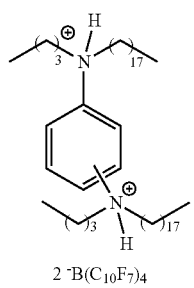
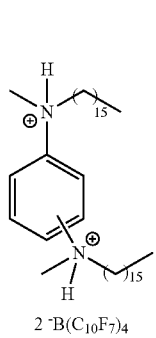
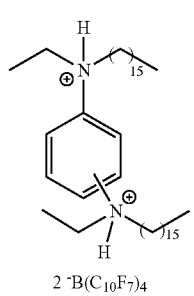
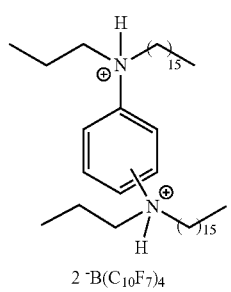
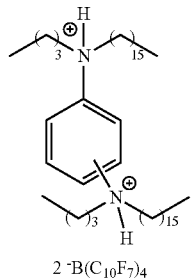

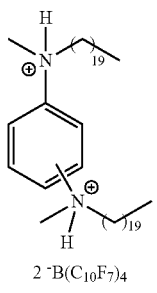
57
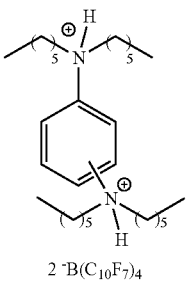
62
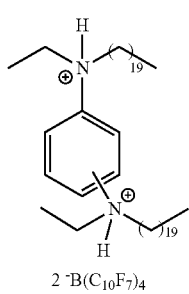
58
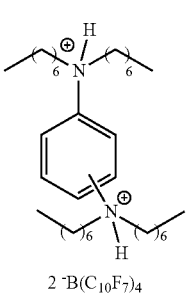
63
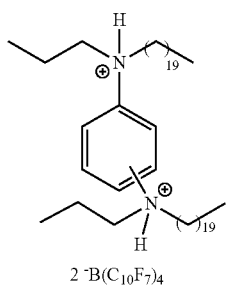
59
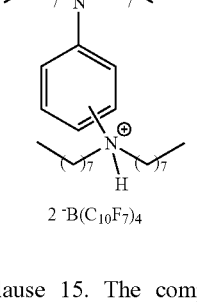
64
Clause 15. The compound of clause 14, where [Ar(E¹R¹R²H)x(E²R³R⁴)y][QR⁵R⁶R⁷R⁸]$_z$ of formula (I) is selected from the group consisting of:
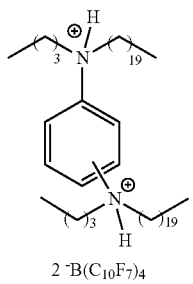
60
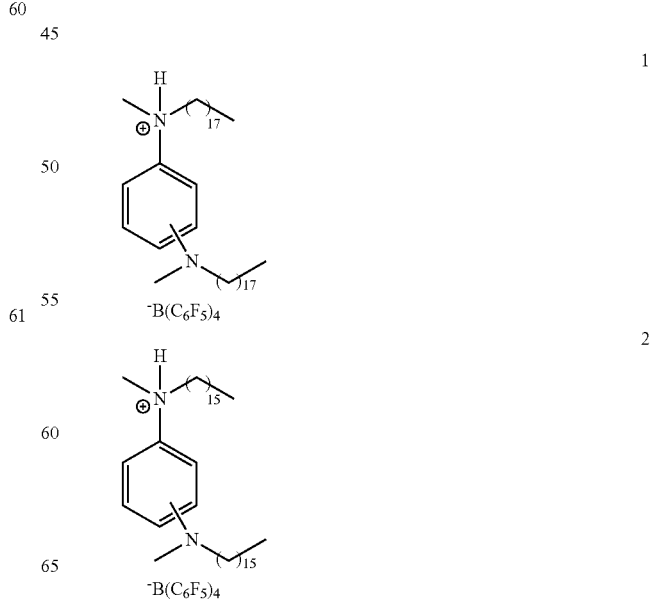
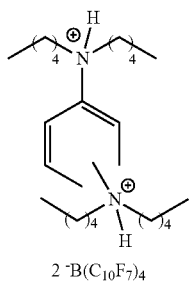
61

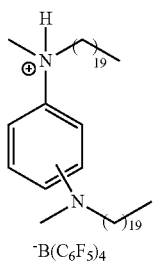
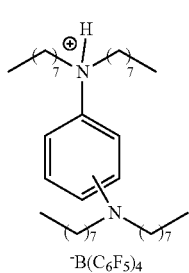
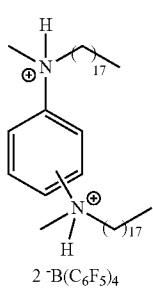
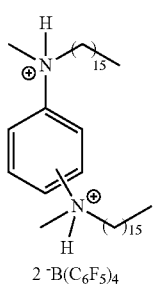
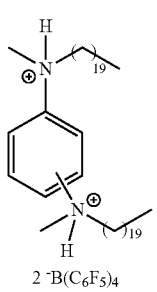
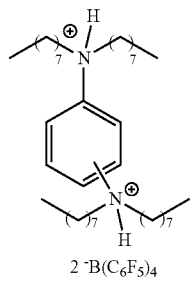
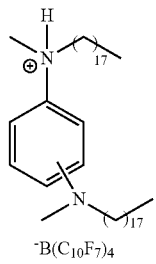
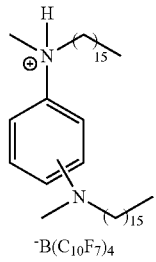
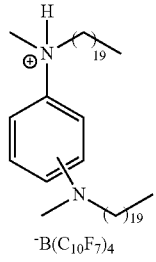
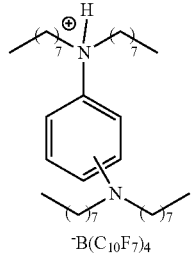
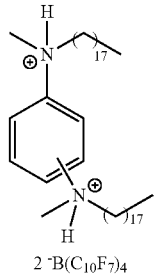

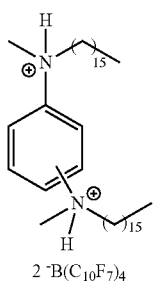
14
2 ⁻B(C₁₀F₇)₄
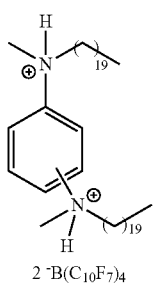
15
2 ⁻B(C₁₀F₇)₄
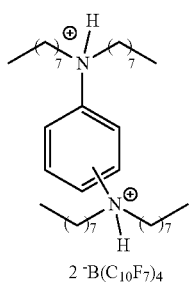
16
2 ⁻B(C₁₀F₇)₄
Clause 16. The compound of clause 1, where [Ar(E¹R¹R²H)x(E²R³R⁴)y] of formula (I) is selected from the group consisting of:
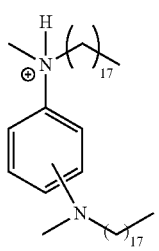
1
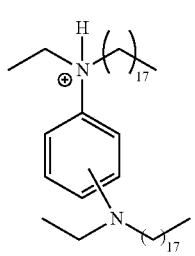
2
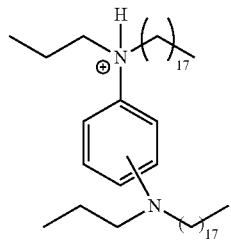
3
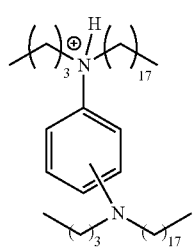
4
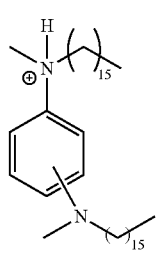
5
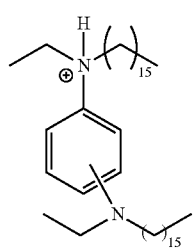
6
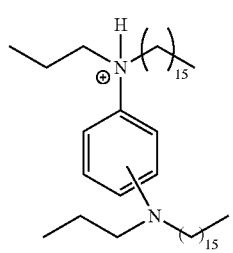
7
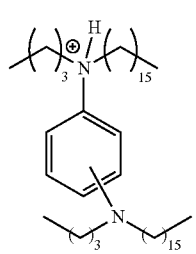
8

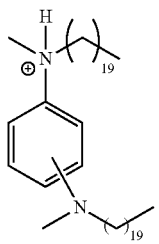
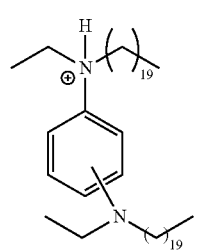
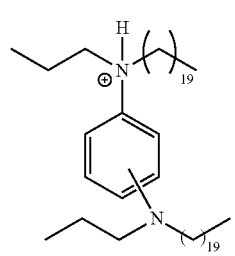
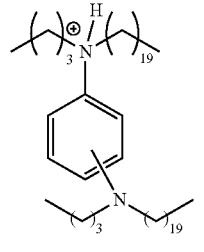
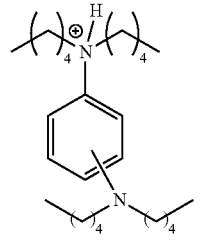
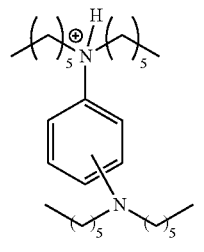
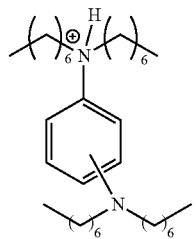
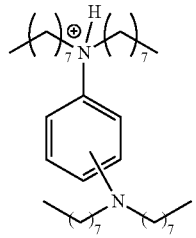
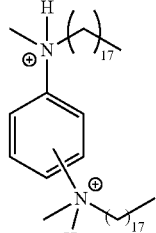
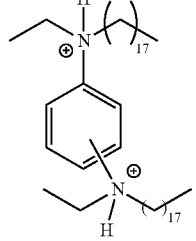
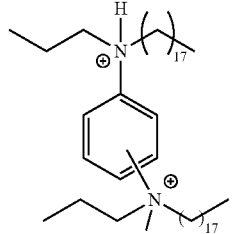
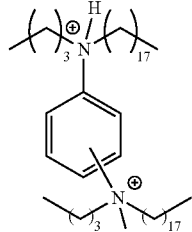

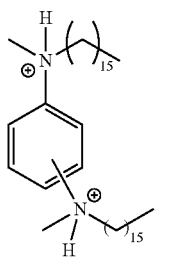
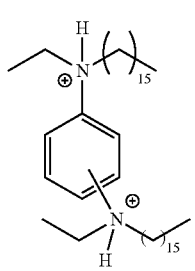
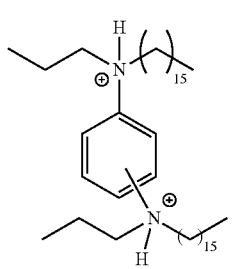
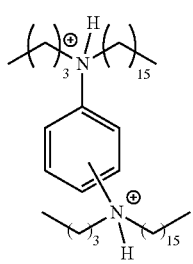
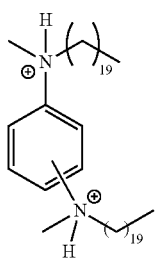
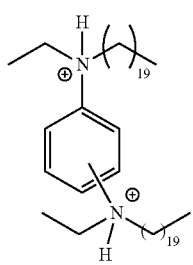
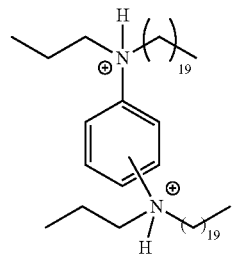
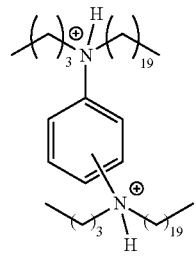
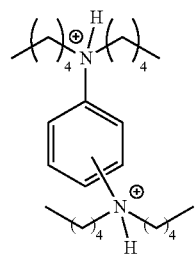
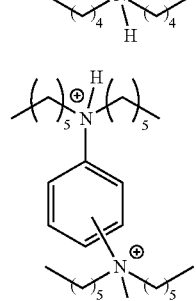
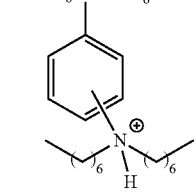
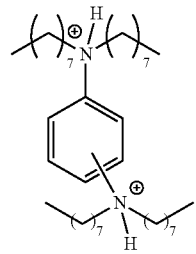
Clause 17. The compound of clause 14, where [Ar(E$^1$R$^1$R$^2$H)x(E$^2$R$^3$R$^4$)y] of formula (I) is selected from the group consisting of:

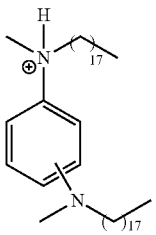

1

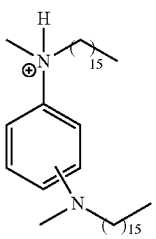

2

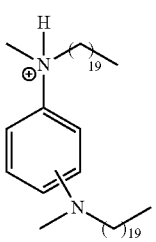

3

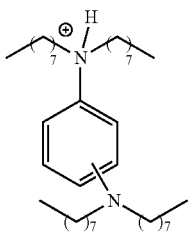

4

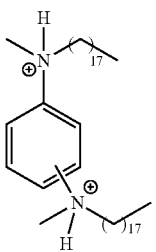

5

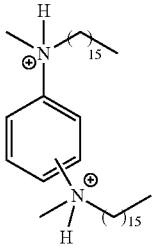

6

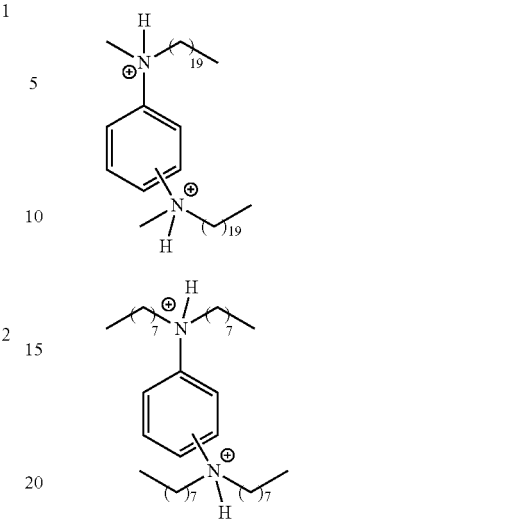

Clause 18. A catalyst system including a catalyst and the activator compound of any of clauses 1 to 15.

Clause 19. A method of polymerizing olefins to produce at least one polyolefin, the method including: contacting at least one olefin with the catalyst system of clause 16; and obtaining a polyolefin.

Clause 20. A method of polymerizing olefins to produce at least one polyolefin, the method including: contacting two or more different olefins with the catalyst system of clause 16; and obtaining a polyolefin.

Clause 21. A solution including the catalyst system of clause 16; and an aliphatic solvent.

Examples

General

Lithium tetrakis(pentafluorophenyl)borate etherate (Li—BF20) was purchased from Boulder Scientific. N,N-Dimethylanilinium tetrakis(pentafluorophenyl)borate (DMAH-BF20) was purchased from Grace Davison and converted to sodium tetrakis(heptafluoronaphthalen-2-yl)borate (Na—BF28) by reaction with sodium hydride in toluene. N,N-dimethylanilinium tetrakis(heptafluoronaphthalen-2-yl)borate (DMAH-BF28) were purchased from Grace Davison. All other reagents were purchased from Sigma-Aldrich and used as received. All anhydrous solvents were purchased from Sigma-Aldrich. Solvents (Sigma-Aldrich) were sparged with nitrogen and stored over molecular sieves.

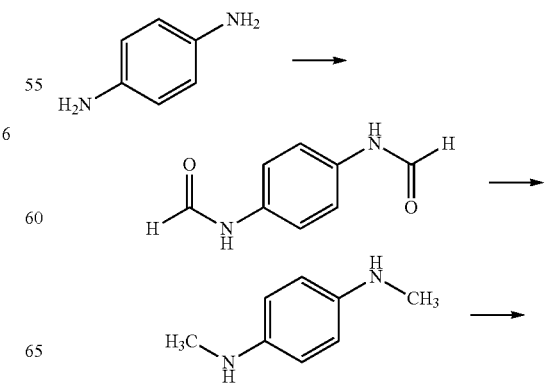

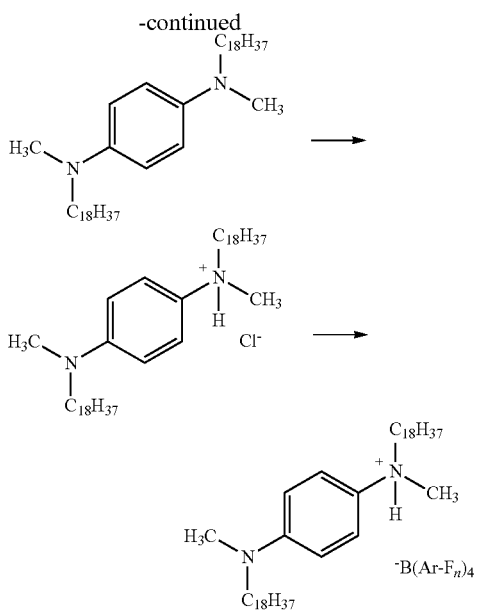

N1,N4-dimethylbenzene-1,4-diamine: Formic acid (55 mL, 1.48 mol) and acetic anhydride (113 mL, 1.20 mol) were combined and heated at 60° C. for 3 hours. After cooling to 0° C., a THF solution of para phenylene diamine (25 g, 0.23 mol) was added slowly and the reaction stirred at ambient temperature overnight. A precipitate formed which was collected and washed with hexane and methylene chloride. The white solid was dried under nitrogen and used without further purification. A suspension of lithium aluminum hydride (95%, 7.30 g, 37.95 mmol) in 100 mL of THF was cooled to 0° C. and the diformamide (5 g, 31.46 mmol) added. The reaction was stirred at ambient for over 48 hours, then quenched slowly with 18 mL of water, followed by 18 mL of 1N NaOH and 18 mL of water. The slurry was diluted with ether, filtered, and concentrated. The residue was dissolved in fresh ether, dried over MgSO$_4$, and concentrated to give a dark red oil that solidified upon standing. The crude product was obtained in 83% yield. $^1$H NMR (500 MHz, CDCl$_3$, δ): 2.44 (s, 6H), 6.47 (s, 4H).

N1,N4-dimethyl-N1,N4-dioctadecylbenzene-1,4-diamine: The above dimethyldiamine (3.46 g, 25.4 mmol) was combined with bromooctadecane (20.3 g, 60.97 mmol) and trimethylamine (8.8 mL, 63.5 mmol) in 400 mL of DMSO and heated at 100° C. overnight. Once cool, the solid was collected and washed with isohexane to give the dialkylated product in 77% yield. $^1$H NMR (500 MHz, CDCl$_3$, δ): 0.91 (m, 6H), 1.34 (m, 60H), 1.52 (m, 4H), 2.70 (s, 6H), 3.12 (m, 4H), 6.86 (s, 4H).

N-methyl-4-(methyl(octadecyl)amino)-N-octadecylbenzenaminium tetrakis(heptafluoronaphthalen-2-yl)borate: N$^1$,N$^4$-dimethyl-N$^1$,N$^4$-dioctadecylphenylene-1,4-diamine (0.330 g, 0.515 mmol) was dissolved in 20 mL of n-hexane. A 2 M ethereal solution of HCl (0.26 mL, 0.515 mmol) was added slowly, causing an orange precipitate to form. After stirring for 1.5 hours, the orange solid was collected, washed with fresh hexane, and dried under vacuum to give the anilinium salt in 60% yield. The N$^1$,N$^4$-dimethyl-N$^1$,N$^4$-dioctadecylphenylene-1,4-diamine HCl salt (0.509 g, 0.751 mmol) was suspended in 20 mL of n-hexane and combined with Li—BF20 (0.571 g, 0.751 mmol). The mixture was heated at reflux for 1.5 hours, then cooled to ambient and filtered. The filtrate was concentrated to give the product as a brown oil in 310% yield.

N-methyl-4-(methyl(octadecyl)amino)-N-octadecylbenzenaminium tetrakis(pentafluorophenyl)borate: N$^1$,N$^4$-dimethyl-N$^1$,N$^4$-dioctadecylphenylene-1,4-diamine HCl salt (0.210 g, 0.310 mmol) described above was suspended in 20 mL of cyclohexane and combined with Na—BF28 (0.324 g, 0.310 mmol). The mixture was heated at reflux for 1.5 hours, then cooled to ambient and filtered. The filtrate was concentrated to give the product as an orange solid in 82% yield.

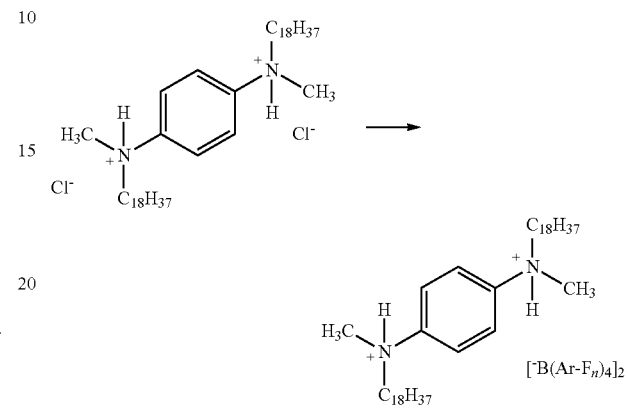

N$^1$,N$^4$-dimethyl-N$^1$,N$^4$-dioctadecylbenzene-1,4-diaminium di(tetrakis(pentafluorophenyl)borate): N$^1$,N$^4$-dimethyl-N$^1$,N$^4$-dioctadecylphenylene-1,4-diamine (0.230 g, 0.359 mmol) was dissolved in 20 mL of n-hexane. A 2 M ethereal solution of HCl (0.36 mL, 0.718 mmol) was added slowly, causing an orange precipitate to form. After stirring for 1.5 hours, the solid was collected, washed with fresh hexane, and dried under vacuum to give the di-anilinium salt in 80% yield. The N$^1$,N$^4$-dimethyl-N$^1$,N$^4$-dioctadecylphenylene-1,4-diamine·2HCl salt (0.205 g, 0.287 mmol) was suspended in 20 mL of cyclohexane and combined with Na—BF28 (0.601 g, 0.574 mmol). The mixture was heated at reflux for 1.5 hours, then cooled to ambient. The resulting solid was isolated via filtration to give the product as a tan solid in 54% yield.

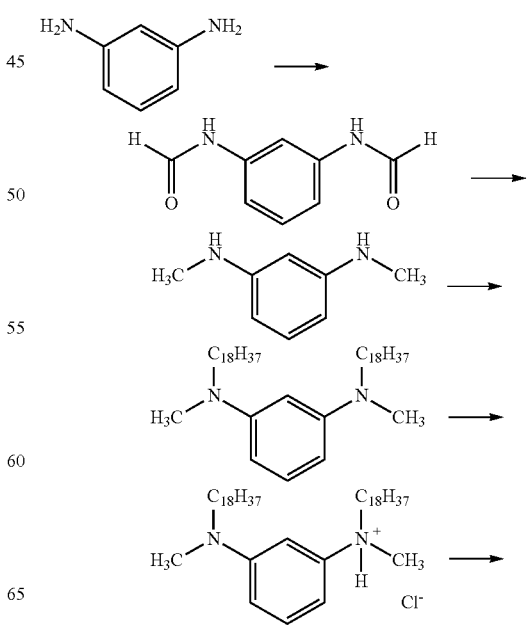

-continued

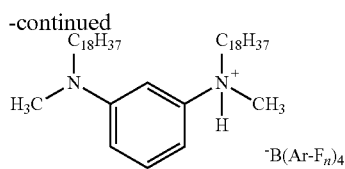

N1,N3-dimethylbenzene-1,3-diamine: Formic acid (111 mL, 2.96 mol) and acetic anhydride (227 mL, 2.40 mol) were combined and heated at 60° C. for 3 hours. After cooling to 0° C., a THF solution of meta phenylene diamine (50 g, 0.46 mol) was added slowly and the reaction stirred at ambient temperature overnight. A precipitate formed which was collected and washed with hexane and methylene chloride. The white powdery solid was dried under nitrogen and used without further purification. A suspension of lithium aluminum hydride (95%, 29.2 g, 730.9 mmol) in 500 mL of THF was cooled to 0° C. and the diformamide (20 g, 121.8 mmol) added. The reaction was stirred at ambient for over 48 hours, then quenched slowly with 30 mL of water, followed by 30 mL of 1N NaOH and 30 mL of water. The slurry was diluted with ether, filtered, and concentrated. The residue was dissolved in fresh ether, dried over $MgSO_4$, and concentrated to give a dark brown oil that solidified upon standing. The crude product was obtained in 57% yield.

N1,N3-dimethyl-N1,N3-dioctadecylbenzene-1,3-diamine: The above dimethyldiamine (9.5 g, 69.7 mmol) was combined with bromooctadecane (55.8 g, 167.4 mmol) and trimethylamine (24.2 mL, 174.3 mmol) in 500 mL of DMSO and heated at 100° C. overnight. The reaction was cooled, and the solid collected and recrystallized in hot isohexane. NMR revealed the presence of DMSO, so the product was redissolved in isohexane, washed with water and brine, then dried ($MgSO_4$), filtered, and concentrated to give pure diamine in 40% yield as a pale yellow solid.

N-methyl-3-(methyl(octadecyl)amino)-N-octadecylbenzenaminium tetrakis(heptafluoronaphthalen-2-yl)borate: $N^1,N^3$-dimethyl-$N^1,N^3$-dioctadecylphenylene-1,3-diamine (2 g, 3.12 mmol) was dissolved in 50 mL of n-hexane. A 2 M ethereal solution of HCl (1.56 mL, 3.13 mmol) was added slowly, causing a white precipitate to form. After stirring for 2.5 hours, the solid was collected, washed with fresh hexane, and dried under vacuum to give the anilinium salt in 87% yield. The $N^1,N^3$-dimethyl-$N^1,N^3$-dioctadecylphenylene-1,3-diamine HCl salt (0.500 g, 0.738 mmol) was suspended in 100 mL of cyclohexane and combined with Li—BF20 (0.561 g, 0.738 mmol). The mixture was heated at reflux for 1.5 hours, then cooled to ambient and filtered. The filtrate was concentrated to give the product as a brown oil in 80% yield.

N-methyl-3-(methyl(octadecyl)amino)-N-octadecylbenzenaminium tetrakis(pentafluorophenyl)borate: The $N^1,N^3$-dimethyl-$N^1,N^3$-dioctadecylphenylene-1,3-diamine HCl salt (0.500 g, 0.738 mmol) described above was suspended in 75 mL of cyclohexane and combined with Na—BF28 (0.772 g, 0.738 mmol). The mixture was heated at reflux for 1.5 hours, then cooled to ambient and filtered. The filtrate was concentrated to give the product as a brown oil in 75% yield.

Polymerization in a Parallel Pressure Reactor

RUN A: Ethylene-octene copolymerization (EO). A series of ethylene-octene polymerizations were performed in the parallel pressure reactor according to the procedure described above. In these studies rac-dimethylsilyl-bis(indenyl)hafnium dimethyl (MCN-1) was used along with ammonium borate activators. In a typical experiment an automated syringe was used to introduce into the reactor the following reagents, if utilized, in the following order: isohexane (0.50 mL), 1-octene (100 μL), additional isohexane (0.50 mL), an isohexane solution of TNOAL scavenger (0.005 M, 100 μL), additional isohexane (0.50 mL), a toluene solution of the respective polymerization catalyst (110 μL, 0.2 mM), additional isohexane (0.50 mL), a toluene solution of the respective activator (110 μL, 0.2 mM), then additional isohexane so that the total solvent volume for each run was 5 mL. Catalyst and activator were used in a 1:1.1 ratio. Each reaction was performed at the specified temperature, typically about 50° C. to about 120° C., such as 80° C., while applying about 75 psig of ethylene (monomer) gas. Each reaction was allowed to run for about 20 minutes (~1,200 seconds) or until approximately 20 psig of ethylene gas uptake was observed, at which point the reactions were quenched with air (~300 psig). When sufficient polymer yield was attained (e.g., at least ~10 mg), the polyethylene product was analyzed by Rapid GPC, described below. Run conditions and data are reported in Table 1. Where the catalysts were rac-dimethylsilyl-bis(indenyl)hafnium dimethyl (MCN-1) and or 1, 1'-bis(4-triethylsilylphenyl)methylene-(cyclopentadienyl)(3,8-di-tertiary-butyl-1-fluorenyl) hafnium dimethyl (MCN-2).

TABLE 1

Data for the ethylene-octene copolymerization.
General conditions: MCN-1 = 20 nmol; activator = 22 nmol; 1-octene = 100 μL; solvent = isohexane; total volume = 5 mL; tri(n-octyl)aluminum = 500 nmol; T = 80° C.; P = 75 PSI.

| run | activator | yield (mg) | time (s) | activity (kg/mmol/h) | Mw | Mn | PDI | % octene | $T_m$ (° C.) |
|---|---|---|---|---|---|---|---|---|---|
| 1 | DMAH-BF20 | 92 | 25.7 | 644.4 | 362,472 | 189,698 | 1.91 | 37.5 | 58.6 |
| 2 | DMAH-BF20 | 75 | 26.5 | 509.4 | 371,373 | 213,514 | 1.74 | 35.4 | 42.3 |
| 3 | NOMAH-BF20 | 90 | 37.6 | 430.9 | 413,270 | 207,838 | 1.99 | 33.9 | 46.7 |
| 4 | NOMAH-BF20 | 75 | 32.6 | 414.1 | 420,680 | 245,773 | 1.71 | 37.4 | 44.9 |
| 5 | NOMAH-BF20 | 71 | 26.7 | 478.7 | 411,768 | 223,321 | 1.84 | 32.6 | 45.6 |
| 6 | NOMAH-BF20 | 71 | 31.2 | 409.6 | 393,303 | 209,625 | 1.88 | 36.1 | 43.7 |
| 7 | NOMAH-BF28 | 71 | 42.3 | 302.1 | 591,099 | 359,399 | 1.65 | 35.5 | 47.7 |
| 8 | NOMAH-BF28 | 71 | 39.8 | 321.1 | 583,582 | 341,973 | 1.71 | 32.9 | 49.1 |
| 9 | NOMAH-BF28 | 65 | 39 | 300 | 582,671 | 331,198 | 1.76 | 34.5 | 48.8 |
| 10 | NOMAH-BF28 | 62 | 32.3 | 345.5 | 571,103 | 342,670 | 1.67 | 29.9 | 50.3 |
| 11 | 4-MOPDAH-BF20 | 47 | 159.9 | 52.9 | 570,643 | 329,512 | 1.73 | 30 | 63.3 |
| 12 | 4-MOPDAH-BF20 | 43 | 144.1 | 53.7 | 610,453 | 379,545 | 1.61 | 27.6 | 64 |
| 13 | 4-MOPDAH-BF20 | 39 | 184.8 | 38 | 583,106 | 332,048 | 1.76 | 29.4 | 71.9 |
| 14 | 4-MOPDAH-BF20 | 43 | 133.3 | 58.1 | 604,075 | 392,725 | 1.54 | 29.7 | 65.9 |
| 15 | 4-MOPDAH-BF28 | 56 | 75.5 | 133.5 | 731,612 | 436,162 | 1.68 | 29.5 | 63.1 |

TABLE 1-continued

Data for the ethylene-octene copolymerization.
General conditions: MCN-1 = 20 nmol; activator = 22 nmol; 1-octene = 100 µL; solvent = isohexane; total volume = 5 mL; tri(n-octyl)aluminum = 500 nmol; T = 80° C.; P = 75 PSI.

| run | activator | yield (mg) | time (s) | activity (kg/mmol/h) | Mw | Mn | PDI | % octene | $T_m$ (° C.) |
|---|---|---|---|---|---|---|---|---|---|
| 16 | 4-MOPDAH-BF28 | 47 | 73.8 | 114.6 | 706,793 | 421,845 | 1.68 | 27.6 | 59.4 |
| 17 | 4-MOPDAH-BF28 | 42 | 60.6 | 124.8 | 789,583 | 515,100 | 1.53 | 24 | 73.6 |
| 18 | 4-MOPDAH-BF28 | 41 | 84.4 | 87.4 | 705,478 | 403,648 | 1.75 | 30.4 | 65 |
| 19 | 3-MOPDAH-BF20 | 46 | 164.6 | 50.3 | 618,337 | 378,829 | 1.63 | 25.1 | 68.3 |
| 20 | 3-MOPDAHBF20 | 53 | 79.8 | 119.5 | 525,986 | 301,350 | 1.75 | 28.9 | 61.8 |
| 21 | 3-MOPDAHBF20 | 39 | 214.9 | 32.7 | 640,218 | 369,704 | 1.73 | 27.2 | 68.9 |
| 22 | 3-MOPDAHBF20 | 50 | 101.5 | 88.7 | 591,729 | 337,808 | 1.75 | 28.9 | 66.8 |
| 23 | 3-MOPDAHBF28 | 67 | 60.6 | 199 | 672,492 | 405,152 | 1.66 | 34.8 | 56.3 |
| 24 | 3-MOPDAHBF28 | 56 | 68.3 | 147.6 | 676,071 | 388,865 | 1.74 | 30.7 | 63 |
| 25 | 3-MOPDAHBF28 | 55 | 63.6 | 155.7 | 708,199 | 407,145 | 1.74 | 26.1 | 69.9 |
| 26 | 3-MOPDAHBF28 | 46 | 62.3 | 132.9 | 683,198 | 366,371 | 1.87 | 24.8 | 72.1 |

Where the activator cations were:

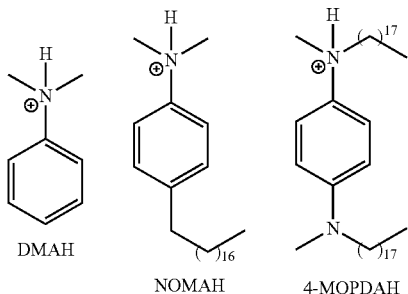

DMAH    NOMAH    4-MOPDAH

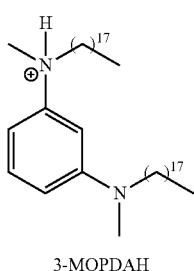

3-MOPDAH

And the activator anions were:

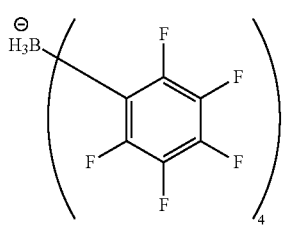

BF20

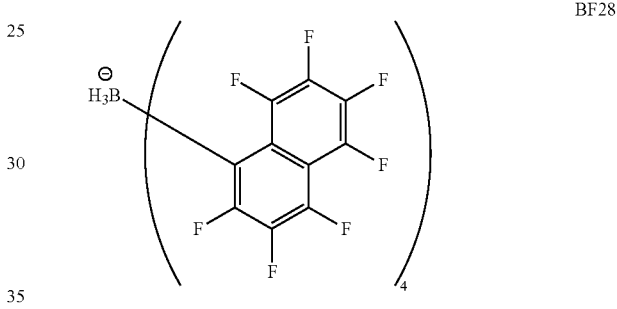

BF28

RUN B: Ethylene homopolymerization (PE). A series of ethylene polymerizations were performed in the parallel pressure reactor according to the procedure described above. In these studies rac-dimethylsilyl-bis(indenyl)hafnium dimethyl (MCN-1) was used along with ammonium borate activators. In a typical experiment an automated syringe was used to introduce into the reactor the following reagents, if utilized, in the following order: isohexane (0.50 mL), an isohexane solution of TNOAL scavenger (0.005 M, 60 µL), additional isohexane (0.50 mL), a toluene solution of the respective polymerization catalyst (110 µL, 0.2 mM), additional isohexane (0.50 mL), a toluene solution of the respective activator (110 µL, 0.2 mM), then additional isohexane so that the total solvent volume for each run was 5 mL. Catalyst and activator were used in a 1:1.1 ratio. Each reaction was performed at a specified temperature from about 50° C. to about 120° C., typically 80° C., while applying about 75 psig of ethylene (monomer) gas. Each reaction was allowed to run for about 20 minutes (~1,200 seconds) or until approximately 20 psig of ethylene gas uptake was observed, at which point the reactions were quenched with air (~300 psig). When sufficient polymer yield was attained (e.g., at least ~10 mg), the polyethylene product was analyzed by Rapid GPC, described below. Run conditions and data are reported in Table 2.

TABLE 2

Data for the ethylene homopolymerization
General conditions: MCN-1 = 20 nmol; activator = 22 nmol; solvent = isohexane;
total volume = 5 mL; tri(n-octyl)aluminum = 500 nmol; T = 80° C.; P = 75 PSI.

| run | activator | yield (mg) | time (s) | activity (kg/mmol/h) | Mw | Mn | PDI | $T_m$ (° C.) |
|---|---|---|---|---|---|---|---|---|
| 1 | DMAH-BF20 | 68 | 42.4 | 288.7 | 875,463 | 431,174 | 2.03 | 135.2 |
| 2 | DMAH-BF20 | 57 | 25.2 | 407.1 | 663,329 | 336,644 | 1.97 | 135.1 |
| 3 | NOMAH-BF20 | 70 | 58.5 | 215.4 | 847,700 | 412,612 | 2.05 | 135.6 |
| 4 | NOMAH-BF20 | 64 | 48.5 | 237.5 | 740,474 | 365,330 | 2.03 | 135.6 |
| 5 | NOMAH-BF20 | 59 | 26.6 | 399.2 | 759,613 | 467,750 | 1.62 | 135.3 |
| 6 | NOMAH-BF20 | 58 | 30.7 | 340.1 | 728,453 | 418,731 | 1.74 | 135.6 |
| 7 | NOMAH-BF28 | 65 | 54.9 | 213.1 | 1,036,055 | 459,313 | 2.26 | 135.6 |
| 8 | NOMAH-BF28 | 68 | 60.5 | 202.3 | 1,005,982 | 536,968 | 1.87 | 136.1 |
| 9 | NOMAH-BF28 | 57 | 59.1 | 173.6 | 885,931 | 451,497 | 1.96 | 135.5 |
| 10 | NOMAH-BF28 | 57 | 37.7 | 272.1 | 815,148 | 421,742 | 1.93 | 135.6 |
| 11 | 4-MOPDAH-BF20 | 33 | 223.8 | 26.5 | 1,099,474 | 605,814 | 1.82 | 135.9 |
| 12 | 4-MOPDAH-BF20 | 32 | 132.8 | 43.4 | 1,070,811 | 568,806 | 1.88 | 136 |
| 13 | 4-MOPDAH-BF20 | 28 | 308.8 | 16.3 | 804,617 | 507,995 | 1.58 | 135.7 |
| 14 | 4-MOPDAH-BF20 | 16 | 1200.41 | 2.4 | 805,018 | 503,215 | 1.60 | 136.5 |
| 15 | 4-MOPDAH-BF28 | 43 | 61.9 | 125 | 1,156,663 | 638,410 | 1.81 | 136.3 |
| 16 | 4-MOPDAH-BF28 | 41 | 52.5 | 140.6 | 1,083,410 | 640,031 | 1.69 | 136.3 |
| 17 | 4-MOPDAH-BF28 | 36 | 91.1 | 71.1 | 1,050,049 | 625,533 | 1.68 | 136.2 |
| 18 | 4-MOPDAH-BF28 | 30 | 48.8 | 110.7 | 831,891 | 573,232 | 1.45 | 136.2 |
| 19 | 3-MOPDAHBF20 | 31 | 214.6 | 26 | 848,907 | 520,232 | 1.63 | 135.2 |
| 20 | 3-MOPDAHBF20 | 35 | 80.2 | 78.6 | 959,589 | 497,986 | 1.93 | 136.3 |
| 21 | 3-MOPDAHBF20 | 26 | 436.3 | 10.7 | 814,384 | 537,703 | 1.52 | 135.4 |
| 22 | 3-MOPDAHBF20 | 30 | 83 | 65.1 | 787,692 | 507,308 | 1.55 | 135.9 |
| 23 | 3-MOPDAHBF28 | 61 | 62.1 | 176.8 | 1,132,796 | 666,882 | 1.70 | 135.8 |
| 24 | 3-MOPDAHBF28 | 40 | 55.3 | 130.2 | 1,098,681 | 596,292 | 1.84 | 136.3 |
| 25 | 3-MOPDAHBF28 | 40 | 64.5 | 111.6 | 1,119,125 | 632,384 | 1.77 | 135.9 |
| 26 | 3-MOPDAHBF28 | 32 | 59.2 | 97.3 | 995,239 | 601,190 | 1.66 | 136.4 |

Polymerization of 1-hexene

A series of 1-hexene polymerizations were performed in 20 mL scintillation vials. In these studies, the metallocenes rac-dimethylsilyl-bis(indenyl)hafnium dimethyl (MCN-1) and 1,1'-bis(4-triethylsilylphenyl)methylene-(cyclopentadienyl)(2,7-di-tertiary-butyl-fluoren-9-yl)hafnium dimethyl (MCN-2) were used with various ammonium borate activators. The data and run conditions are shown in Table 1.

1-Hexene homopolymerization: A 20 mL scintillation vial was charged with 2 mL 1-hexene, 4.9 mL isohexane, and 1 mL 0.010 mM TNOA solution in isohexane. 1.1 mL of prepared 0.5 mM solution of the activators were injected. For p-oDMPDH2-2BF28, with two acidic protons and equivalents of the BF28 anion, 0.55 mL of the prepared solution and 5.45 mL isohexane were added. Toluene was used as the diluent for DMAH-BF28, DMAH-BF20, and p-oDMPDH2-2BF28. Isohexane was used as the diluent for p-oDMPDH-BF28, p-oDMPDH-BF20, m-oDMPDH-BF28 and m-oDMPDH-BF20. Finally, 1 mL of 0.5 mM catalyst solution in isohexane was added. After stirring rapidly for the designated amount of time, the reactions were quenched upon exposure to air. The polymer product was isolated upon evaporation of the volatiles under a stream of nitrogen.

TABLE 3

Data for the polymerization of 1-hexene.
General conditions: catalyst = 500 nmol; activator = 550 nmol; solvent = isohexane;
total volume = 10 mL; tri(n-octyl)aluminum = 10 µmol

| Run | Catalyst | Activator | Time (h) | Yield (g) | Activity (kg/mmol/h) | Mw | Mn | PDI |
|---|---|---|---|---|---|---|---|---|
| 1 | MCN-1 | DMAH-BF28 | 4 | 0.358 | 0.179 | 43,976 | 22,068 | 1.99 |
| 2 | MCN-1 | 4-MOPDAH-BF28 | 4 | 0.045 | 0.022 | 44,123 | 22,008 | 2 |
| 3 | MCN-1 | 4-MOPDAH2-2BF28 | 4 | 0.263 | 0.132 | 45,533 | 22,773 | 2 |
| 4 | MCN-1 | 3-MOPDAH-BF28 | 4 | 0.277 | 0.138 | 41,674 | 21,083 | 1.98 |
| 5 | MCN-2 | DMAH-BF20 | 0.5 | 1.144 | 4.58 | 799,519 | 326,185 | 2.45 |
| 6 | MCN-2 | 4-MOPDAH-BF20 | 0.5 | 1.148 | 4.59 | 941,509 | 391,730 | 2.41 |
| 7 | MCN-2 | 3-MOPDAH-BF20 | 0.5 | 1.239 | 4.96 | 810,150 | 337,806 | 2.40 |

Overall, it has been discovered that activators (and catalyst systems thereof) of the present disclosure can provide improved solubility in aliphatic solvents, as compared to conventional activator compounds and catalyst systems. Additionally, activators, catalyst systems, and methods of the present disclosure can provide homopolymers and copolymers. For example, an activator, catalyst system, or a method of the present disclosure may provide polyolefin homopolymers having a weight average molecular weight (Mw) of about 300,000 g/mol or greater and a melt temperature (Tm) of about 130° C. or greater and copolymers having a weight average molecular weight (Mw) of about 300,000 g/mol or greater and a comonomer incorporation of greater than 20%.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of this disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of this disclosure have been illustrated and described, various modifications can be made without departing from the spirit and scope of this disclosure. Accordingly, it is not intended that this disclosure be limited thereby. Likewise whenever a composition, an element or a group of elements is preceded with the transitional phrase "including," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A compound represented by Formula (I):

$$[Ar(E^1R^1R^2H)_x(E^2R^3R^4)_y][QR^5R^6R^7R^8]_z \quad (I)$$

wherein:
Ar is a $C_6$-$C_{30}$ aromatic hydrocarbyl group, provided that if Ar is a multicyclic ring, then each $E^1$ and each $E^2$ are substitutions on a single ring of the multicyclic ring,
x is 1 to 4;
y is 0 to 3;
z=x;
x+y is 2 to 6;
each of $E^1$ and $E^2$ are independently selected from nitrogen or phosphorous;
each of $R^1$, $R^2$, $R^3$, and $R^4$ are independently selected from $C_1$-$C_{40}$ aliphatic hydrocarbyl, substituted $C_1$-$C_{40}$ aliphatic hydrocarbyl, wherein $R^1$, $R^2$, $R^3$, and $R^4$ together include 15 or more carbon atoms;
Q is an element selected from group 13 of the Periodic Table of the Elements;
each of $R^5$, $R^6$, $R^7$, and $R^8$ is independently a $C_6$-$C_{24}$ hydrocarbyl or a $C_6$-$C_{24}$ substituted hydrocarbyl.

2. The compound of claim 1, wherein x is 1 and y is 1.
3. The compound of claim 1, wherein x is 2 and y is 0.
4. The compound of claim 1, wherein Ar is a single ring aromatic hydrocarbyl.
5. The compound of claim 1, wherein Ar is a $C_6$ aromatic hydrocarbyl.
6. The compound of claim 1, wherein $E^1$ and $E^2$ are nitrogen.
7. The compound of claim 1, wherein $R^1$ and $R^3$ are independently an optionally substituted $C_1$-$C_{10}$ aliphatic hydrocarbyl and $R^2$ and $R^4$ are independently an optionally substituted $C_{10}$-$C_{20}$ aliphatic hydrocarbyl.
8. The compound of claim 1, wherein:
$R^1$ and $R^3$ are methyl, and
$R^2$ and $R^4$ are independently an optionally substituted $C_{10}$-$C_{20}$ aliphatic hydrocarbyl.
9. The compound of claim 1, wherein:
$R^1$ and $R^3$ are methyl, and
$R^2$ and $R^4$ are independently an optionally substituted $C_{10}$-$C_{20}$ linear alkyl group.
10. The compound of claim 1, wherein $R^1$ and $R^3$ are methyl and $R^2$ and $R^4$ are independently an optionally substituted $C_{18}$ linear aliphatic hydrocarbyl.
11. The compound of claim 1, wherein $R^1$, $R^2$, $R^3$, and $R^4$ together include 24 or more carbon atoms.
12. The compound of claim 1, wherein each of $R^5$, $R^6$, $R^7$, and $R^8$ is independently a $C_6$-$C_{24}$ aromatic hydrocarbyl or a substituted $C_6$-$C_{24}$ aromatic hydrocarbyl.
13. The compound of claim 1, wherein each of $R^5$, $R^6$, $R^7$, and $R^8$ is independently a pentafluorophenyl or heptafluoronaphthyl.
14. The compound of claim 1, wherein $[Ar(E^1R^1R^2H)_x(E^2R^3R^4)_y][QR^5R^6R^7R^8]_z$ of formula (I) is selected from the group consisting of:

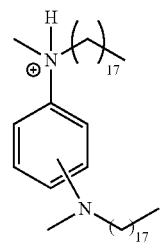

1

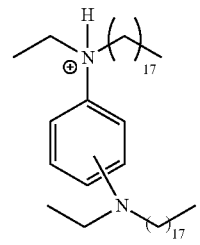

2

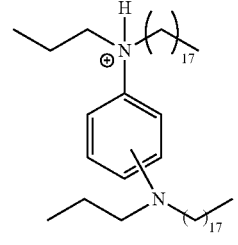

3

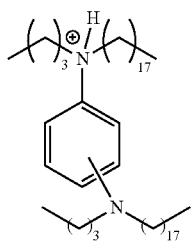
⁻B(C₆F₅)₄
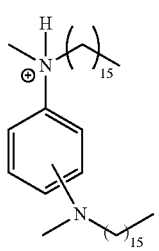
⁻B(C₆F₅)₄
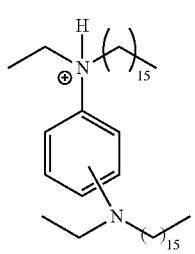
⁻B(C₆F₅)₄
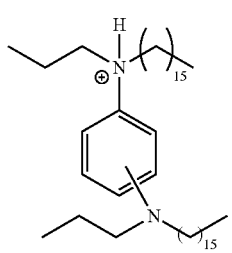
⁻B(C₆F₅)₄
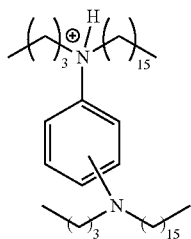
⁻B(C₆F₅)₄
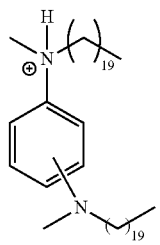
⁻B(C₆F₅)₄
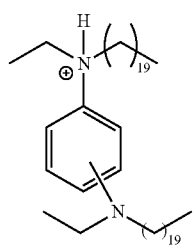
⁻B(C₆F₅)₄
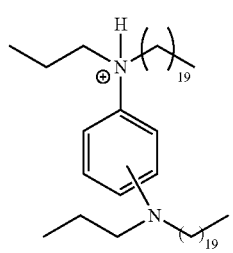
⁻B(C₆F₅)₄
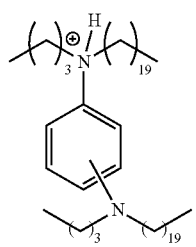
⁻B(C₆F₅)₄
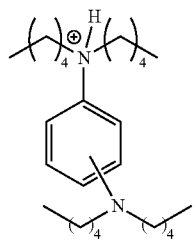
⁻B(C₆F₅)₄

14
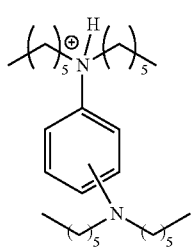
⁻B(C₆F₅)₄
15
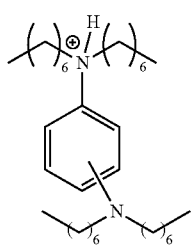
⁻B(C₆F₅)₄
16
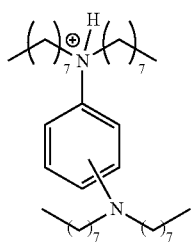
⁻B(C₆F₅)₄
17
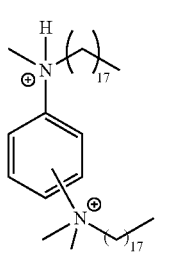
⁻B(C₆F₅)₄
18
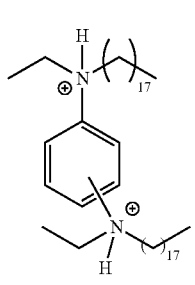
⁻B(C₆F₅)₄
19
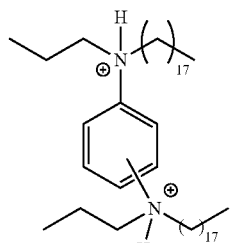
2 ⁻B(C₆F₅)₄
20
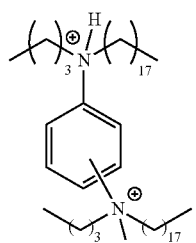
2 ⁻B(C₆F₅)₄
21
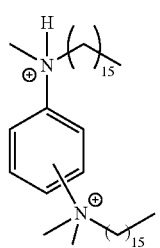
2 ⁻B(C₆F₅)₄
22
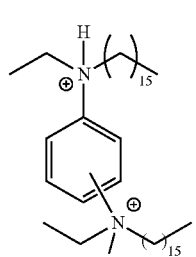
2 ⁻B(C₆F₅)₄
23
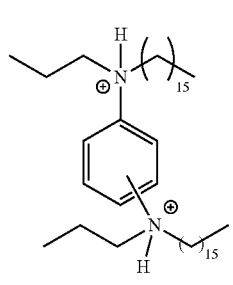
2 ⁻B(C₆F₅)₄

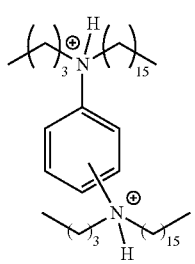
24
2 ⁻B(C₆F₅)₄
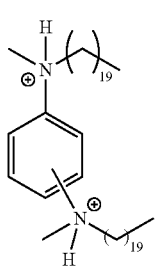
25
2 ⁻B(C₆F₅)₄
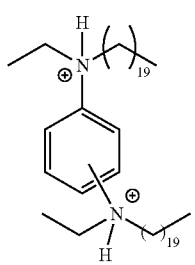
26
2 ⁻B(C₆F₅)₄
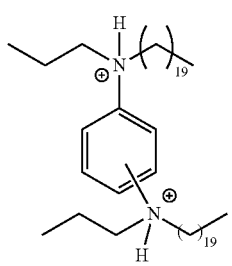
27
2 ⁻B(C₆F₅)₄
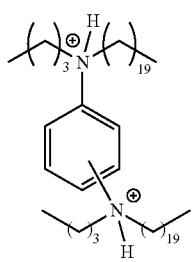
28
2 ⁻B(C₆F₅)₄
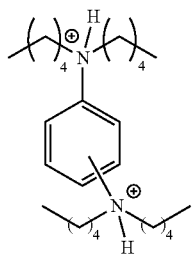
29
2 ⁻B(C₆F₅)₄
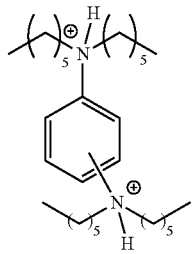
30
2 ⁻B(C₆F₅)₄
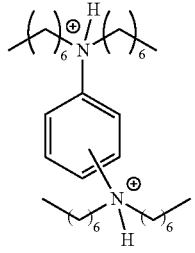
31
2 ⁻B(C₆F₅)₄
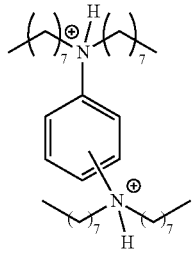
32
2 ⁻B(C₆F₅)₄
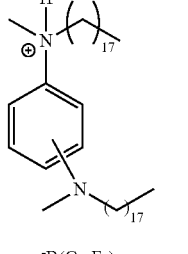
33
⁻B(C₁₀F₇)₄

-continued
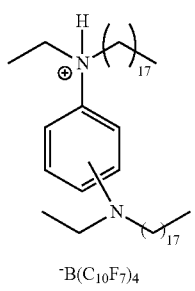
34
⁻B(C₁₀F₇)₄
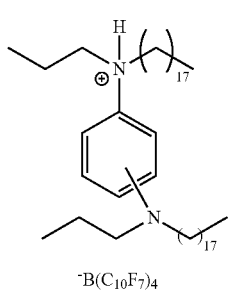
35
⁻B(C₁₀F₇)₄
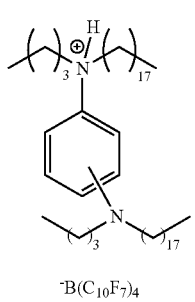
36
⁻B(C₁₀F₇)₄
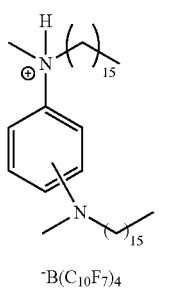
37
⁻B(C₁₀F₇)₄
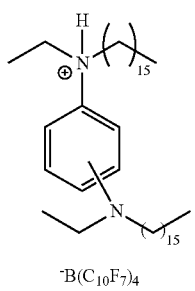
38
⁻B(C₁₀F₇)₄
-continued
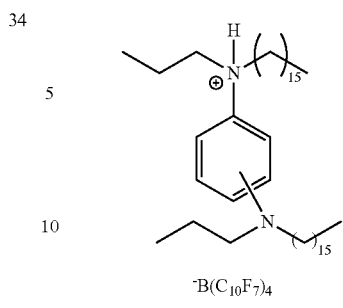
39
⁻B(C₁₀F₇)₄
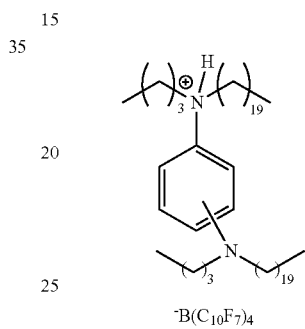
40
⁻B(C₁₀F₇)₄
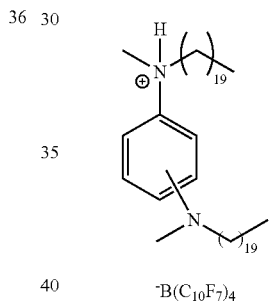
41
⁻B(C₁₀F₇)₄
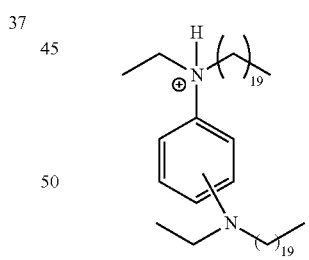
42
⁻B(C₁₀F₇)₄
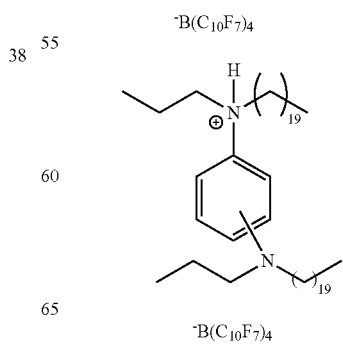
43
⁻B(C₁₀F₇)₄

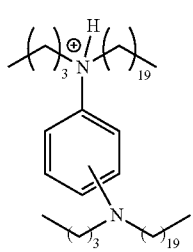
44
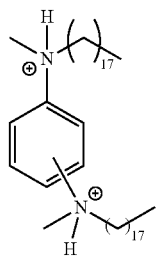
49
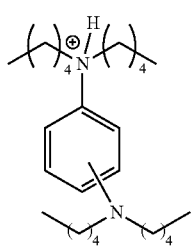
45
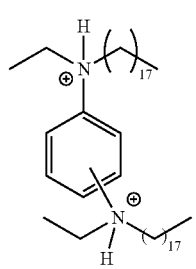
50
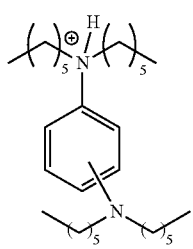
46
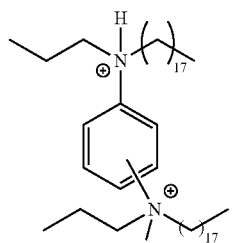
51
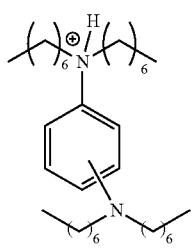
47
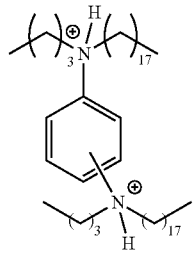
52
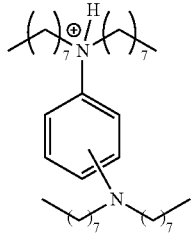
48
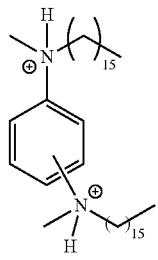
53

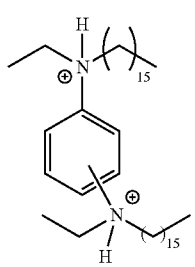
54
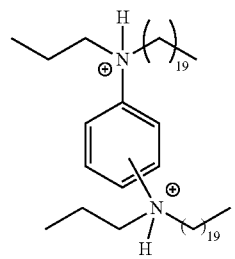
59
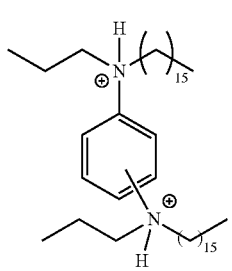
55
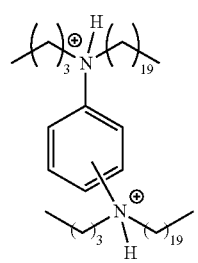
60
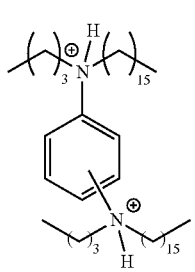
56
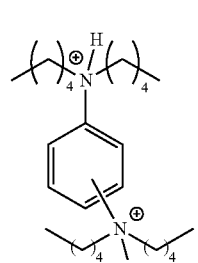
61
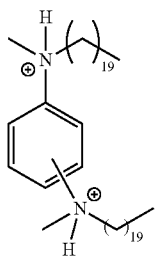
57
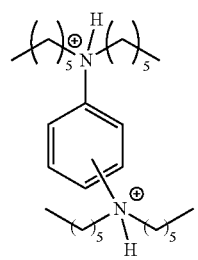
62
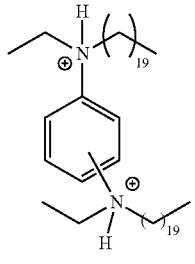
58
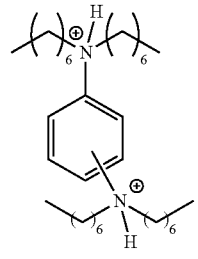
63

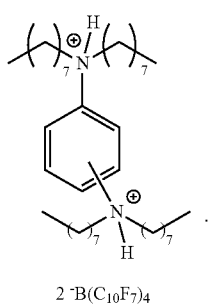
2 ⁻B(C₁₀F₇)₄
15. The compound of claim 14, wherein [Ar(E¹R¹R²H)ₓ(E²R³R⁴)ᵧ][QR⁵R⁶R⁷R⁸]_z of formula (I) is selected from the group consisting of:
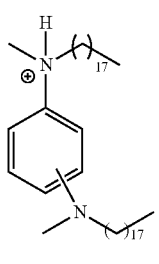
⁻B(C₆F₅)₄
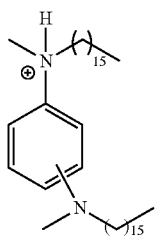
⁻B(C₆F₅)₄
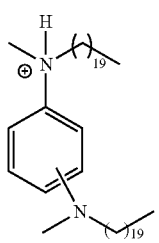
⁻B(C₆F₅)₄
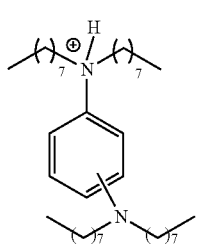
⁻B(C₆F₅)₄
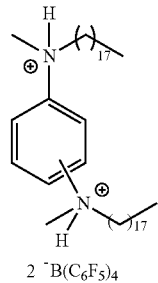
2 ⁻B(C₆F₅)₄
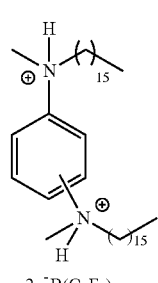
2 ⁻B(C₆F₅)₄
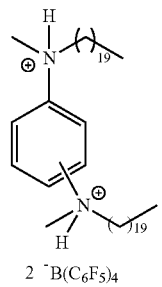
2 ⁻B(C₆F₅)₄
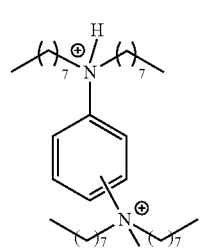
2 ⁻B(C₆F₅)₄
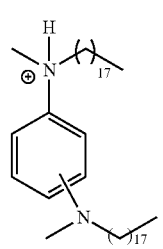
⁻B(C₁₀F₇)₄

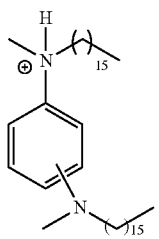
⁻B(C₁₀F₇)₄
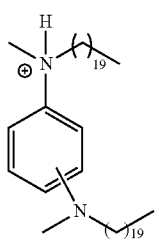
⁻B(C₁₀F₇)₄
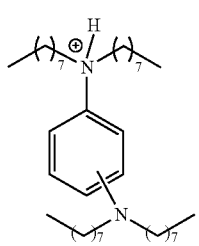
⁻B(C₁₀F₇)₄
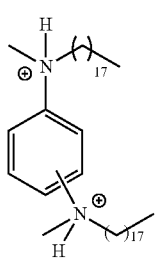
2 ⁻B(C₁₀F₇)₄
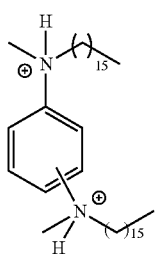
2 ⁻B(C₁₀F₇)₄
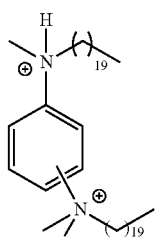
2 ⁻B(C₁₀F₇)₄
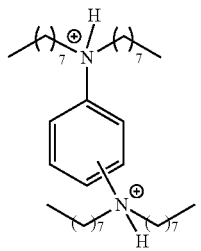
2 ⁻B(C₁₀F₇)₄
16. The compound of claim 1, wherein $[Ar(E^1R^1R^2H)_x(E^2R^3R^4)_y]$ of formula (I) is selected from the group consisting of:
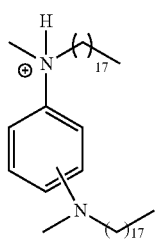
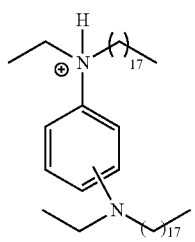
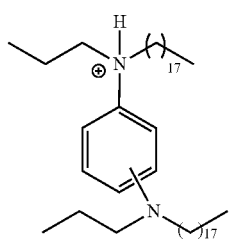

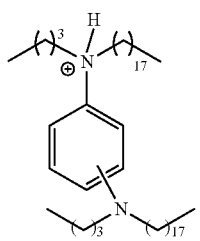
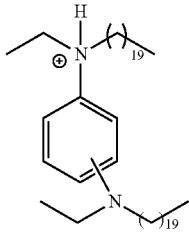
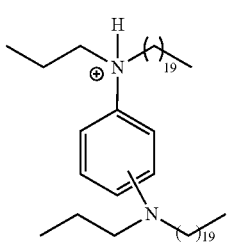
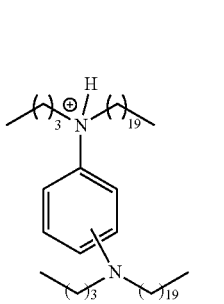
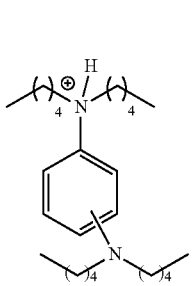
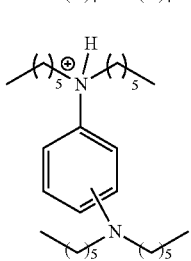
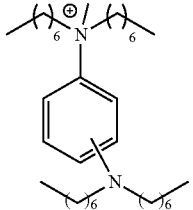

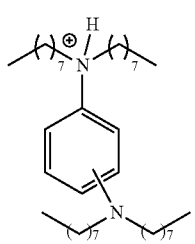
16
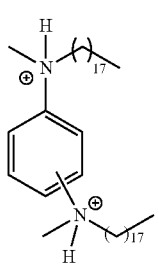
17
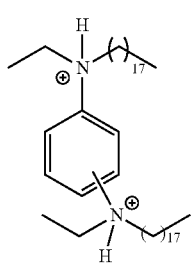
18
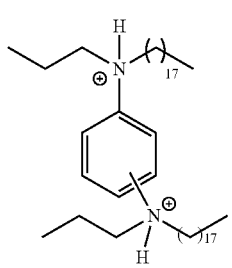
19
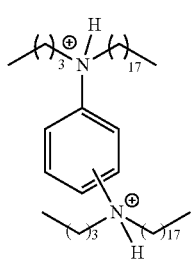
20
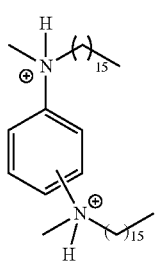
21
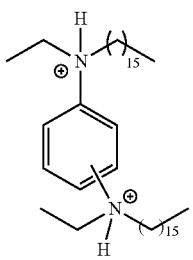
22

-continued
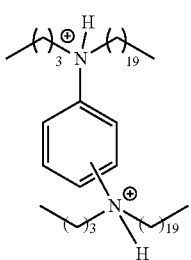
28
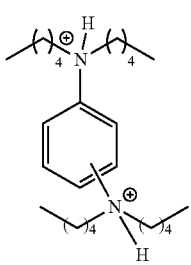
29
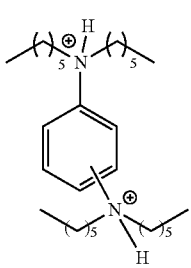
30
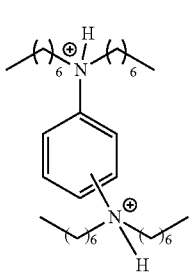
31
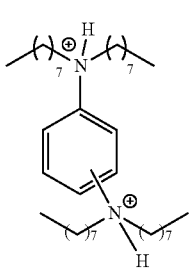
32
17. The compound of claim 14, wherein [Ar(E$^1$R$^1$R$^2$H)$_x$(E$^2$R$^3$R$^4$)$_y$] of formula (I) is selected from the group consisting of:
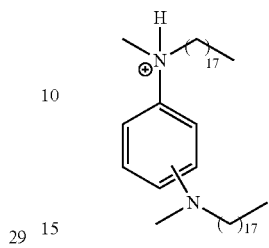
1
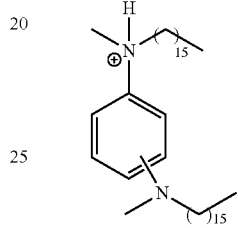
2
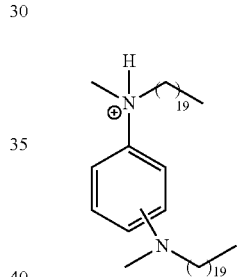
3
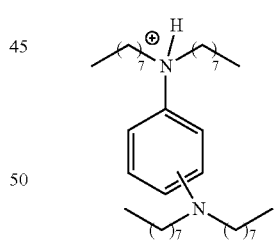
4
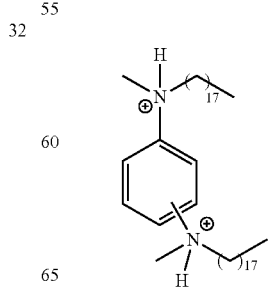
5

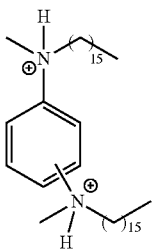

6

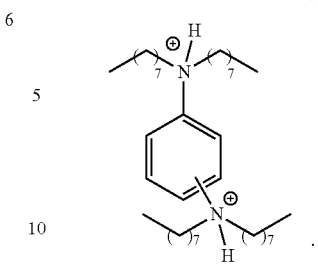

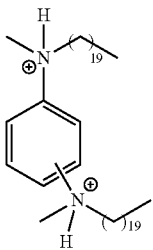

18. A method of polymerizing olefins to produce at least one polyolefin, the method comprising:
   contacting at least one olefin with the catalyst of claim 1 and an activator; and
   obtaining a polyolefin.

19. A method of polymerizing olefins to produce at least one polyolefin, the method comprising:
   contacting two or more different olefins with the catalyst of claim 1 and an activator; and
   obtaining a polyolefin.

* * * * *